US012432208B2

(12) United States Patent
Coyle et al.

(10) Patent No.: US 12,432,208 B2
(45) Date of Patent: Sep. 30, 2025

(54) OPTIMIZED DATA-OVER-CABLE SERVICE INTERFACE SPECIFICATIONS FILTER PROCESSING FOR BATCHES OF DATA PACKETS USING A SINGLE ACCESS CONTROL LIST LOOKUP

(71) Applicant: Intel Corporation, Santa Clara, CA (US)

(72) Inventors: David Coyle, Limerick (IE); Brendan Ryan, Limerick (IE); Konstantin Ananyev, Naas (IE)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 17/841,386

(22) Filed: Jun. 15, 2022

(65) Prior Publication Data

US 2022/0321566 A1     Oct. 6, 2022

Related U.S. Application Data

(60) Provisional application No. 63/275,182, filed on Nov. 3, 2021.

(51) Int. Cl.
*H04L 9/40* (2022.01)
*H04L 12/28* (2006.01)

(52) U.S. Cl.
CPC ........ *H04L 63/101* (2013.01); *H04L 12/2801* (2013.01); *H04L 63/0236* (2013.01)

(58) Field of Classification Search
None
See application file for complete search history.

(56) References Cited

U.S. PATENT DOCUMENTS

| 7,110,404 B1* | 9/2006 | Temoshenko ....... H04L 12/2801 |
| | | 370/389 |
| 7,656,877 B1* | 2/2010 | Sharan ............... H04N 7/17309 |
| | | 370/487 |

(Continued)

OTHER PUBLICATIONS

"Data-Over-Cable Service Interface Specifications DOCSIS® 3.1; CCAP™ Operations Support System Interface Specification", CM-SP-CCAP-OSSIv3.1-I16-190917, 655 pages (Sep. 10, 2019).

(Continued)

*Primary Examiner* — Kaveh Abrishamkar
(74) *Attorney, Agent, or Firm* — Schwabe, Williamson & Wyatt, P.C.

(57) ABSTRACT

The present disclosure provides mechanisms to optimize filter processing. Conventional filter processing techniques involve dividing a batch of received data packets into multiple Access Control Lists (ACLs) per filter group, and thus, cannot leverage of optimal ACL processing of large packet batches using the latest processor instruction sets such as 512 bit wide instructions. The filter processing techniques discussed in the present disclosure, some or all rules for a batch of packets are included in a single ACL look-up by including a filter group identifier (ID) in each rule, and also adding the filter group ID to a field of the packet undergoing the ACL look-up. This avoids false matches while also employing a single ACL look-up for an entire batch of packets, regardless of batch-size. The filter processing techniques can be applied to DOCSIS packet processing pipelines and/or other filtering mechanisms.

21 Claims, 17 Drawing Sheets

(56) References Cited

U.S. PATENT DOCUMENTS

| | | | | |
|---|---|---|---|---|
| 10,284,473 | B1* | 5/2019 | Sharma | H04L 63/101 |
| 11,588,821 | B1* | 2/2023 | Detwiler | H04L 63/0263 |
| 2004/0160903 | A1* | 8/2004 | Gai | H04L 63/105 |
| | | | | 370/254 |
| 2005/0044396 | A1* | 2/2005 | Vogel | G06F 21/6227 |
| | | | | 726/6 |
| 2015/0012998 | A1* | 1/2015 | Nellikar | H04L 63/0245 |
| | | | | 726/13 |
| 2017/0118173 | A1* | 4/2017 | Arramreddy | H04L 63/20 |
| 2020/0228491 | A1* | 7/2020 | Bleidorn | H04L 61/5014 |
| 2022/0321566 | A1 | 10/2022 | Coyle et al. | |

OTHER PUBLICATIONS

"Data-Over-Cable Service Interface Specifications DOCSIS® 4.0; CCAP™ Operations Support System Interface Specification", CM-SP-CCAP-OSSIv4.0-I06-220302, 791 pages (Feb. 28, 2022).

"Data-Over-Cable Service Interface Specifications DOCSIS® 3.1; Cable Modem Operations Support System Interface Specification", CM-SP-CM-OSSIv3.1-I22-220216, 307 pages (Feb. 7, 2022).

"Data-Over-Cable Service Interface Specifications DOCSIS® 4.0; Cable Modem Operations Support System Interface Specification", CM-SP-CM-OSSIv4.0-I06-220302, 319 pages (Feb. 22, 2022).

"Data-Over-Cable Service Interface Specifications Flexible MAC Architecture; Flexible MAC Architecture (FMA) System Specification", CM-SP-FMA-SYS-I03-220126, 190 pages (Jan. 25, 2022).

"Data-Over-Cable Service Interface Specifications DCA-MHAv2; Generic Control Plane Specification", CM-SP-GCP-I05-200323, 30 pages (Mar. 23, 2020).

"Data-Over-Cable Service Interface Specifications DOCSIS® 3.1; MAC and Upper Layer Protocols Interface Specification", CM-SP-MULPIv3.1-I21-201020, 882 pages (Oct. 16, 2020).

"Data-Over-Cable Service Interface Specifications DOCSIS® 4.0; MAC and Upper Layer Protocols Interface Specification", CM-SP-MULPIv4.0-I05-220328, 992 pages (Mar. 23, 2022).

"Data-Over-Cable Service Interface Specifications DOCSIS® 4.0; Physical Layer Specification", CM-SP-PHYv4.0-I05-220328, 153 pages (Mar. 22, 2022).

"Data-Over-Cable Service Interface Specifications MHAv2; Remote Downstream External PHY Interface Specification", CM-SP-R-DEPI-I16-210804, 111 pages (Aug. 4, 2021).

"Data-Over-Cable Service Interface Specifications MHAv2; Remote PHY OSS Interface Specification", CM-SP-R-OSSI-I17-220128, 351 pages (Jan. 24, 2022).

"Data-Over-Cable Service Interface Specifications MHAv2; Remote PHY Specification", CM-SP-R-PHY-I17-220531, 484 pages (May 31, 2022).

"Data-Over-Cable Service Interface Specifications Converged Cable Access Platform; Converged Cable Access Platform Architecture Technical Report", CM-TR-CCAP-V03-120511, 50 pages (May 11, 2012).

"Data-Over-Cable Service Interface Specifications DCA; Distributed CCAP Architectures Overview Technical Report", CM-TR-DCA-V01-150908, 44 pages (Sep. 8, 2015).

"Data-Over-Cable Service Interface Specifications DCA-MHAv2; Modular Headend Architecture v2 Technical Report", CM-TR-MHAv2-V01-150615, 34 pages (Jun. 15, 2015).

Vecima, "DAA: Deciding Between Remote PHY and Remote MACHPHY", 8 pages (Dec. 10, 2020), https://vecima.com/wp-content/uploads/2020/12/WHITEPAPER_DAA-Deciding-Between-Remote-PHY-and-Remote-MACPHY_-Final.pdf.

"PacketCable™ Specification, Multimedia Specification", PKT-SP-MM-C01-191120, 164 pages (Oct. 25, 2019).

Extended European Search Report mailed Feb. 21, 2023 for European Patent Application No. 22199900.6, 8 pages.

"Data-Over-Cable Service Interface Specifications Docsis", ITU-T Draft; Study Period 2017-2020; Study Group 9, International Telecommunication Union, Geneva, 654 pages (Feb. 17, 2020).

"Data-Over-Cable Service Interface Specifications DOCSIS 4.0 MAC and Upper Layer Protocols Interface Specification", ITU-T Draft; Study Period 2017-2020; Study Group 9, International Telecommunication Union, Geneva, 935 pages (Feb. 17, 2020).

"Intel® vCMTS Demo Overview", Intel Corp., 4 pages (Oct. 21, 2018).

"Intel vCMTS Reference Dataplane v20.10.0", Intel Corp., 84 pages (Nov. 23, 2020).

"Intel vCMTS Reference Dataplane v21.10.0", Intel Corp., 80 pages, (Nov. 27, 2021).

Ryan et al., "How VCMTS Paves the Way for 5G Over DOCSIS: Exploring Software-centric Solutions for 5G Xhaul and FMC", 2021 Fall Technical Forum Proceedings, SCTE Cable-Tec Expo, NCTA—The Internet & Television Association (Oct. 11, 2021), https://www.nctatechnicalpapers.com/Paper/2021/2021-how-vcmts-paves-the-way-for-5g-over-docsis-2.

Hirochika Asai, "Palmtrie: A Ternary Key Matching Algorithm for IP Packet Filtering Rules", Association for Computing Machinery, Proceedings of the 16th International Conference on emerging Networking Experiments and Technologies (CoNEXT '20), Barcelona, Spain, pp. 323-335, (Nov. 2020), https://doi.org/10.1145/3386367.3431289.

Carotti et al., "Container Bare Metal for 2nd Generation and 3rd Generation Intel® Xeon® Scalable Processor", Intel Corp., Reference Architecture Release version 21.08, 141 pages (Aug. 18, 2021).

Cahill et al., "Container Bare Metal for 2nd Generation and 3rd Generation Intel® Xeon® Scalable Processor and Intel® Xeon® D Processor Reference Architecture User Guide Release V22.01", Intel Corp., User Guide, 93 pages (Feb. 17, 2022).

"Container Bare Metal for 2nd Generation Intel® Xeon® Scalable Processor", Intel Corp., Reference Architecture Release V21.09, 116 pages (Oct. 20, 2021).

Ryan et al., "Maximizing vCMTS Data Plane Performance with 3rd Gen Intel® Xeon® Scalable Processor Architecture", Intel Corp., White Paper: Processor Architecture Study, 16 pages (Aug. 25, 2021).

Tiwari et al., "Accelerating x265 with Intel® Advanced Vector Extensions 512", Intel Corp., White Paper: Communications Service Providers High Efficiency Video Codec, 16 pages (May 3, 2018), https://www.intel.com/content/dam/develop/external/US/en/documents/mcw-intel-x265-avx512.pdf.

O'Hanlon et al., "Maximizing the Performance of DOCSIS 3.0/3.1 Processing on Intel® Xeon® Processors", Intel Corp., Architecture Study, 11 pages (Oct. 17, 2017), https://builders.intel.com/docs/networkbuilders/vcmts-docsis-architecture-study.pdf.

\* cited by examiner

OPTIMIZED DATA-OVER-CABLE SERVICE INTERFACE SPECIFICATIONS FILTER PROCESSING FOR BATCHES OF DATA PACKETS USING A SINGLE ACCESS CONTROL LIST LOOKUP

RELATED APPLICATIONS

The present disclosure claims priority to U.S. Provisional App. No. 63/275,182 filed on Nov. 3, 2021 ("['182]"), the contents of which is hereby incorporated by reference in its entirety.

TECHNICAL FIELD

The present disclosure is generally related to edge computing, cloud computing, network communication, data centers, network topologies, cable modems, Data-Over-Cable Service Interface Specifications (DOCSIS) systems, and communication system implementations, and in particular, to techniques for optimized DOCSIS filter processing for batches of data packets using a single access control list (ACL) look-ups.

BACKGROUND

The Data-Over-Cable Service Interface Specifications (DOCSIS) are a family of specifications developed by Cable Television Laboratories, Inc. (CableLabs®). In particular, DOCSIS is part of a series of specifications that define high-speed data-over-cable systems including requirements necessary for the Configuration, Fault Management, and Performance Management of the Cable Modem Termination System (CMTS) and a Converged Cable Access Platform (CCAP) system.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
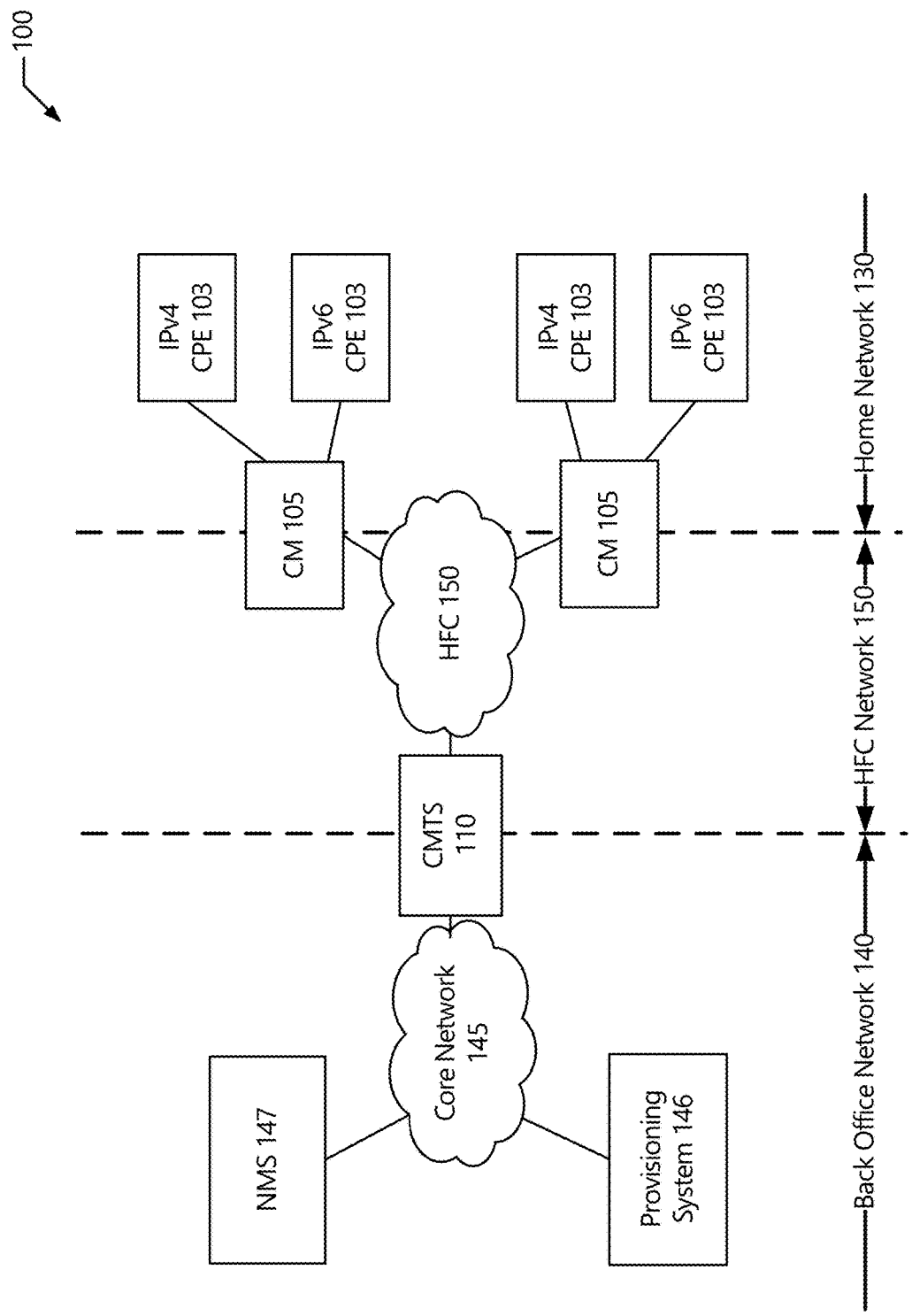
FIG. 1 depicts an example DOCSIS network.

The present disclosure is generally related to data processing, service management, resource allocation, compute management, network communication, application partitioning, network topologies and engineering, edge computing frameworks, and communication system implementations, and in particular, to techniques for enhancing DOCSIS filter processing. The filter processing techniques discussed herein avoid sub-optimal DOCSIS filter processing. Conventional DOCSIS filter processing techniques divide a batch of received data packets into multiple Access Control Lists (ACLs) (or ACL look-ups) per DOCSIS filter group, and thus, cannot leverage of optimum ACL processing of large packet batches using the latest 512 bit wide CPU instructions such as Intel® AVX-512 instructions. AVX-512 instructions are 512-bit extensions to the 256-bit Advanced Vector Extensions (AVX) single instruction multiple data (SIMD) instructions for the x86 instruction set architecture (ISA).

Typically, many filter groups are defined for a virtualized Cable Modem Termination System (vCMTS), and the filter rules associated with a filter group correspond to a single ACL look-up. Each batch of downstream packets received by a vCMTS application instance must be divided into smaller batches for the relevant ACL lookups per cable-modem in order to avoid false matches against rules in another ACL. However, using smaller ACL input batches results in a sub-optimal path of the ACL library being used which does not take advantage of the latest 256 and 512 bit CPU instructions.

The present disclosure provides techniques for optimized DOCSIS filter processing. In various implementations, a single ACL for DOCSIS filter processing of a batch of data packets ensures the most optimal code path of an ACL library, such as the path that utilizes the widest 512-bit CPU instructions, will be used. This enables a significant reduction in CPU cycles for this stage of a DOCSIS MAC downstream data-plane pipeline, and results in a constant cycle count regardless of the number of Filter Groups and Filter Rules, unlike the linear increasing cycle count when an ACL per filter group is used. To allow a single ACL to be used and to avoid any potential false hits, the filter group ID is included in each filter rule and in the target filter lookup object. In various embodiments, all rules for a batch of packets can be included in a single ACL look-up by including the filter group ID in each rule and also adding this ID to a field of the packet undergoing ACL look-up, thus, avoiding false matches while also employing a single ACL look-up for an entire batch of packets, regardless of batch-size. In these ways, improved DOCSIS filtering performance in a vCMTS can be realized by employing a technique, which enables optimal utilization of the widest Intel® AVX-512 instructions for ACL processing. In some cases, this allows IA based solutions to perform better than competing CPU architectures for vCMTS deployments. The embodiments herein can be defined by suitable standards/specification and/or vCMTS product literature relating to optimized DOCSIS filter processing based on wider 256 and 512 bit CPU instructions used to process large batches of packets.

1. DOCSIS Aspects

1.1. Broadband Access Network and System Architecture

A coaxial-based broadband access network is assumed. This may take the form of either an all-coax or hybrid-fiber/coax (HFC) network. The generic term "cable network" is used here to cover all cases. A cable network uses a tree-and-branch architecture with analog transmission. Some functional characteristics applicable to the embodiments discussed herein include: two-way transmission; and a maximum optical/electrical spacing between the cable modem termination system (CMTS) and a most distant cable modem (CM) of a predefined distance (e.g., 100 miles (160 km), 10-15 miles (16-24 km), or the like) in each direction. The elements that participate in the provisioning of DOCSIS services are shown in FIG. 1.

FIG. 1 depicts a DOCSIS network 100, which may be arranged into a distributed architecture. Here, the CM 105 connects to the operator's HFC network 150 and to a home network 130, bridging packets between them. Many Customer Premises Equipment (CPE) devices 103 can connect to the CMs' 105 LAN interfaces. The CPEs 103 can be embedded with the CM 105 in a single device, or they can be separate standalone devices (as shown in FIG. 1). CPE devices 103 may use IPv4, IPv6 or both forms of IP addressing. Additionally or alternatively, other network addresses may be used, such as those discussed herein. Examples of CPE devices 103 include home routers, set-top boxes (STBs), and personal computers, although any other compute node may be used such as those discussed herein.

The CMTS 110 connects the operator's back office network 140 and core network 145 with the HFC network 150. Its main function is to forward packets between these two domains, and optionally to forward packets between upstream and downstream channels on the HFC network 150. The CMTS 110 performs this forwarding with any combination of link-layer (bridging) and network-layer (routing) semantics.

Various applications are used to provide back office configuration and other support to the devices on the DOCSIS network. These applications use, for example, IPv4 and/or IPv6 as appropriate to the particular operator's deployment. The applications may be provided by one or more provisioning systems 146 and/or one or more Network Management Systems (NMS) 147.

The provisioning system(s) 146 and/or applications may include, for example, CM provisioning systems (e.g., discussed in *Data-Over-Cable Service Interface Specifications DOCSIS® 3.1: Cable Modem Operations Support System Interface Specification*, CABLE TELEVISION LABORATORIES, INC., CM-SP-CM-OSSIv3.1-I21-211022 (22 Oct. 2021) ("[CM-OSSIv3.1]") and/or *Data-Over-Cable Service Interface Specifications DOCSIS® 4.0: Cable Modem Operations Support System Interface Specification*, CABLE TELEVISION LABORATORIES, INC., CM-SP-CM-OSSIv4.0-I06-220302 (2 Mar. 2022) ("[CM-OSSIv4.0]"), the contents of each of which are hereby incorporated by reference in their entireties); command line interface applications, which can be vendor-proprietary or open source; time protocol server(s) that provides time protocol clients with the current time of day, date, time zone data, and/or the like; certificate revocation server(s) that provides certificate status; supported network configuration (NETCONF) client supports CMTS/Converged Cable Access Platform (CCAP) device provisioning; one or more DHCP servers to provide the CM 105 with initial configuration information, including the device network address(es) (e.g., IP address(es), and/or the like) when the CM 105 boots and/or for other purposes; configuration file server(s) that is/are used to download configuration files to CMs 105 when they boot. Configuration files are in binary format and permit the configuration of the CM's 105 parameters; and/or software download server(s) that is/are used to download software upgrades to the CM 105.

The NMS 147 and/or applications may include, for example, a Simple Network Management Protocol (SNMP) manager that allows the operator to configure and monitor SNMP agents such as the CMTSs/CCAPs 145 and/or CMs 105; syslog server(s) that collect(s) messages pertaining to the operation of devices; and/or the Internet Protocol Detail Record (IPDR) collector server(s) allows the operator to collect bulk statistics in an efficient manner.

Figure 2:
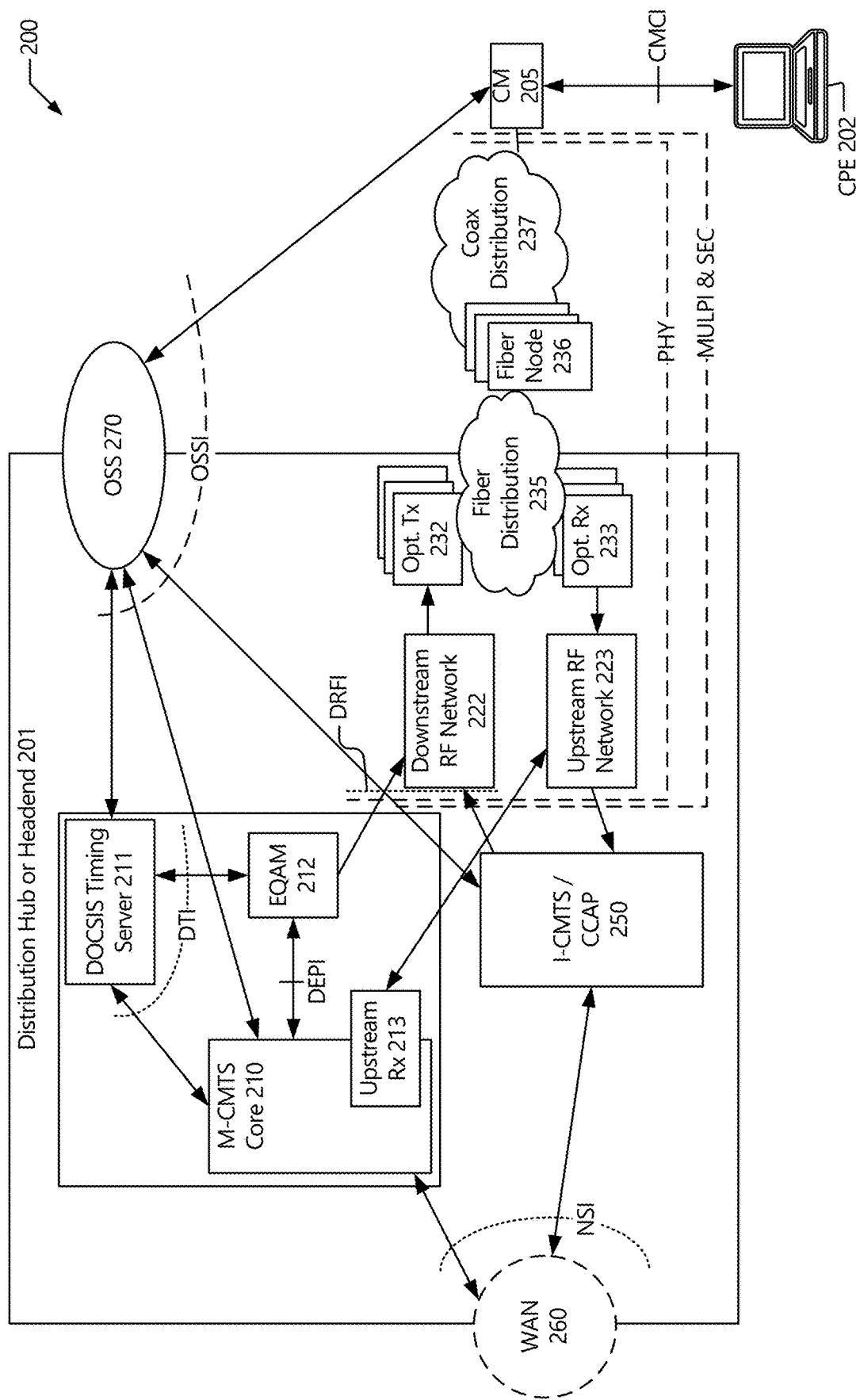
FIGS. 2 and 4 depict example data-over-cable reference architectures.

FIG. 2 shows a reference architecture 200 for data-over-cable services and related interfaces. The DOCSIS system 200 allows transparent bi-directional transfer of Internet Protocol (IP) traffic between the cable system headend 201 and customer locations over the HFC network. The CMTS is the central platform in enabling high speed Internet connectivity over the cable HFC network 150. The CMTS provides the MAC and PHY layer connection to the Cable Modem (CM) 205 (which may be the same or similar as the CM 105 of FIG. 1) at customer premise (e.g., a location where the customer premises equipment (CPE) 203 is located).

The reference architecture 200 includes a distribution hub or headend 201. A "headend" is a master facility for receiving signals (e.g., television/video and/or data signaling) for processing and distribution over a cable television system (e.g., reference architecture 200 or any other system discussed herein). A headend may be staffed or unstaffed and is typically surrounded by some type of security fencing. The headend 201 facility can be a housed in a standalone building including various electronic equipment used to receive and re-transmit the signaling over the local infrastructure, or the headend 201 can be implemented in a power-line communication (PLC) substation and/or in Internet communications networks (e.g., data centers and/or the like). The distribution hub/headend 201 includes a Modular CMTS (M-CMTS) core 210, a DOCSIS timing server 211, and an edge QAM modulator (EQAM) 212. A DOCSIS Timing Interface (DTI) is between the DOCSIS timing server 211 (also referred to as a "DTI server 211" or the like) and the M-CMTS core 210 and the EQAM 212. The DTI server 211 provides a common frequency of 10.24 MHz and a DOCSIS timestamp between the two MHAv1 elements.

A downstream external physical layer interface (DEPI) connects the M-CMTS core 210 with the EQAM 212. The M-CMTS core 210 is also connected to a wide area network (WAN) 260 via a network side interface (NSI). The DEPI supports sending the data from the CMTS core 210 to the EQAM 212. This allows the EQAM 212 to modulate the bits on to the wire for both downstream DOCSIS data as well as video data (e.g., MPEG video and/or the like), making the EQAM 212 universal (e.g., capable of handling both video and DOCSIS data as inputs). Additionally or alternatively, an upstream external physical layer interface (UEPI) may also be present between the M-CMTS core 210 and the EQAM 212.

The operations support system interface (OSSI) communicatively couples the operations support system (OSS) 270 with other elements of the reference architecture 200. Additional aspects of the OSSI and OSS 270 are discussed in *Data-Over-Cable Service Interface Specifications DOCSIS® 3.1: CCAP™ Operations Support System Interface Specification*, CABLE TELEVISION LABORATORIES, INC., CM-SP-CCAP-OSSIv3.1-I16-190917 (17 Sep. 2019) ("[CCAP-OSSIv3.1]") and *Data-Over-Cable Service Interface Specifications DOCSIS® 4.0: CCAP™ Operations Support System Interface Specification*, CABLE TELEVISION LABORATORIES, INC., CM-SP-CCAP-OSSIv4.0-I06-220302 (2 Mar. 2022) ("[CCAP-OSSIv4.0]"), the contents of each of which are hereby incorporated by reference in their entireties).

An upstream receiver (Rx) 213 of the M-CMTS core 210 communicatively couples the M-CMTS Core 210 with an upstream radiofrequency (RF) network 223. A converged cable access platform (CCAP)/integrated CMTS (I-CMTS) 250 is also communicatively coupled to the upstream RF network 223. A downstream RF interface (DRFI) communicatively couples the EQAM 212 with a downstream RF network 222, and also communicatively couples the CCAP/I-CMTS 250 with the downstream RF network 222. The RF networks 222, 223 are also communicatively coupled with the cable modem (CM) 205 via a physical layer interface (PHY) and a MAC & upper layer protocols interface (MULPI) & security interface (SEC).

The downstream RF network 222 conveys data to the CM 205 via one or more optical transmitter (Tx) 232, a fiber distribution network 235, one or more fiber nodes 236, and a coax distribution network 237. The CM 205 conveys data to the upstream RF network 223 via elements downstream RF network 237, 236, 235, and one or more optical $R_{xs}$ 233. The CM 205 conveys data to/from the CPE 203 (which may be the same or similar to the CPE 103 of FIG. 1) via a cable modem to CPE interface (CMCI). The CMCI may be any suitable interface such as, for example, USB, Ethernet, WiFi, and/or any other like communications protocols and/or RAT type such as any of those discussed herein.

Figure 3:
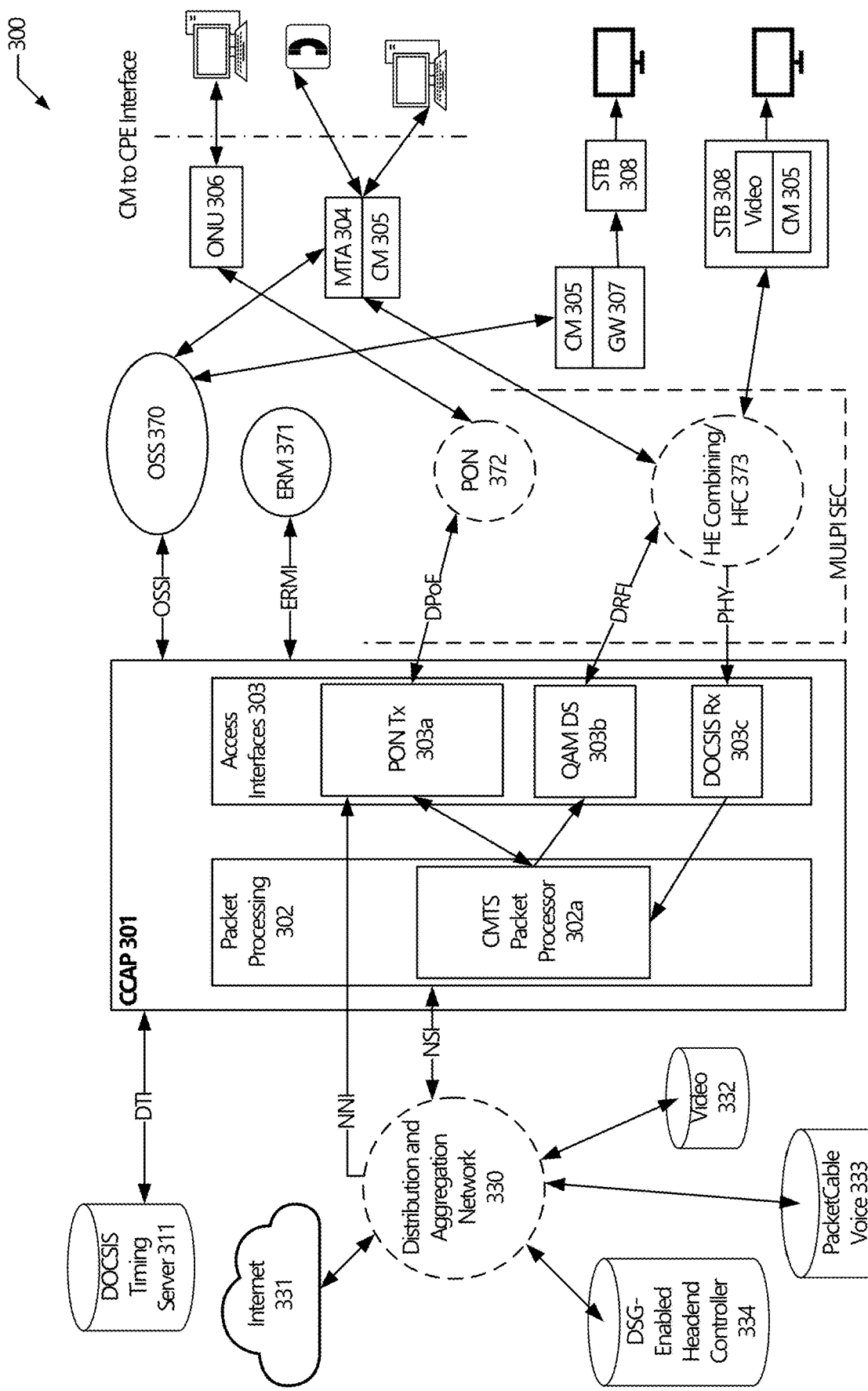
FIG. 3 depicts an example CCAP interface reference architecture.

FIG. 3 shows an example CCAP Interface Reference Architecture 300 including the interfaces used for the CCAP 301 including the OSSI between the CCAP 301 and the OSS 370. Within a CCAP implementation 301, logical interface connectivity is from the OSSI to the packet processing function 302 of the CCAP 301. This logical interface connection allows for the configuration and management of the CCAP infrastructure. The packet processing function 302 receives its OSS content through the NSI, including, in some implementations, at least 160 Gbps of data on one or more physical interfaces. The packet processing function 302 includes a CMTS packet process 302*a*. CCAP 301

The CCAP 301 performs DOCSIS functions in a same or similar manner as a traditional CMTS platform. In addition, the CCAP 301 includes various access interfaces 303, for example passive optical network (PON) transmitter (Tx) 303*a*, QAM downstream modulator 303*b*, and DOCSIS receiver (Rx) 303*c*. For example, PON 372 can be deployed on the CCAP 301 to manage commercial high-speed internet (HIS) traffic. FIG. 3 illustrates how HSI streams flow through the CCAP 301 and the network to DOCSIS and PON devices and back. The CCAP 301 receives Internet content via the internet 331, video data 332, PacketCable voice data 333, and DOCSIS set-top Gateway (DSG) data of a DSG-Enabled Headend Controller 334 through the NSI from a distribution and aggregation network 330 via one or more physical interfaces. Individual Network to Network Interfaces (NNIs) may be provided for HSI business services using a 10G EPON interface in some implementations.

The CCAP 301 has many of the functions of a traditional provider edge (PE) router. Since the CCAP 301 supports multiple protocols, it also cannot be purely IP. In particular, the growth of Ethernet services (provided directly to customers) and use of Ethernet for managing logical IP networks (IP-VPNs), whether in-house or for customers, necessitates the usage of pseudo-wire transports over Multiprotocol Label Switching (MPLS).

The CCAP 301 performs some or all of the MAC-layer functionality and/or some or all the initialization and operational DOCSIS-related processes. The MAC-layer functionality includes signaling functions, downstream bandwidth scheduling, and DOCSIS framing. The CCAP 301 creates the DOCSIS QAMs 303*b* for the service groups the CCAP 301 serves, and these QAMs 303*b* are modulated and output as either downstream QAMs 303*b* on the downstream line cards in the CCAP 301, or QPSK on the downstream PON interfaces 303*a*. The CCAP 301 delivers data and voice per the DOCSIS, PacketCable, and/or PacketCable Multimedia (PCMM) specifications.

The edge resource manager (ERM) 371 functions in a similar way to the MPEG video session setup: to acquire the necessary RF/QAM bandwidth and the CCAP 301 resources to transport the stream to the service group. The outputs of the CCAP 301 are combined with legacy OOB data (and possibly legacy analog video) in the headend combining network and are distributed through the HFC network 373 or PON network 372, where they are received by one or more of the following devices: the multimedia terminal adapter (MTA) 304/CM 305 provides PacketCable voice services and DOCSIS HSI for telephony and personal computing applications; the optical network unit (ONU) 306 terminates the PON traffic for business services applications; the gateway (GW) 307 receives video via a suitable transport and/or network protocol (e.g., MPEG Transport and/or IP protocol, and/or any other suitable protocol(s) such as any of those discussed herein) for distribution within the home; and set-top boxes (STBs) 308 native QAM video and command and control data (either through DOCSIS or legacy OOB). The CMs 305 may be the same or similar as the CM 205 of FIG. 2 and/or the CM 105 of FIG. 1, and the MTA 304, ONU 306, GW 307, and STBs 308 may correspond to the CPE devices 103 of FIG. 1 and/or the CPE 203 of FIG. 2. Ustream DOCSIS HSI and PacketCable voice traffic travel through the HFC or EPON and are received by either QAM upstream receivers or PON transceivers. A DTI server 311 may be used to provide a common clock reference to synchronize to other TDM clock domains via a DTI between the DTI server 311 and the CCAP 301.

Additional details about the CCAP data reference architecture 300 are discussed in *Converged Cable Access Platform Architecture Technical Report*, CABLE TELEVISION LABORATORIES, INC., CM-TR-CCAP-V03-120511 (11 May 2012) ("[CCAP TR]"), which is hereby incorporated by reference in its entirety.

Figure 4:
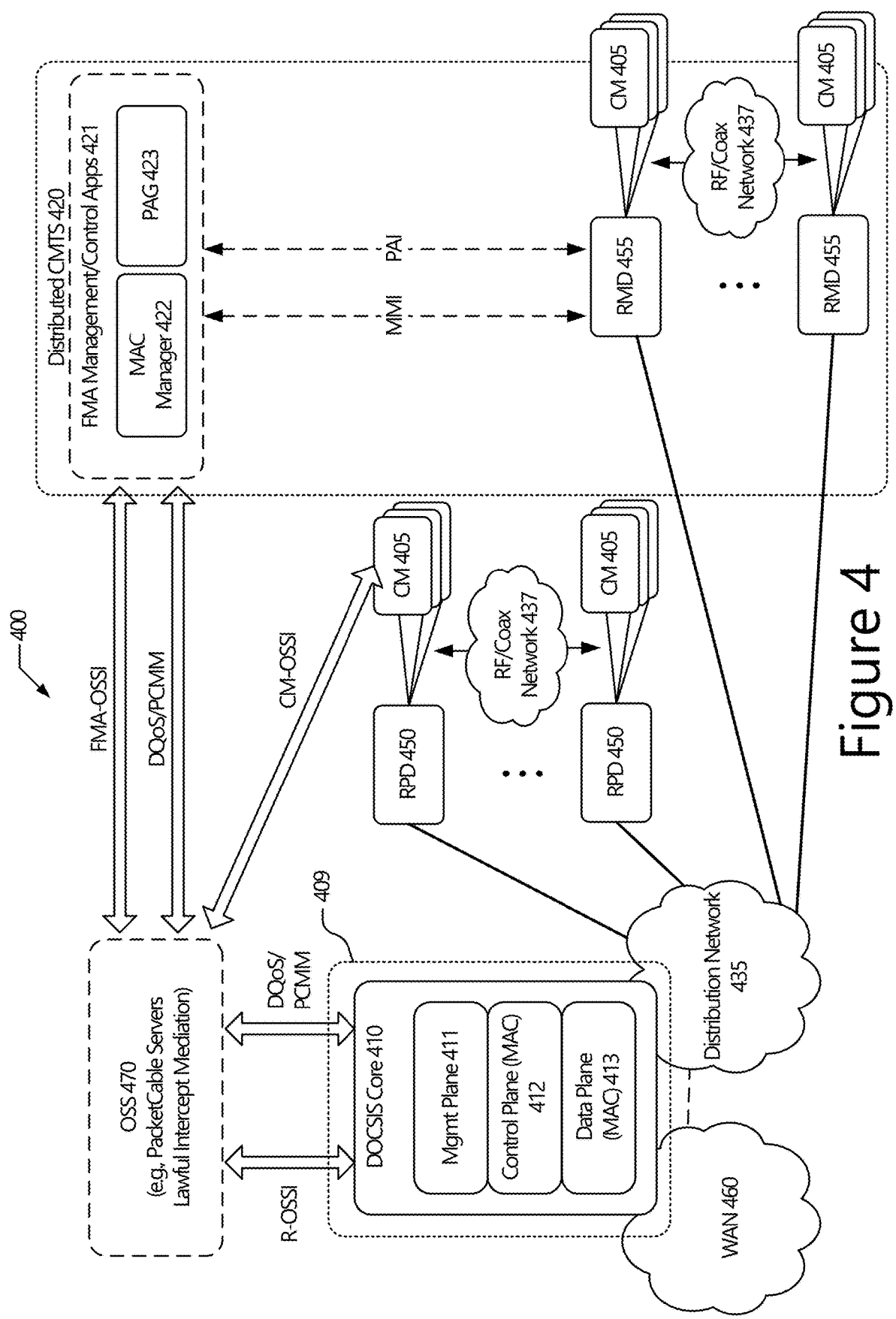

FIG. 4 shows example DOCSIS distributed CMTS/CCAP reference architecture 400. The OSS 470 in this example includes various compute nodes such as PacketCable Servers, lawful intercept mediation servers, and/or the like. Additionally or alternatively, the OSS 470 may be the same or similar as the OSS 270 of FIG. 2. The OSS 470 communicates with the DOCSIS core 410 over a remote OSSI (R-OSSI) (see e.g., [RPHY-OSSI]) and/or a dynamic QoS (DQoS)/PCMM interface (see e.g., [PCMM]). Additionally, the OSS 470 communicates with the distributed CMTS (D-CMTS) 420 via an FMA-OSSI (see e.g., [FMA-OSSI], [FMASYS]) and a DQoS/PCMM interface (see e.g.,

[PCMM]), and also communicates with individual CMs 405 via the CM-OSSI (see e.g., [CM-OSSIv3.1], [CM-OSSIv4.0]).

In a Remote PHY (R-PHY) architecture, an integrated CCAP (I-CCAP) is separated into two distinct components including a CCAP core 409 and a remote PHY device (RPD) 450 (also referred to as a "remote PHY node" or "RPN 450"). The CCAP core 409 contains both a CMTS core for DOCSIS (e.g., DOCSIS core 410 in FIG. 4, CCAP 301 and/or CMTS packet process 302*a* of FIG. 3, and/or M-CMTS 210 of FIG. 2) and an EQAM core for video and/or other data (e.g., EQAM 212 of FIG. 2; not shown by FIG. 4). The EQAM core contains all the video processing functions that an EQAM 212 provides and/or the like. The CMTS core 410 contains the DOCSIS MAC protocols layers/entities (e.g., control-plane entity/layer 412 and a data plane entity/layer 413) and the upper layer DOCSIS protocols (e.g., management (mgmt) plane entity/layer 411). This includes all signaling functions, downstream and upstream bandwidth scheduling, and DOCSIS framing. The DOCSIS functionality of the CMTS core 410 is defined by [MULPIv3.1], [MULPIv4.0].

The DOCSIS core 410 includes a management (mgmt) plane entity/layer 411, a control-plane entity/layer 412, and a data plane entity/layer 413. The control-plane entity/layer 412 and/or the data plane entity/layer 413 may be MAC layer elements. Additionally, the DOCSIS core 410 is part of, or communicatively coupled with a WAN 460 (which may be the same or similar as the WAN 260 of FIG. 2) and a distribution network 435 (which may be the same or similar as the fiber distribution network 235 and/or the coax distribution network 237 of FIG. 2). Furthermore, the DOCSIS core 410 communicates with one or more Remote MAC-PHY devices (RMDs) 455 and one or more RPDs 450 via the WAN 460 and/or the distribution network 435. Individual RMDs 455 and individuals RPDs 450 communicate with respective sets of CMs 405 via one or more RF/coax networks 437 (which may be the same or similar as the fiber distribution network 235 and/or the coax distribution network 237 of FIG. 2). Individual CMs 405 may be the same or similar as the CM 105 of FIG. 1, CM 205 of FIG. 2, and/or CMs 305 of FIG. 3.

An RPD 450 is a device in the network that implements the Remote-PHY (R-PHY) specification to provide conversion from digital transport (e.g., Ethernet and/or the like) to analog radiofrequency (RF) transport. Additionally or alternatively, an RPD 450 is a component that has a network interface on one side and an RF interface on another side. The RPD 450 provides Layer 1 (L1) PHY conversion, Layer 2 (L2) MAC conversion, and Layer 3 (L3) pseudowire (PW) support. The RPD RF output may be RF combined with other overlay services such as analog or digital video services. The RPD 450 contains mainly PHY related circuitry, such as RF module(s) (RFM(s)), downstream QAM modulators, upstream QAM demodulators, and PW logic to connect to the CCAP core 409. Together, the CCAP core 409 and the R-PHY entities are the functional equivalent of an I-CMTS (e.g., I-CMTS 250 of FIG. 2), but with different packaging. Additionally or alternatively, the RPD 450 is a physical layer converter whose functions include the following: converting downstream DOCSIS traffic, video (e.g., MPEG and/or the like), and/or OOB signals received from the CCAP core 409 over a digital medium (e.g., Ethernet, PON, USB, and/or the like) to analog for transmission over RF or linear optics; and converting upstream DOCSIS traffic and/or OOB signals received from an analog medium (e.g., RF or linear optics) to digital for transmission over a suitable interface (e.g., Ethernet, PON, USB, and/or the like) to the CCAP core 409.

In some implementations, a remote DEPI (R-DEPI) serves as the downstream interface between the CCAP core 409 and an RPD 450. More specifically, the R-DEPI is a PW (e.g., an IP pseudowire or the like) between the MAC and PHY in an MHAv2 system that contains both a data path for DOCSIS frames, any video packets, OOB packets, and control path signaling for setting up, maintaining, and tearing down sessions. MHAv1 used the MPT (MPEG-TS) encapsulation method exclusively. MHAv2 retains the original MPT encapsulation for backward compatibility but adds a new MPEG encapsulation type called Multi-channel MPEG (MCM). MHAv2 also requires the Packet Streaming Protocol (PSP) mode for expansion of new services such as, for example, DOCSIS 3.1 and/or DOCSIS4.0. In some implementations, a same DTI server 211 is not required since the downstream and upstream PHYs are co-located in the RPD 450. A different timing solution referred to as remote DTI (R-DTI) is used to provide timing services for functions such as DOCSIS scheduling. In some implementations, a remote UEPI (R-UEPI) provides an upstream interface between the CCAP core 409 and an RPD 450. Like R-DEPI, the R-UEPI is an IP PW between the PHY and MAC in an MHAv2 system that contains both a data path for DOCSIS frames, and a control path for setting up, maintaining, and tearing down sessions.

An RMD 455 is a device in the network that implements Flexible MAC Architecture (FMA) technology and/or operates according to FMA specifications to provide conversion from digital transport (e.g., Ethernet, PON, and/or the like) to analog RF transport and is a kind of MAC-network element (NE). An FMA provides a modular headend, which supports an all-digital HFC plant. In an FMA-based digital HFC plant, the fiber portion utilizes a suitable baseband network transmission technology such as Ethernet, Ethernet PON (EPON), gigabit PON (GPON), and/or any L2 technology that would support a fiber-based L1 technology. FMA specifies interoperable management, control and data plane interfaces on the digital fiber between the core components and a series of MAC-NEs of which there are several types. Types of MAC-NE devices are typically identified by their location in the network. A common location for a MAC-NE is at an optical node device at the junction of the fiber and coaxial plants. An appliance containing such a component is typically referred to as an RMN. Another location for an FMA network device is in the HFC hub or headend. An appliance containing such components is referred to as a Remote MACPHY Shelf (RMS). Although the terms "RMN" and "RMS" refer to different concepts, these terms may be interchangeable with the term "RMD" (e.g., RMDs 455 in FIG. 4) and/or can be referred to as a "MAC-NE", which is a class of device providing services over the coaxial plant.

MAC-NEs are network devices in one of two classes: physical network functions (PNFs) or virtual network functions (VNFs). In various implementations, FMA MAC-NEs can be split or classified into four MAC-NE device types, with three in the PNF class and one in the VNF class. A PNF is a purpose-built device built to perform a specific network function. One example is an RMD 455 that performs DOCSIS MAC and/or PHY functions. Another example PNFs include a physical core (pCore). PNFs can also take the form of chassis-based hardware found in cable operator facilities, which could be NEs of 1 rack unit (1RU) or larger. MAC-NEs could also take the form of VNFs, such as a virtual core (vCore). VNF NEs are usually implemented using common off-the-shelf servers. The MAC functions at minimum could include higher layer functions and could also operate on off-the-shelf servers found in data centers. Such a software based MAC function is also referred to as a "virtualized CMTS" or "vCMTS" (see e.g., FIG. 7 discussed infra).

The RMD 455 has a digital optical network interface on one side and an RF interface on the other side (not shown). The RMD 455 provides a PHY for all services and provides the DOCSIS MAC and upper layers for high-speed data, VoIP, and IP video services and for native transport and PW capabilities for CIN transport between Core Access Devices and the RMD. The RMD 455 also provides OOB translation to and from the network-side digital encapsulation and drop-side RF. The RMD RF output could be RF combined with other overlay services such as analog or digital video services.

The distributed CMTS 420 includes various FMA management and control applications (apps) 421 including a MAC manager 422 and a PacketCable aggregator (PAG) 423. The MAC manager 422 is a functional entity that uses FMA management plane protocols to manage one or more MAC-NEs (e.g., one or more RMD 455). This management may involve communicating messages with one or more RMD 455 via respective MAC manager interfaces (MMIs). The PAG 423 is a functional entity that supports Packet-Cable and the PacketCable Multimedia back-office element to MAC-NE scalability. In MHAv2, this scale is assumed to be handled by the CMTS/DOCSIS core 420/410, which translates PacketCable and PacketCable Multimedia northbound interfaces to and from associated DOCSIS control-plane signaling interfaces. The PAG 423 may also communicate with one or more RMD 455 via respective PacketCable aggregator interfaces (PAIS).

Additional aspects of the reference architecture 400 are discussed in *Data-Over-Cable Service Interface Specifications DCA: Distributed CLAP Architectures Overview Technical Report*, CABLE TELEVISION LABORATORIES, INC., CM-TR-DCA-V01-150908 (8 Sep. 2015) ("[TR-DCA-V01]"), *Data-Over-Cable Service Interface Specifications MHAv2: Remote PHY Specification*, CABLE TELEVISION LABORATORIES, INC., CM-SP-R-PHY-I17-220531 (31 May 2022) ("[RPHY]"), *Data-Over-Cable Service Interface Specifications MHAv2: Remote PHY OSS Interface Specification*, CABLE TELEVISION LABORATORIES, INC., CM-SP-R-OSSI-I17-220128 (28 Jan. 2022) ("[RPHY-OSSI]"), *PacketCable™ Multimedia Specification*, CABLE TELEVISION LABORATORIES, INC., PKT-SP-MM-C01-191120 (20 Nov. 2019) ("[PCMM]"), *Data-Over-Cable Service Interface Specifications MHAv2: Remote Downstream External PHY Interface Specification*, CABLE TELEVISION LABORATORIES, INC., CM-SP-R-DEPI-I16-210804 (4 Aug. 2021) ("[RDEPI]"), *Data-Over-Cable Service Interface Specifications Flexible MAC Architecture: Flexible MAC Architecture (FMA) System Specification*, CABLE TELEVISION LABORATORIES, INC., CM-SP-FMA-SYS-I03-220126 (26 Jan. 2022) ("[FMASYS]"), and *Data-Over-Cable Service Interface Specifications DCA—FMA: FMA OSS Interface Specification*, CABLE TELEVISION LABORATORIES, INC., CM-SP-FMA-OSSI-I02-220602 (2 Jun. 2022) ("[FMA-OSSI]"), the contents of each of which are hereby incorporated by reference in their entireties.

Figure 5:
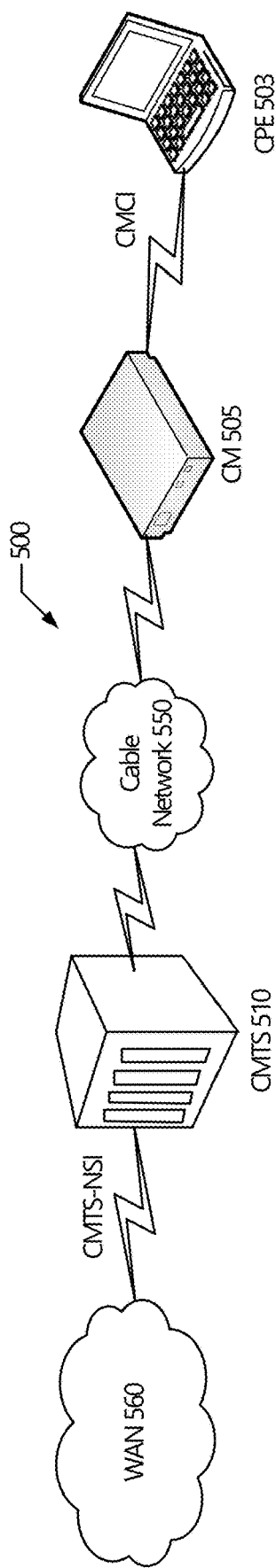
FIG. 5 depicts transparent IP traffic through a data-over-cable system.

FIG. 5 depicts an example data-over-cable system 500 showing transparent IP traffic through the system 500. Here, the WAN 560 is connected to the CMTS 510 via a Cable Modem Termination System-Network Side Interface (CMTS-NSI) (see e.g., *Data-Over-Cable Service Interface Specifications: Cable Modem Termination System-Network Side Interface Specification*, CABLE TELEVISION LABORATORIES, INC., SP-CMTS-NSI-C01-171207 (7 Dec. 2017) ("[CMTS-NSI]"), the contents of which are hereby incorporated by reference in its entirety). Additionally, the CPE 503 is communicatively coupled to the CM 505 via a CMCI (which may be the same or similar as the CMCI discussed previously with respect to FIG. 2). In this example, the WAN 560 may be the same or similar as the WAN 260 of FIG. 2 and/or the WAN 460 of FIG. 4; the CMTS 510 may be the same or similar as the CMTS 110 of FIG. 1, M-CMTS core 210 and/or I-CMTS 250 of FIG. 2, CCAP 301 and/or CMTS packet process 302*a* of FIG. 3, and/or D-CMTS 420 and/or the DOCSIS CMTS core 410 of FIG. 4; the cable network 550 may be the same or similar as the HFC network 150 of FIG. 1, HFC network 373 and/or PON network 372 of FIG. 3, and/or some other network(s) discussed herein; the CM 505 may be the same or similar as the CM 105 of FIG. 1, CM 205 of FIG. 2, CMs 305 of FIG. 3, and/or CMs 405 of FIG. 4; and the CPE 503 may be the same or similar as the CPE devices 103 of FIG. 1, CPE 203 of FIG. 2, the MTA 304, ONU 306, GW 307, and/or STBs 308 of FIG. 3. As cable operators have widely deployed high-speed data services on cable television systems, the demand for bandwidth has increased. Additionally, networks have scaled to such a degree that IPv4 address constraints are becoming a burden on network operations. To this end, new features have been added to DOCSIS system 500 for the purpose of increasing channel capacity, enhancing network security, expanding addressability of network elements, and deploying new service offerings. The DOCSIS system 500 allows transparent bi-directional transfer of IP traffic, between the cable system head-end and customer locations, over an all-coaxial or HFC cable network 550.

Figure 6:
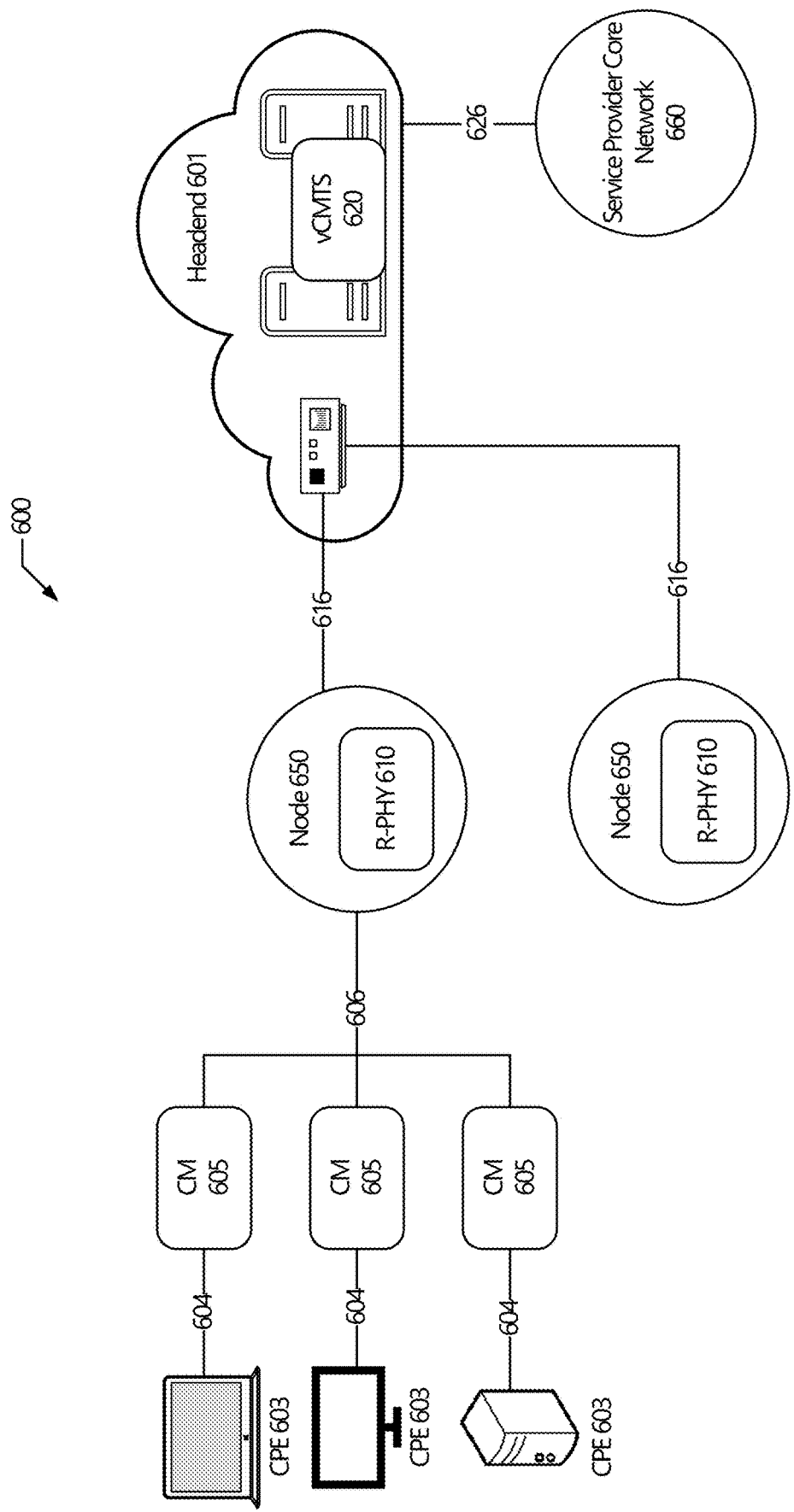
FIG. 6 depicts an example virtualized cable modem termination system (vCMTS) architecture.

FIG. 6 depicts an example vCMTS architecture 600. The vCMTS architecture 600 includes individual CPEs 603 (which may be the same or similar as the CPE devices 103 of FIG. 1, CPE 203 of FIG. 2, the MTA 304, ONU 306, GW 307, STBs 308 of FIG. 3, and/or the CPE 503 of FIG. 5) connected to a respective CM 605 (which may be the same or similar as the CM 105 of FIG. 1, CM 205 of FIG. 2, CMs 305 of FIG. 3, CMs 405 of FIG. 4, and/or the CM 505 of FIG. 5) via respective CMCIs 604 (which may be the same or similar as the CMCI of FIGS. 2 and/or 5).

The cable industry's need to deliver higher bandwidth, support multiple access technologies, make better use of deployed fibre, and increase service delivery velocity is driving many operators to consider re-architecting the CMTS. One approach is to virtualize the CMTS as a virtualized CMTS (vCMTS) 620, which takes all the DOCSIS MAC and PHY features traditionally performed in a physical CMTS appliance and splits them across two main network elements including remote physical layer entities (R-PHY) 610 in respective nodes 650 and a vCMTS platform 620 located in a headend 601. In some implementations, the nodes 650 and/or R-PHYs 610 may be the same or similar as the RPDs 450 and/or the RMDs 455 of FIG. 4, and the headend 601 may be the same or similar as the distribution hub/headend 201 of FIG. 2. In this example, the CMs 605 are connected to one or more nodes 650 via respective interfaces 606, which may be RF interfaces, coax (cable) interfaces, Ethernet, fiber interfaces, optical interfaces, and/or some other suitable interface such as any of those discussed herein. Additionally, the nodes 650 are connected to the headend 601 and/or the vCMTS platform 620 via respective interfaces 616, and the headend 601 and/or the vCMTS platform 620 is communicatively coupled to a service provider core network 660 via an interface 626. As examples, the interfaces 616, 626 can be RF interfaces, coax (cable) interfaces, Ethernet (e.g., 10G Ethernet and/or the like), fiber interfaces, optical interfaces, and/or some other suitable interface such as any of those discussed herein.

The vCMTS platform 620 is implemented as a set of virtual network functions (VNFs) running on one or more compute nodes. These VNFs execute the DOCSIS protocol functions from the MAC layer upwards including the OSS and business support systems (BSS) interfaces. In some implementations, software infrastructure for VNF orchestration, lifecycle management, real-time monitoring, and automated failure detection and recovery may also be operated by these VNFs and/or some other compute nodes or network functions. In some implementations, the vCMTS architecture 600 and/or the vCMTS platform 620, including the DOCSIS MAC data-plane (discussed infra), may operate on one or more suitable compute nodes and Data Plane Development Kit (DPDK) (see e.g., *Data Plane Development Kit (DPDK) Programmer's Guide*, version 22.07.0-rc1, https://doc.dpdk.org/guides-21.11/(accessed June 2022) ("[DPDK]"), the contents of which is hereby incorporated by reference in its entirety). Example vCMTS reference data-plane environments including vCMTS data-plane nodes and traffic generation nodes are shown by FIG. 7.

Figure 7:
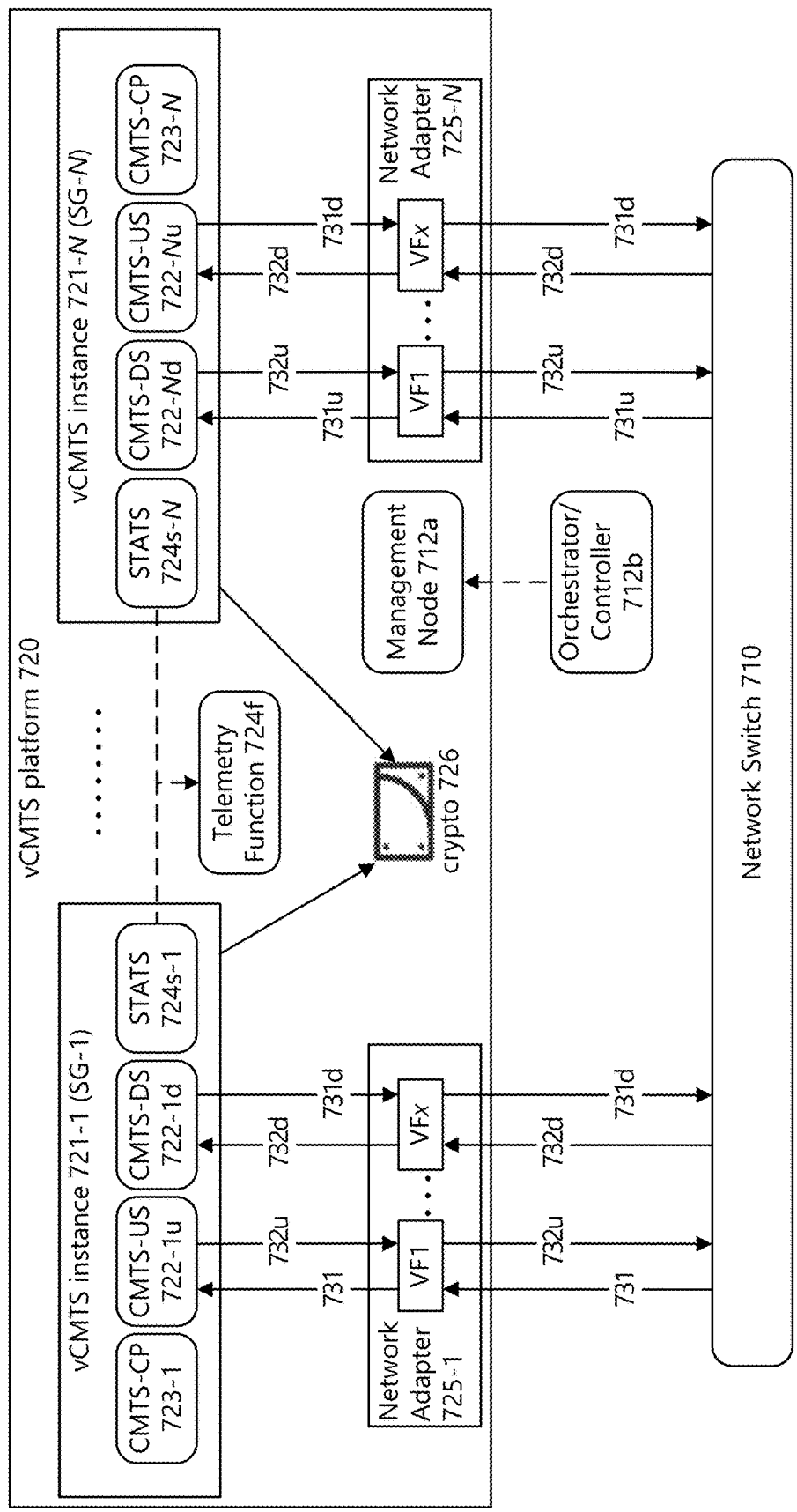
FIG. 7 depicts an example vCMTS platform.

FIG. 7 shows an example vCMTS environment 700 includes a vCMTS platform 720 (which may correspond to the vCMTS 620 of FIG. 6) and network switch (termination host) 710. The vCMTS platform 720 includes a set of vCMTS instances 721-1 to 721-N where N is a number (e.g., N=12), a set of network adapters 725-1 to 725-N, a telemetry function 724, cryptographic element (crypto) 726 (also referred to as "crypto acceleration circuitry 726" or the like), and a container node 712*a* that interacts with a container orchestrator/controller 712 for resource management functions such as assignment of single root I/O virtualization (SR-IOV) interfaces for the NICs and/or cryptos 726. In some examples, the container orchestrator/controller 712 may be the same or similar as the container-based orchestration system 1741 of FIG. 17. In the example of FIG. 7, there may be a same number of containers 721, network adapters 725, virtual functions (VFs), and/or other elements, however, in other examples/implementations, the number of containers 721, network adapters 725, VFs, and/or other elements may be different from one another. Additionally or alternatively, there may be any number of telemetry functions 724 and/or cryptos 726 than shown by FIG. 7.

The network switch 710 can be embodied using any suitable network appliance or networking hardware that connects devices (e.g., vCMTS platform 720) to a network using, for example, packet switching techniques, to receive and forward data to/from destination devices. The network switch 710 can include one or more interface types to connect devices over one or more networks including, for example, Ethernet ([IEEE8023]), Fibre Channel, RapidIO, ATM, ITU-T G.hn, [IEEE80211], and/or any other suitable access technology such as any of those discussed herein. The network switch 710 can have any suitable form factor such as, for example, stand-alone, desktop, rack-mounted, wiring-closet mounted, DIN rail mounted, floor box, and/or the like. In some examples, the switch 710 can be implemented using commercial off-the-shelf (COTS) equipment such as a 100G Ethernet switch and/or the like. In some examples, the switch 710 can be implemented using network interface controllers (NICs), routers, switches, gateway devices, network appliances, load balancers, firewall appliances, data processing units (DPUs), and/or other like network elements or appliances. The NF implementations can include any of the HW and/or SW elements discussed infra with respect to the network interface 1968 and/or acceleration circuitry 1964 of FIG. 19. In one example, the switch 710 is implemented using a SmartNIC (e.g., Intel® FPGA SmartNIC N6000-PL Platform, Intel® FPGA PAC N3000, Silicom FPGA SmartNIC N5010, NVIDIA® ConnectX, NVIDIA® Mellanox® Innova™). In another example, the switch 710 is implemented using a DPU such as an Intel® IPU (e.g., Intel® IPU C5000X-PL Platform, Intel® IPU Platform Codenamed Oak Springs Canyon, Intel® IPU SoC codenamed mount evans, or the like), NVIDIA® BlueField® DPU, Fungible DPU™, Broadcom® Stingray™, Kalray MPPA® DPUs, Marvell® OCTEON™ and ARMADA®, and/or the like. In another example, the switch 710 is implemented using a switch such as a platform including an Intelligent Fabric Processor (IFP) (e.g., Intel® Tofino™ IFP and/or the like) such as Intel® Tofino™ series of P4-programmable Ethernet switch ASICs and/or the like, a smart edge switch (e.g., NVIDIA® Spectrum®, Broadcom® Trident 4™, Intel® Omni-Path (OP) Edge Switch, Intel® OP Host Fabric Interface, Intel® OP Director Class Switches, and/or the like). In any of these examples, the switch 710 can be built using the Infrastructure Programmer Development Kit (IPDK) (see e.g., IPDK Documentation, https://ipdk.io/documentation/), Open Computing Language (OpenCL), CUDA, Open Programmable Acceleration Engine (OPAE) API, and/or some other suitable framework such as any of those discussed herein. Additionally or alternatively, the switch 710 can be implemented using SW elements such as, for example, protocol stack layers, network/storage stack elements on a DPU, Software-Defined Networking (SDN) switches, network function virtualization (NFV) elements and/or virtualized network function (VNF), an in-server library, a caching agent of a message broker framework (e.g., an MPX cache agent in the ActiveMQ MPX publish/subscribe messaging framework and/or the like), a user agent caching mechanism (e.g., browser cache or the like), a web cache or CDN cache mechanism (e.g., cache servers, intermediary caching proxies, and/or the like).

The vCMTS environment 700 is an example of how a monolithic CMTS may be decomposed into multiple vCMTS instances 721 (e.g., one per cable service group (SG)) and each instance 721 can be decomposed into various virtualization containers running distinct functional parts. This is based on the cloud concept of microservices, which enables optimum extensibility and resilience while simplifying the maintenance and upgradability of network function deployments. Each vCMTS instance 721 breaks-up or splits the DOCSIS MAC functionality into four categories including: downstream (DS) data plane, upstream (US) data plane, control-plane (CP), and system management. Each vCMTS instance 721 is, or is hosted by, a container or user-level virtualization technology (e.g., Docker containers, Kubernetes, and the like), and each vCMTS instance 721 hosts a CMTS DS node (CMTS-DS) 722*d* (including CMTS-DS 722-1*d* to CMTS-DS 722-Nd), a CMTS US node (CMTS-US) 722*u* (including CMTS-DS 722-1*u* to CMTS-DS 722-Nu), a CMTS CP node (CMTS-CP) 723 (including CMTS-DS 723-1 to CMTS-DS 723-N), and a statistics function (stats) 724 (including stats 724-1 to stats 724-N). The CMTS 722*d* and CMTS-US 722*u* (collectively referred to as "CMTS 722") are DOCSIS MAC upstream and downstream data-plane processors, respectively (e.g., a RPD 450 and/or RMD 455) for an individual cable service group (SG) (e.g., SG-1 to SG-N in FIG. 7) and handle subscriber traffic for that SG, which covers a group of cable subscribers in a particular geographical area. For example, each CMTS 722 can operate or perform various tasks/functions according to the example downstream DOCSIS MAC data-plane pipeline 900 of FIG. 9 and/or DOCIS filtering according to FIGS. 10-14 discussed infra).

The CMTS-CPs 723 handle various control-plane functions for their respective SG/vCMTS instance 721. These control-plane functions can include, for example, provisioning operational configurations during initialization and/or registration procedures, traffic mapping and/or network address translation, performing device discover and/or session establishment procedures, and/or other like CP functions. Each CMTS-CP 723 can be configured through a suitable configuration file (e.g., in XML, JSON, or some other suitable format) containing subscriber CM information. DOCSIS upstream scheduler instances (not shown by FIG. 7) may also be configured to grant upstream traffic bandwidth by the vCMTS 720. The CMTSs 722 communicate data to/from individual virtual functions (VFs) in the network adapters 725 via upstream interface(s) 731$u$ and 732$u$ between the CMTS-US 722 and the network switch 710 through one or more virtual functions (VFs), and downstream interface(s) 731$d$ and 732$d$ between the CMTS-DS 722 and the network switch 710 through one or more VFs. In some examples, the upstream interface 731$u$ may be a UEPI and the downstream interface 731$d$ may be a DEPI. Additionally or alternatively, the upstream interface 732$u$ and downstream interface 732$d$ may carry IP traffic, logical link control (LLC) traffic, and/or L2 tunneling protocol (L2TP) traffic (e.g., L2TPv2, L2TPv3, and/or the like). In some implementations, the VFs (including VF1 to VFx where x is a number) act as NIC Rx queues for buffering and/or processing upstream and downstream traffic. Various mappings of cores and VF's to SG nodes (vCMTS instances 721) are supported.

The telemetry function 724 can store packets/data and/or performance data (e.g., measurements, metrics, statistics, key performan indicators (KPIs), and/or the like), and/or other like data generated and/or otherwise provided by individual vCMTS instances 721. Here, the individual stats 724$s$ provide various metrics/measurements to the telemetry function 724$f$. To store the data/metrics, the vCMTS platform 720 can include any suitable combination of statistics collection software elements (e.g., stats 724$s$ and telemetry function 724$f$) and memory/storage circuitry such as any of those discussed herein. Additionally, the crypto 726 performs downstream data encryption for downstream data, and may perform upstream data decryption for upstream data.

In one example implementation, the vCMTS platform 720 is based on a server blade with dual Intel® Xeon® Platinum 8180 processors (2.5 GHz, 28 cores) with 12 memory modules (e.g., 12×8 GB DDR4 modules). In this example implementation, the set of network adapters 725 includes three Intel® Ethernet Converged Network Adapter X710-DA4 quad-port 10 GbE network interface cards (NICs). In this example implementation, the traffic generation platform 710 includes one or more Intel® Xeon® processors ES-2699 v4 (2.2 GHz, 22 cores) with 8 memory modules (e.g., 8×8 GB DDR4 modules), and three Intel® Ethernet Converged Network Adapter X710-DA4 quad-port 10 GbE NICs.

In another example implementation, the vCMTS platform 720 includes one or more Intel® Xeon® Gold 6148 Dual Processors (2.4 GHz, 20 cores) with 12 memory modules (e.g., 12×8 GB DDR4 modules). In this example implementation, the set of network adapters 725 includes four Intel® Ethernet Network Adapter XXV710-DA2 25 GbE NICs or four Intel® Ethernet Network Adapter X710-DA4 10 GbE NICs. In this example implementation, the traffic generation platform 710 is implemented using a hardware platform that is the same or similar as platform used for the vCMTS platform 720.

In another example implementation, the vCMTS platform 720 includes one or more Intel® Xeon® Gold 6252N Dual Processors (2.3 GHz, 24 Cores) with 12 memory modules (e.g., 12×8 GB DDR4 modules). In this example implementation, the set of network adapters 725 includes two Intel® Ethernet Network Adaptor E810 100 GbE (×16 PCI slots), four Intel® Ethernet Network Adapter XXV710-DA2 25 GbE NICs, four Intel® Ethernet Network Adapter X710-DA4 10 GbE NICs, or two Intel® Ethernet Converged Network Adapter 810 100 GbE (per CPU) NICs. Additional NICs may be used if additional PCIe slots are available and/or a combination of any of the aforementioned NICs may be used. In this example implementation, the traffic generation platform 710 is implemented using a hardware platform that is the same or similar as platform used for the vCMTS platform 720.

In another example implementation, the vCMTS platform 720 is based on a 2U server with one or more Intel® Xeon® 6338N scalable processors (2.2 GHz, 32 cores) with 16 memory modules (e.g., 16×8 GB DDR4 modules). In this example implementation, the set of network adapters 725 includes two Intel® Ethernet Network Adaptor E810 100 GbE (×16 PCI slots), four Intel® Ethernet Network Adapter XXV710-DA2 25 GbE NICs, or four Intel® Ethernet Network Adapter X710-DA4 10 GbE NICs. Additional NICs may be used if additional PCIe slots are available and/or a combination of any of the aforementioned NICs may be used. In this example implementation, the traffic generation platform 710 is implemented using a hardware platform that is the same or similar as platform used for the vCMTS platform 720. Additionally or alternatively, the vCMTS platform 720 and the traffic generation platform 710 can include power management circuitry to reduces power-consumption of processor cores during relatively quiet network periods.

In other example implementations, other compute nodes (e.g., servers) based on other Intel® Xeon® scalable processors and/or Xeon® D processors with different core-counts can also be used. Additionally or alternatively, Intel® 710 10G quad-port or 25G dual-port NICs can be used, and/or multiple NICs per processor platform can be used if sufficient I/O slots are available on the platform. In any of the aforementioned example implementations, the crypto 726 is implemented using one or more (e.g., 2) Intel® QuickAssist Technology (QAT) adapter 8970 cards (100 Gbps, ×16 PCI) and/or Intel® QAT adapter 8960 cards (50 Gbps). Additionally or alternatively, the traffic generation platform 710 can include the same or similar crypto elements as the crypto 726. In any of the aforementioned example implementations, the vCMTS platform 720 and/or the can also include suitable storage circuitry such as an Intel® SSD DC S3520 Series (480G), a Seagate SATA HDD, and/or the like. In some example implementations, the traffic generation platform 710 can utilize the same or different platforms as discussed previously for the vCMTS platform 720.

The software infrastructure of the vCMTS environment 700 utilizes a suitable virtualization and/or containerization framework to host DOCSIS MAC processing for individual vCMTS instances 721, allowing them to be instantiated and scaled independently. In these implementations, the vCMTS platform 720 is orchestrated and/or managed by orchestrator/controller 712$b$. The orchestrator/controller 712$b$ interacts with a management node 712$a$ to automate the deployment, scaling, and operational functions associated with virtualization containers (e.g., vCMTS instances 721). The orchestrator/controller 712b and/or management node 712a can perform various infrastructure management functions such as processor core management, assignment of SR-IOV interfaces for NIC's 725 and crypto elements 726. Although the orchestrator/controller 712 is shown as being implemented or operated outside of the vCMTS platform 720, in other implementations, the orchestrator/controller 712 can be implemented or operated by the vCMTS platform 720. Examples of the virtualization/containerization frameworks that can be used include Docker®, Kubernetes®, containerd, Google® Container Engine, and/or any of the other container/virtualization technologies discussed herein, or combination(s) thereof. In some implementations, each SG instance 721 is pinned to a single, isolated processor core to maximumze performance determinism. In some implementations, the container framework can be disabled so that the CMTS data-plane instances 722 and telemetry processes 724f may run on bare-metal. In these implementations, process management is performed by a suitable platform-management tool (e.g., vcmts-pm or the like).

In one example implementation, Docker® containers are used to host DPDK-based vCMTS instances 721, and orchestrated (e.g., by container orchestrator 712b and/or manager 712a) by Docker® Swarm. In another example implementation, the vCMTS instances 721 are fully containerized and orchestrated (e.g., by container orchestrator 712b and/or manager 712a) using the Kubernetes® framework. In another example implementation, the vCMTS instances 721 are fully containerized using the Docker® framework and these containers are orchestrated (e.g., by container orchestrator 712b and/or manager 712a) using the Kubernetes® framework. Other combinations or container and orchestration technologies can be used in other implementations. Any of these example implementations can be combined with any of the aforementioned example implementations, and/or any other example implementation discussed herein.

In any of the aforementioned example implementations, the DOCSIS control-plane is simulated through a suitable configuration file (e.g., JSON, XML, and/or the like) containing subscriber CM information, and DOCSIS upstream scheduling is simulated through generation of UEPI-encapsulated CM DOCSIS stream segments using packet capture (PCAP) files. In any of the aforementioned example implementations, the CMTS 722 may be implemented and/or developed according to Intel® vCMTS reference data-plane (see e.g., *Intel® vCMTS Reference Dataplane v21.10.0 Install Guide*, Revision 001, INTEL CORP. (November 2021), the contents of which is hereby incorporated by reference in its entirety) and deployed on or under the Intel® Container Bare Metal Reference Architecture (BMRA), which is a reference cloud-native function (CNF) platform on which the Intel® reference vCMTS data-plane is deployed (see e.g., Cahill et al., *Container Bare Metal for 2nd Generation and 3rd Generation Intel® Xeon® Scalable Processor and Intel® Xeon® D Processor Reference Architecture User Guide*, Release V22.01, INTEL CORP. (3 Feb. 2022), the contents of which is hereby incorporated by reference in its entirety). In some implementations, the vCMTS can be deployed on a commercial/COTF CNF platform such as, for example, RedHat® OpenShift and/or the like. In any of the aforementioned example implementations, one or more telemetry functions 724 run in Docker® containers as a Daemonset under Kubernetes®. In these implementations, comprehensive set of vCMTS data-plane statistics and platform KPI's are gathered by the open-source Collected daemon and a Grafana dashboard is provided for visualization of these metrics via InfluxDB. Additionally or alternatively, the telemetry function 724 can be implemented using the open-source collected daemon and stored in a Prometheus time-series database. Additionally or alternatively, a Grafana dashboard can be provided for visualization of these metrics based on Prometheus queries.

1.2. DOCSIS Management Aspects

The International Telecommunication Union (ITU) Recommendation defines a set of management categories, referred to as the Fault, Configuration, Accounting, Performance and Security (FCAPS) model, represented by the individual management categories of Fault, Configuration, Accounting, Performance and Security. Telecommunications operators, including MSOs, commonly use this model to manage large networks of devices. Fault management seeks to identify, isolate, correct and record system faults. Configuration management modifies system configuration variables and collects configuration information. Accounting management collects usage statistics for subscribers, sets usage quotas and bills users according to their use of the system. Performance management focuses on the collection of performance metrics, analysis of these metrics and the setting of thresholds and rate limits. Security management encompasses identification and authorization of users and equipment, provides audit logs and alerting functions, as well as providing vulnerability assessment.

Configuration Management provides a set of network management functions that enables system configuration building and instantiating, installation and system turn up, network and device provisioning, auto-discovery, backup and restore, software download, status, and control (e.g., checking or changing the service state of an interface). Configuration management is concerned with adding, initializing, maintaining, and updating network elements, which in a DOCSIS environment, include CMs and CMTSs. Configuration management is concerned with network control via modifying operating parameters on network elements such as the CCAP. Configuration parameters could include both physical resources (e.g., an Ethernet interface) and logical objects (e.g., QoS parameters for a given service flow). While the network is in operation, Configuration Management is responsible for monitoring the configuration state and making changes in response to commands by a management system or some other network management function. For example, a performance management function may detect that response time is degrading due to a high number of uncorrected frames, and may issue a configuration management change to modify the modulation type from 16-QAM to QPSK. A fault management function may detect and isolate a fault and may issue a configuration change to mitigate or correct that fault DOCSIS 3.0 introduced a new methodology and approach for configuration management in the CCAP by moving away from using the SNMP interface to using the NETCONF protocol as described in [CM-OSSIv3.1], [CM-OSSIv4.0], [CCAP-OSSIv3.1], [CCAP-OSSIv4.0]. In addition to the NETCONF approach to modify the attribute values stored in the CCAP, vendor-specific methods such as a Command Line Interface (CLI) or an HTTP interface could be present. Irrespective of the method used, it is necessary to assure the data integrity as a result of changes performed using different interfaces. For example when the attribute value is modified using one management interface, this changed value is reported when that attribute is accessed from any of the other interfaces. When a change in the value of the attribute does not succeed, requesting the same change from another interface also results in failure (assuming the same level of access control for all those interfaces for the specific operation). If an event is generated as a result of making the change in one management interface, this is reported independent of how the change was initiated.

The CCAP configuration theory of operation. The CCAP combines the functionality of the EQAM (e.g., EQAM 212) with a CMTS. While these are distinct functions, the configuration of the CCAP will treat these functions in a consolidated way. To facilitate the configuration of such a complex and dense device, configuring the device may happen via the NETCONF protocol. Aspects of CCAP configuration include: standard YANG data model for configuration, with vendor-specific extensions for the inclusion of proprietary features; ability to configure a full set of standardized and vendor-proprietary configuration elements; ability to configure a partial set of standardized and vendor-proprietary configuration elements; and/or NETCONF options to manage the CCAP configuration. It is anticipated that the CCAP will contain only basic default settings in its startup configuration when initially powered on, and the operator will begin configuration of the CCAP via serial console connection. Basic default settings are vendor-specific. The following sections define standardized CCAP configuration mechanisms and processes. CCAP configuration and transport protocol requirements are discussed in [CM-OSSIv3.1], [CM-OSSIv4.0], [CCAP-OSSIv3.1], [CCAP-OSSIv4.0].

CCAP NETCONF-Based Configuration Theory of Operation. The CCAP may support configuration via the NETCONF protocol. In this case configuration instructions are sent using XML-encoded remote procedure calls (RPCs) in NETCONF protocol messages from a configuration management tool to the CCAP. The XML configuration data, representing the CCAP configuration, is conformant to the YANG modules specified in [CCAP-OSSIv3.1], [CCAP-OSSIv4.0]. An example use case for configuring a CCAP via NETCONF is depicted in FIG. 8.

Figure 8:
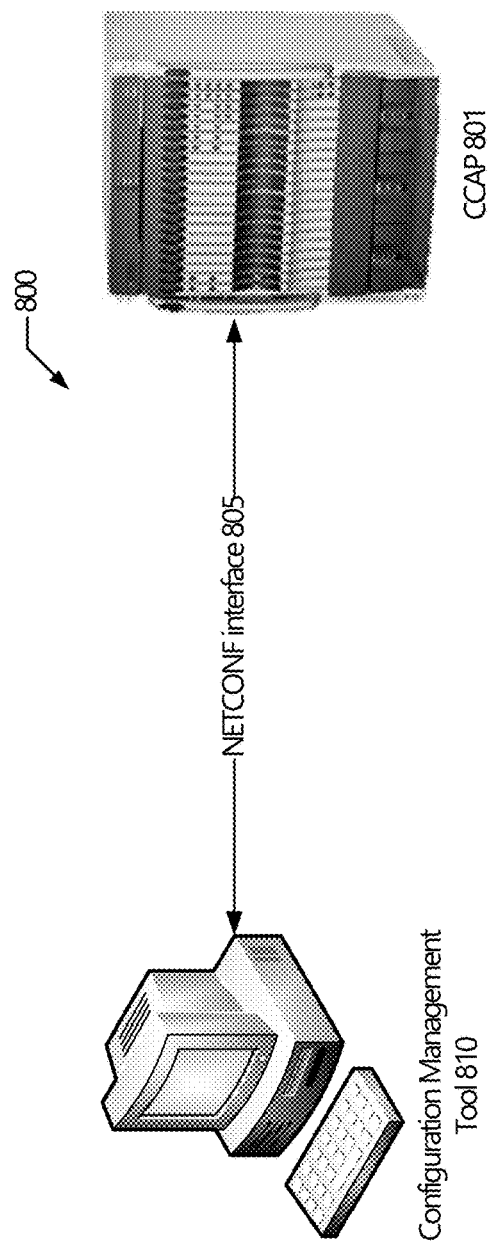
FIG. 8 depicts an example CCAP NETCONF configuration use case.

FIG. 8 shows an CCAP NETCONF-based Configuration use case 800, which takes place between a configuration management tool 810 and a CCAP 801 (which may be the same or similar as the CCAP core 409 and/or DOCSIS core 410 in FIG. 4, CCAP 301 of FIG. 3, and/or M-CMTS 210 of FIG. 2 and/or the like). At the configuration management tool 810, the configuration management process may be as follows: (1) establish NETCONF session with CCAP 801 over NETCONF interface 805 (e.g., SSH, RPC, and/or some other interface/protocol such as any of those discussed herein); (2) perform NETCONF operation(s), including: (a) edit-config to update the running-config, (b) commit to implement updated configuration data, and (c) get-config to retrieve configuration details from the CCAP; and (3) send a request to the CCAP 801 to close the NETCONF session. At the CCAP 801, the configuration processing process may be as follows: (1) establish NETCONF session with management system 810; (2) attempt to execute NETCONF operations received from the configuration management tool 810; (3) send one or more replies with a status of requests; and (4) release NETCONF session on client's (configuration management tool 810) request.

The YANG modules, based on the CCAP configuration information model, are implemented by the configuration management tool 810 and the CCAP 801. These modules are used to generate valid configuration NETCONF operations and content from the management system and to validate and execute those operations and content on the CCAP 801.

When the configuration management tool 810 begins the configuration process, a suitable session (e.g., SSH session) is set up between the configuration management tool 810 and the CCAP 801 being configured. The configuration management tool 810 can then deliver full or partial CCAP configuration changes using NETCONF operations. The configuration content can be machine-generated or hand created; they are sent in the NETCONF interface 805 (e.g., RPC and/or the like) to the CCAP 801. The CCAP 801 receives, parses, and processes the configuration operations received via NETCONF 805 from the configuration management tool 810. The CCAP 801 can be fully or partially reconfigured; invalid configuration instructions can be ignored while valid instructions will still be processed. The CCAP 801 can also reject configuration instructions if they cannot be met by the capabilities of the hardware present. The CCAP 801 can also respond to <get-config> operations from the configuration management tool 810 and provide a full or partial indications (e.g., XML-based representations and/or the like) of the current device configuration, delivered to the configuration management tool 810 via NETCONF 805. The CCAP NETCONF configuration process is discussed in more detail in [CCAP-OSSIv3.1], [CCAP-OSSIv4.0].

Additionally, subscriber management (SM) capabilities of the CMTS may be leveraged to control groups of CMs (e.g., CM 105 of FIG. 1, CM 205 of FIG. 2, CMs 305 of FIG. 3, CMs 405 of FIG. 4, CM 505 of FIG. 5, and/or CM 605 of FIG. 6) for the upstream and downstream direction of flow independently. Through configuration of group labels in the CM's configuration profile, a given CM's upstream and downstream filtering can be enforced directly at the CMTS, or delegated (in the case of the upstream direction only) to the CM (see e.g., [CM-OSSIv3.1], [CM-OSSIv4.0] for CM protocol filtering).

This model provides the SM CMTS enforcement of packet filtering policies for CMs and CPE (e.g., CPE devices 103 of FIG. 1, CPE 203 of FIG. 2, the MTA 304, ONU 306, GW 307, STBs 308 of FIG. 3, the CPE 503 of FIG. 5, and/or CPEs 603 of FIG. 6) behind the CM, including maximum number of CM CPEs. The SM model provides the CMTS with policy management of upstream and downstream filtering traffic on a CM basis through DOCSIS defined CPE types. The components of the SM configuration model include: Base (e.g., default configuration parameters) and FilterGrp (e.g., list of classifiers of a filter group).

Figure 14:
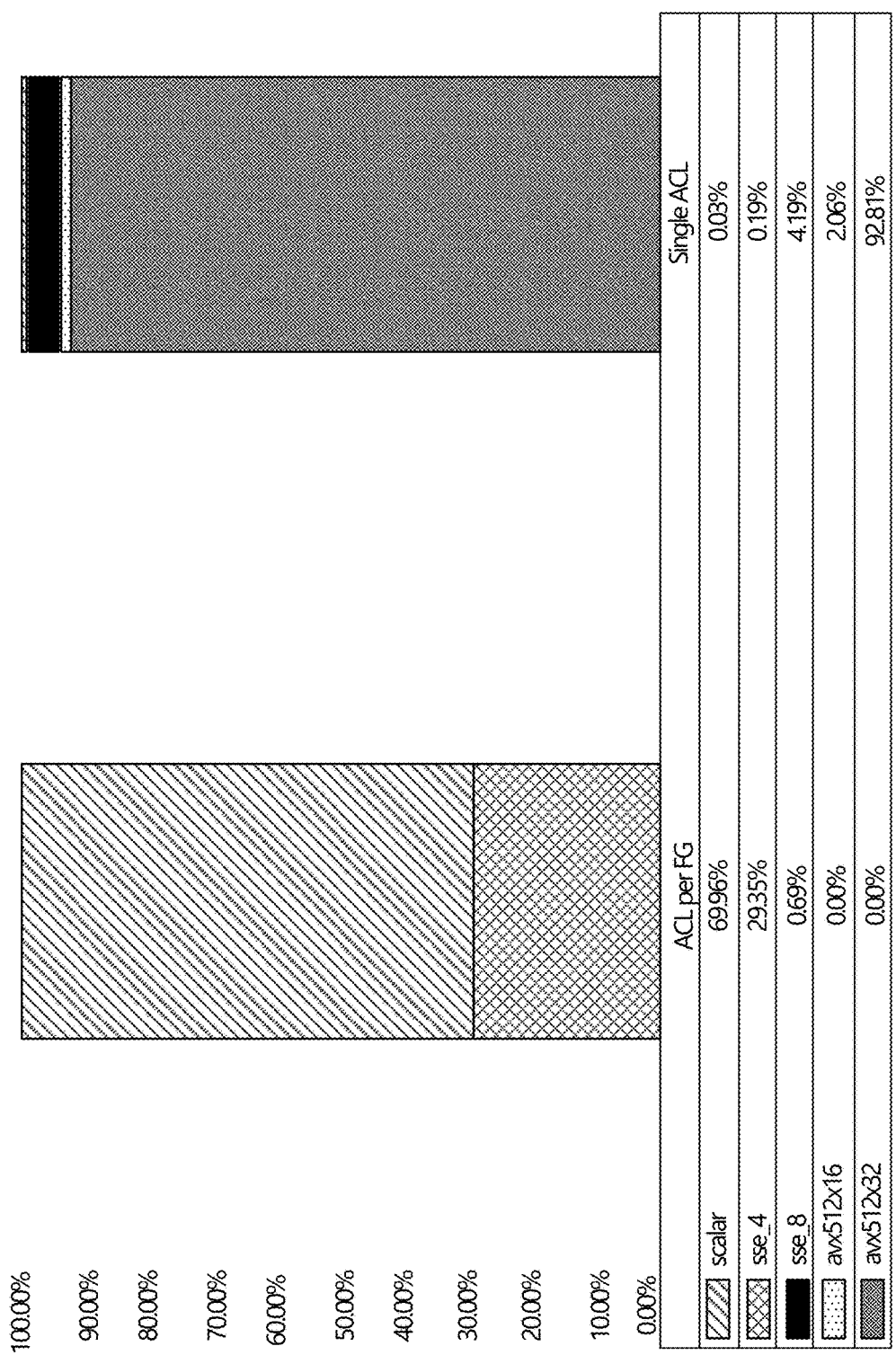

SM aligns the packet classification parameters of the filter groups with the QoS classification criteria. To that extent, as an optional CMTS feature, a SM filter group ID or a set of those IDs can be associated with upstream drop classifier (UDC) group ID(s) (see e.g., [MULPIv3.1], [MULPIv4.0]). In this situation, the CMTS SM filter groups are provisioned to the CM in the form of UDCs during the registration process. This group of configuration elements allows for the configuration of the SM rules. The configuration specific information model is shown by FIG. 14 in [CCAP-OSSIv3.1], and FIG. 19 in [CCAP-OSSIv4.0]. In particular, a SubMgmtCfg object in the information model is the primary container of DOCSIS security configuration objects, and the SubMgmtCfg object includes the Base object and the FilterGrp object.

1.3. DOCSIS Packet Processing Pipeline

DOCSIS MAC functionality can be broken down into four categories: downstream (DS) data-plane, upstream (US) data-plane, control-plane, and management. DOCSIS filtering takes place in the DOCSIS MAC data-plane (sometimes referred to as the "vCMTS data-plane" or the like).

Figure 9:
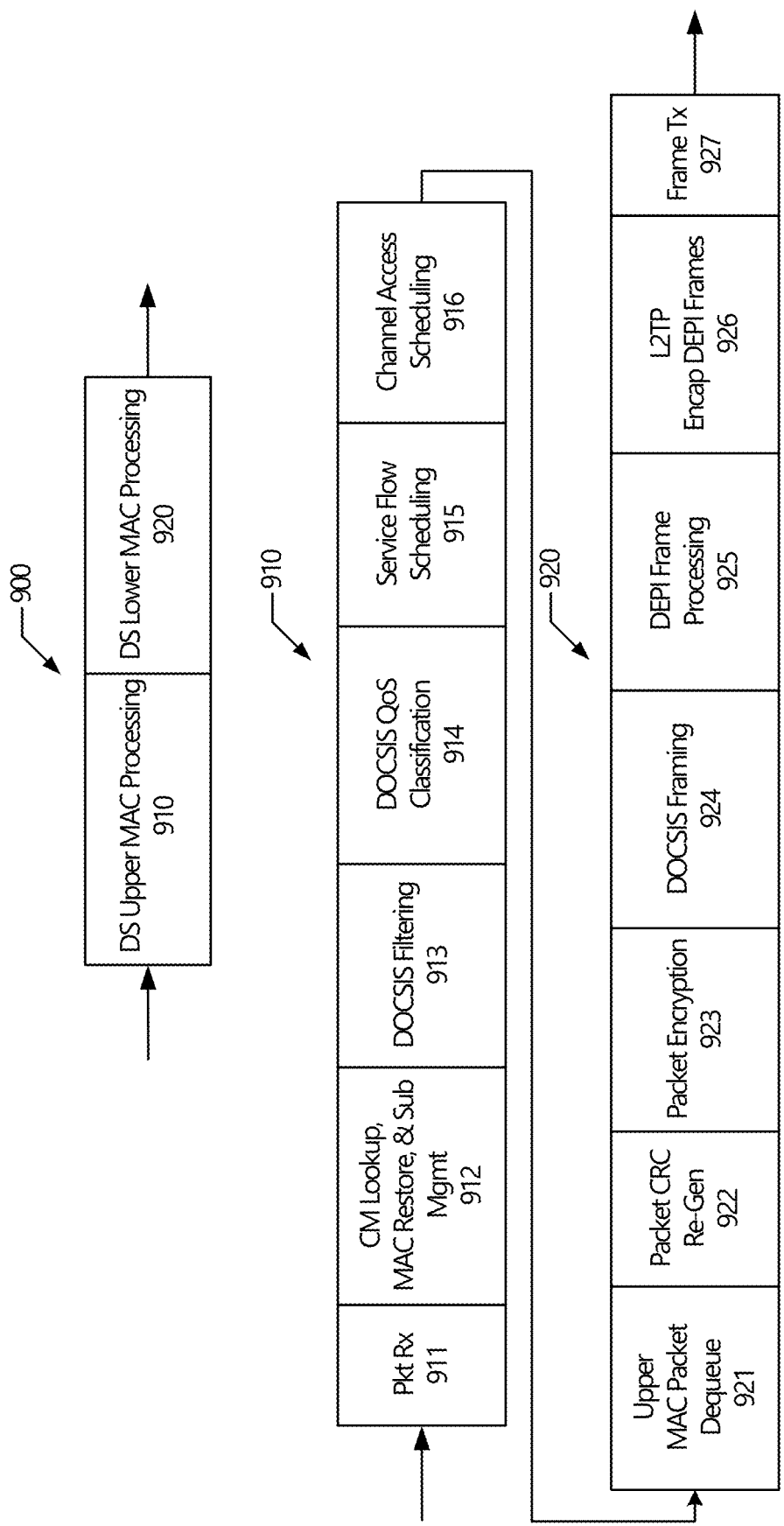
FIG. 9 depicts an example DOCSIS MAC downstream data-plane pipeline.

FIG. 9 shows an example downstream DOCSIS MAC data-plane pipeline 900, which includes DS upper MAC processing stages 910 and a DS lower MAC processing stages 920. The DOCSIS filtering stage 913 is a stage of a CMTS and/or vCMTS downstream DOCSIS MAC data-plane pipeline as shown in FIG. 9.

In the DS upper MAC processing stages 910, the packet reception (Pkt Rx) 911 involves receiving one or more data packets. In some implementations, Pkt Rx 911 may be accomplished using a DPDK poll mode driver (PMD), where bursts of MAC frames are received from a NIC port and sent in an upper MAC thread of an SG to begin vCMTS DS packet processing. The CM lookup in stage 912 may be performed based on a MAC address of the frame to identify DOCSIS filters, DOCSIS classifiers, service flow queue information, and security associations to be used for the target CM. In some implementations, the look-up in stage 912 is accomplished using a DPDK hash API, for example. The subscriber management (sub mgmt) in stage 912 involves monitoring a number of active subscriber devices (e.g., tracking using a destination IP address and/or some other network address), which may be checked against a DOCSIS limit.

The DOCSIS filtering stage 913 involves applying packet filtering policies. In various implementations, the a DPDK Access Control List (ACL) API is used to apply an ordered list of DOCSIS filter rules to individual packets frames. Various packet filtering aspects are discussed in more detail infra. The DOCSIS classification 914 involves classifying packets using an ordered list of classifiers and then enqueueing to one or more (e.g., one of four) service flow queues using, for example, the DPDK ACL API. The service flow scheduling 915 applies rate-shaping, congestion control, and weighted round-robin (WRR) scheduling to service flow queues. Channel access scheduling 916 is performed after service flow scheduling 915. The channel access scheduling 916 may be optimized to be performed in an earlier pipeline stage than is typically done in other implementations. Channel access scheduling 916 takes into account the encapsulation overhead added later in the pipeline.

An upper/lower MAC interface may be used to transfer packets between the upper MAC and lower MAC threads 910 and 920. In the DS lower MAC processing stages 920, this interface may include or otherwise interact with an upper MAC packet dequeue stage 921. Packet cycling redundancy code (CRC) re-generation 922, if required, includes regenerating a CRC of the packet using, for example, a DPDK NET CRC API. In some implementations, the CRC may be a 32-bit Ethernet CRC or some other suitable CRC. In some implementations, the DPDK NET CRC API may be based on the AVX-512, such as those provided by Intel®. The DOCSIS framing 924 involves generating DOCSIS MAC headers including header check sequence(s) for prepending to packets and/or DOCSIS headers. In some implementations, the DPDK NET CRC API is used to generate the DOCSIS header check sequence(s).

The packet encryption stage 923 may involve the use of any suitable encryption technology. In one example implementation, a baseline privacy interface (BPI+) encryption technology may be used, which includes 128-bit Advanced Encryption Standard (AES) encryption being performed on packets based on cable modem security association using, for example, the DPDK crypto APIs for DOCSIS. This API supports AES and Data Encryption Standard (DES) BPI+ encryption for both SW-only and HW offload.

The downstream external PHY interface (DEPI) frame processing 925 is performed on DOCSIS frames including, for example, encapsulation and the like. In some implementations, DOCSIS frames are converted to Packet Streaming Protocol (PSP) segments, concatenated, and encapsulated into layer two tunneling protocol (L2TP) DEPI frames 926 of a maximum transmission unit (MTU) size (see e.g., Townsley et al., "Layer Two Tunneling Protocol "L2TP", IETF RFC 2661 (August 1999), which is hereby incorporated by reference in its entirety). In some implementation, the concatenation may be accomplished using DPDK mbuf chaining or the like. Additionally or alternatively, the PSP segments can be fragmented across DEPI frames so all transmitted frames are of the MTU size in order to ensure maximum utilization of the R-PHY link (see e.g., FIG. 6). Lastly, packet transmission (Tx) 927 is performed, which can include bursts of L2TP DEPI frames being transmitted to the NIC using, for example, DPDK PMD. Additional aspects of the individual stages of the downstream DOCSIS MAC data-plane pipeline 900, and an example upstream pipeline are discussed in Ryan et al., "Maximizing vCMTS Data Plane Performance with 3rd Gen Intel® Xeon® Scalable Processor Architecture", White Paper|Processor Architecture Study, INTEL.COM (3 Sep. 2021), the contents of which are hereby incorporated by reference in its entirety.

1.4. DOCSIS Filtering 1.4.1. Overview of DOCSIS Filtering

Continuing to refer to FIG. 9, the DOCSIS filtering stage 913 involves checking if a downstream packet should be permitted or denied for further processing based on a set of predetermined and/or configured filter rules, which are grouped according to filter groups. In some implementations, a DPDK ACL library is used to apply an ordered list of filter(s) (e.g., masks, ranges, and/or the like) to the frame. These comprise permit and deny filters, and a set of filters (e.g., 16 filters) may be evaluated per packet. At most, one filter group of rules must be checked for each packet received. The filter group to be checked is determined based on the destination CM and CPE/device type of the packet (or the device type indicated by the packet). The CM and CPE/device type is determined by the CM lookup stage 912 preceding the filtering stage 913 in the pipeline 900. In some implementations, a packet can only be assigned to a single filter group. In these implementations, a downstream packet is destined to a particular CPE or device type (e.g., Sub, Cm, Ps, Mta, Stb), and each of these CPE types has a single filter group assigned to it for each CM (see e.g., Table 4, infra).

For a high-performance CMTS and/or vCMTS (collectively referred to as "(v)CMTS") pipeline, such as one based on DPDK, the DOCSIS filtering stage 913 is typically implemented using an ACL library. The ACL library may have several optimized paths for classifying batches of packets based on wider instructions, which can process multiple packets at a time such as Intel®'s Streaming SIMD Extensions (SSE), AVX-2, and/or AVX-512 instructions. The path chosen depends on the size of the input batch. In various embodiments, a most optimal path of the ACL library is used most often which requires the largest possible input batch size, for example, 32 packets.

As mentioned previously, through configuration of group labels in a CM's configuration profile, a given CM's upstream and downstream filtering can be enforced directly at the (v)CMTS, or delegated (e.g., in the case of the upstream direction) to the CM (see e.g., [CM-OSSIv3.1], [CM-OSSIv4.0]).

1.4.1.1. DOCSIS Classifiers

A classifier is a set of matching criteria applied to each packet entering a cable network, which includes some packet matching criteria (e.g., destination IP address, and/or the like) and a classifier priority. The set of criteria used for packet matching can be according to TCP, UDP, IP, LLC, and/or 802.1P/Q packet fields. Additionally, a QoS classifier includes a reference to a service flow. Additionally or alternatively, a classifier maps individual packets to a service flow. A downstream classifier is used by the CMTS to assign packets to downstream service flows, and an upstream classifier is used by the CM to assign packets to upstream service flows.

In the context of DOCSIS, a service flow is a MAC-layer transport service that provides unidirectional transport of packets either to upstream packets transmitted by the CM or to downstream packets transmitted by the CMTS. For purposes of the present disclosure, the term "service flow" may or may not have a direct relationship to the concept of a "flow" (e.g., integrated services (intserv) flows) as defined by the IETF RFC 2212. Multiple intsery flows can be served by a single service flow. However, the classifiers for a service flow may be based on, and so may not involve intsery flows at all. A service flow is characterized by a set of QoS parameters such as latency, jitter, and throughput assurances. A service can also be based on various 802.1P/Q criteria and/or multiple intsery flows. An intsery flow is a collection of packets sharing transport-layer endpoints. Service flows exist in both the upstream and downstream direction, and may exist without actually being activated to carry traffic. All service flows have a 32-bit service flow identifier (SFID) assigned by the CMTS. Active and admitted upstream service flows are also assigned a 14-bit service identifier (SID) or one or more SID clusters, which include an SID cluster group.

If a packet matches the specified packet matching criteria of a QoS classifier, it is then delivered on the referenced service flow. An upstream drop classifier (UDC) is a classifier created by the CM to filter upstream traffic. If a packet matches the specified packet matching criteria of a UDC, it is then dropped.

1.4.1.1.1. Upstream and Downstream QoS Classifiers

One or several QoS classifiers may all refer to the same service flow. A classifier priority is used for ordering the application of classifiers to packets. Explicit ordering may be necessary because the patterns used by classifiers may overlap. The priority need not be unique, but care needs to be taken within a classifier priority to prevent ambiguity in classification (see e.g., section 7.5.6.1 in [MULPIv3.1], [MULPIv4.0]). Downstream classifiers are applied by the CMTS to packets it is transmitting. Upstream classifiers are applied at the CM and may be applied at the CMTS to police the classification of upstream packets.

The highest priority classifier is applied by the CM or CMTS first. If a classifier is found that has at least one relevant parameter and all parameters which are relevant match the packet, the CM or CMTS forwards the packet to the corresponding service flow. Irrelevant parameters have no impact on packet classification decisions. If a classifier contains no relevant parameters for a given packet (e.g., all parameters are irrelevant), then that packet cannot match the classifier, and the CM or CMTS does not forward the packet to the corresponding service flow. If a packet does not match any classifier and as a result has not been classified to any other flow, then it is classified by the CM or CMTS to a primary service flow. A primary service flow is the default service flow that carries packets that do not match any Classifier. Unless signaled otherwise, the primary service flows are the first service flow, in each direction, defined in the CM configuration file. A packet classification table can contain the fields shown by Table 1.

TABLE 1 packet classification table fields

| Field | Description |
| --- | --- |
| Priority | determines the search order for the table. Higher priority Classifiers are searched before lower priority classifiers |
| IP Classification Parameters | zero or more of the IP classification parameters (IP TOS Range/Mask, IP Protocol, IP Source Address/Mask, IP Destination Address/Mask, TCP/UDP Source Port Start, TCP/UDP Source Port End, TCP/UDP Destination Port Start, TCP/UCP Destination Port End) |
| LLC Classification Parameters | zero or more of the LLC classification parameters (e.g., Destination MAC Address, Source MAC Address, Ethertype/SAP, and/or the like) |
| IEEE 802.1P/Q Parameters | zero or more of the IEEE classification parameters (e.g., 802.1P Priority Range, 802.1Q VLAN ID, and/or the like) |
| Cable Modem Interface Mask (CMIM) | a bit mask representing the interfaces of the CM from which the CM is to classify traffic. This is a packet matching criterion in DOCSIS 3.0 |
| Service Flow Identifier (SFID) | identifier of a specific flow to which this packet is to be directed |

Classifiers can be added to the table either via management operations (e.g., configuration file, registration, and/or the like) or via dynamic operations (e.g., dynamic signaling, DOCSIS MAC sublayer service interface, and/or the like). SNMP-based operations can view Classifiers that are added via dynamic operations but cannot modify or delete Classifiers that are created by dynamic operations. The format for classification table parameters defined in the configuration file, registration message, and/or dynamic signaling message is discussed in Annex C of [MULPIv3.1] and/or [MULPIv4.0]. Attributes of QoS classifiers include an activation state (see e.g., Annex C of [MULPIv3.1] and/or [MULPIv4.0]). The 'inactive' setting may be used to reserve resources for a classifier which is to be activated later. The actual activation of the classifier depends both on this attribute and on the state of its service flow. If the service flow is not active then the classifier is not used, regardless of the setting of this attribute.

1.4.1.1.2. Upstream Drop Classifiers

An upstream drop classifier (UDC) is a classifier created by the CM to filter upstream traffic. In particular, a UDC is a set of matching criteria that the CM applies to individual packets in order to determine whether to filter (drop) upstream traffic. A packet is dropped if that packet matches the specified packet matching criteria of a UDC. The CM performs all upstream IP protocol and LLC packet classification using UDCs. The CM reports support for UDCs in the modem capabilities encoding by sending the number of UDCs supported in the registration request (see e.g., Annex C of [MULPIv3.1] and/or [MULPIv4.0]). UDCs are enabled on DOCSIS 3.1/4.0 CMs, regardless of the value returned by the CMTS in the UDC support modem capability. UDCs can be enabled or disabled on DOCSIS 3.0 CMs as discussed by [MULPIv3.1] and/or [MULPIv4.0].

Like QoS classifiers, UDCs can contain a classifier rule priority value. The classifier rule priority is used for ordering the application of all classifiers, including both upstream (QoS) classifiers and UDCs. Explicit ordering is necessary because the patterns used by upstream (QoS) classifiers and UDCs can overlap. The priorities need not be unique, but care needs to be taken within a classifier priority to prevent ambiguity in classification. Unlike QoS classifiers, UDCs do not refer to a service flow, and UDCs are not associated with a service flow.

The UDC is a structural convention reusing the definition of upstream classifiers from [MULPIv3.1], [MULPIv4.0]. A unique top-level type/length/value (TLV) (see e.g., Upstream Drop Packet Classification Encoding, TLV 60) defines UDCs and distinguishes this type of classifier from the QoS classifier type (see e.g., Upstream Packet Classification Encoding, TLV 22). UDCs are used to discard a packet matched to the classifier rule criteria (see e.g., Upstream Drop Packet Classification Encoding section in the Common Radio Frequency Interface Encodings Annex of [MULPIv3.1] and [MULPIv4.0]). The CM is required to support a minimum of 64 UDC rules. The UDC configuration structure is designed to discard packets before they reach the output queue of the RFI interface and does not require attributes such as QoS. UDCs have a many-to-one relationship between UDC rules and the packet discard function. UDCs operate only within the local context of the CM. Any packet matched by a classifier rule is immediately discarded. The CM will ignore UDC parameters that are incompatible with the packet discard function when they are configured in the CM configuration file.

1.4.1.2. Filtering Mechanisms

DOCSIS 3.0 CMs support two packet filtering/classification mechanisms including IETF RFC 4639 LLC and IP filtering mechanism and UDCs. A DOCSIS 4.0 CM is only required to support UDCs and is not required to support the IETF RFC 4639 IP and LLC filtering mechanisms.

The legacy DOCSIS filtering mechanisms are subdivided into two filtering layers at the CM, including an LLC filtering layer and an IP filtering layer. The two legacy classification/filtering tables at the CM are the docsDevFilterIpTable and the docsDevFilterLlcTable. UDCs cover both the LLC and IP packet criterion, matching the functionality of the legacy filtering mechanisms. The LLC filtering layer can include IETF RFC 4639 LLC filters and/or the like. The IP filtering layer can include IETF RFC 4639 IP filters, IP spoofing filters (see e.g., IETF RFC 4639), inter-eSAFE and/or eSAFE to CPE communications and SNMP access filters such as SNMPv1/v2c NmAccess mode (see e.g., [CM-OSSIv4.0] § 8.5.2.2) and SNMP CPE Access Control (see e.g., [CM-OSSIv4.0] § 8.5.2.9, IETF RFC 3411 through IETF RFC 3415, and IETF RFC 3584. Incoming packets are matched to a classifier that determines to which QoS service flow the packet is forwarded. The classifier can examine the LLC header of the packet, the IP/TCP/UDP header of the packet, or some combination of the two. If the packet matches one of the classifiers, it is forwarded to the service flow indicated by the SFID attribute of the classifier. If the packet is not matched to a classifier, it is forwarded on the configured primary service flow.

UDCs are modeled on the existing QoS classifiers that were introduced in DOCSIS 1.1. UDCs apply only to the CM, the RF interface, and only in the upstream direction of flow. The use of UDCs facilitates delegation of upstream protocol filtering at the CM through parameters in the configuration file that can be controlled by the CMTS. Any packet classified by the UDC rule is discarded, conceptually similarly to directing an IP route to "null 0" or output to /dev/null in a UNIX system. As with the IP filters, UDC rules may be configured through the CM configuration file statically, assigned dynamically from the CMTS through a group ID (or filter group ID) reference in the CM configuration file, dynamically added, changed or deleted after registration through a dynamic service change (DSC) MAC management message from the CMTS, or both the static and dynamic configuration methods may be used together. The CMTS alone provides the downstream protocol filtering/classification and can further reinforce the upstream classification policy through SM traffic filtering functionality, if desired.

Among the specific requirements for classification at the CM, the CM is required to perform protocol classification from the host CPE(s) to the RF interface when UDCs are enabled. All IP and LLC packets are forwarded from the CMCI interface to the RFI upstream interface based on rules outlined in the UDCs sections of [MULPIv3.1] and [MULPIv4.0] unless they are specifically required to be discarded according to applied protocol classification rules.

1.4.1.3. Filter Processing

DOCSIS filtering defined in [CM-OSSIv3.1], [CM-OSSIv4.0]. As mentioned previously, SM can be used to align packet classification parameters of one or more filter groups with QoS classification criteria. To that extent, an SM filter group ID or a set of filter group IDs can be associated with one or more UDC group IDs, and the CMTS SM filter groups can be provisioned to the CM in the form of UDCs during the registration process. Additionally, upstream and downstream filter groups can be assigned to a CM and its associated CPE and Service/Application Functional Entities (SAFEs). Table 2 shows a set of criteria that comprise a filter rule. In particular, a filter group comprises a set of such filter rules (or classifiers) grouped by a 'GrpId' field, as shown by Table 2.

TABLE 2

FilterGrp Object Attributes

| Attribute Name | Type | Required Attribute | Type Constraints | Units | Default Value |
| --- | --- | --- | --- | --- | --- |
| GrpId | UnsignedShort | Key | 1 ... 1024 | | |
| RuleId | UnsignedShort | Key | 1 ... 65535 | | |
| FilterAction | Enum | No | other(1), permit(2), deny(3) | | permit |
| Priority | UnsignedShort | No | | | 0 |
| IpTosLow | HexBinary | No | SIZE (1) | | '00'H |
| IpTosHigh | HexBinary | No | SIZE (1) | | '00'H |
| IpTosMask | HexBinary | No | SIZE (1) | | '00'H |
| IpProtocol | UnsignedShort | No | 0 ... 257 | | 256 |
| InetSrcAddr | InetAddress | No | | | ''H |
| InetSrcMask | InetAddress | No | | | ''H |
| InetDestAddr | InetAddress | No | | | ''H |
| InetDestMask | InetAddress | No | | | ''H |
| SrcPortStart | InetPortNumber | No | | | 0 |

TABLE 2-continued

FilterGrp Object Attributes

| Attribute Name | Type | Required Attribute | Type Constraints | Units | Default Value |
|---|---|---|---|---|---|
| SrcPortEnd | InetPortNumber | No | | | 65535 |
| DestPortStart | InetPortNumber | No | | | 0 |
| DestPortEnd | InetPortNumber | No | | | 65535 |
| DestMacAddr | MacAddress | No | | | '000000000000'H |
| DestMacMask | MacAddress | No | | | '000000000000'H |
| SrcMacAddr | MacAddress | No | | | 'FFFFFFFFFFFF'H |
| EnetProtocolType | Enum | No | other(1), none(2), ethertype(3), dsap(4), mac(5), all(6) | | ethertype |
| EnetProtocol | UnsignedShort | No | | | 0 |
| UserPriLow | UnsignedShort | No | 0 . . . 7 | | 0 |
| UserPriHigh | UnsignedShort | No | 0 . . . 7 | | 7 |
| VlanId | UnsignedShort | No | 0 \| 1 . . . 4094 | | 0 |
| ClassPkts | Counter64 | No | | | |
| FlowLabel | UnsignedInt | No | 0 . . . 1048575 | | 0 |
| CmInterfaceMask | DocsL2vpnIfList | No | | | "H |

The FilterGrp object describes a set of filter or classifier criteria. Additionally or alternatively, a filter group includes a list of classifiers. Classifiers are assigned by group to the individual CMs. That assignment is made via the "Subscriber Management TLVs" encodings sent upstream from the CM to the CCAP during registration, or in their absence, default values configured in the CCAP. A filter group ID (GrpId) is a set of rules that correspond to the expansion of a UDC Group ID into individual UDC rules. The UDC Group IDs are linked to IDs of the FilterGrp object so the CCAP can signal those filter rules as UDCs to the CM during the registration process. Implementation of L2 classification criteria is optional for the CCAP; LLC/MAC upstream and downstream filter criteria can be ignored during the packet matching process. Additionally or alternatively, the GrpId is a key that is an identifier for a set of classifiers known as a filter group. Each CM may be associated with several filter groups for its upstream and downstream traffic, one group per target end point on the CM as defined in the Grp object. Typically, many CMs share a common set of filter groups. The range for this attribute is 1 to 1024 to align it with the values used in the Base Object.

The RuleId is a key that represents an ordered classifier identifier within the group. Filters are applied in order if the Priority attribute is not supported. The FilterGrp object includes filter operations that are applied during the filtering stage 913 in the pipeline 900. The FilterAction is an attribute that represents the action to take upon this filter matching. The FilterAction attribute can have a value of 'permit', 'deny', or 'other' wherein 'permit' means to stop the classification matching and accept the packet for further processing, 'deny' means to drop the packet, and 'other' indicates a vendor extension is in use. In some implementations, the 'other' value can point to other actions to be taken as defined by a specific vendor or service provider. The priority is an attribute that defines the order in which the classifiers are compared against packets. The higher the value, the higher the priority.

The IpTosLow is an attribute that represents the low value of a range of Type of Service (ToS) octet values, and the IpTosHigh is an attribute that represents the high value of a range of ToS octet values. The IP ToS octet, as originally defined in "Internet Protocol", IETF RFC 791 (September 1981) ("[RFC 791]"), has been superseded by the 6-bit Differentiated Services Field (DSField) in Grossman, "New Terminology and Clarification for Diffserv", IETF RFC 3260 (April 2002) ("[RFC 3260]") and the 2-bit Explicit Congestion Notification Field (ECN) in Ramakrishnan et al., "The Addition of Explicit Congestion Notification (ECN) to IP" IETF RFC 3168 ("[RFC 3168]"). These attributes are each defined as 8-bit octets as per the DOCSIS Specification for packet classification (see e.g., *Data-Over-Cable Service Interface Specifications DOCSIS® 3.1: MAC and Upper Layer Protocols Interface Specification*, CABLE TELEVISION LABORATORIES, INC., CM-SP-MULPIv3.1-I21-201020 (20 Oct. 2020) ("[MULPIv3.1]") and/or *Data-Over-Cable Service Interface Specifications DOCSIS® 4.0: MAC and Upper Layer Protocols Interface Specification*, CABLE TELEVISION LABORATORIES, INC., CM-SP-MULPIv4.0-I05-220328 (28 Mar. 2022) ("[MULPIv4.0]"), the contents of each of which are hereby incorporated by reference in their entireties).

The IpTosMask is an attribute that represents the mask value that is bitwise ANDed with ToS octet in an IP packet, and the resulting value is used for range checking of IpTosLow and IpTosHigh. The IpProtocol is an attribute that represents the value of the IP Protocol field required for IP packets to match this rule. The value 256 matches traffic with any IP Protocol value. The value 257 by convention matches both TCP and UDP. The InetSrcAddr is an attribute that specifies the value of the IP Source Address required for packets to match this rule. An IP packet matches the rule when the packet's IP Source Address bitwise ANDed with the InetSrcMask value equals the InetSrcAddr value. The address type of this object is specified by the InetAddrType attribute. The InetSrcMask is an attribute that represents which bits of a packet's IP Source Address are compared to match this rule. An IP packet matches the rule when the packet's IP Source Address bitwise ANDed with the InetSrcMask value equals the InetSrcAddr value. The address type of this object is specified by InetAddrType (see e.g., [RFC 791], [RFC 3168], [RFC 3260], [MULPIv3.1], [MULPIv4.0]).

The InetDestAddr is an attribute that specifies the value of the IP Destination Address required for packets to match this rule. An IP packet matches the rule when the packet's IP Destination Address bitwise ANDed with the InetSrcMask value equals the InetDestAddr value. The address type of this object is specified by the InetAddrType attribute. The InetDestMask is an attribute that represents which bits of a packet's IP Destination Address are compared to match this rule. An IP packet matches the rule when the packet's IP Destination Address bitwise ANDed with the InetDestMask value equals the InetDestAddr value. The address type of this object is specified by InetAddrType.

The SrcPortStart is an attribute that represents the low-end inclusive range of TCP/UDP source port numbers to which a packet is compared. This attribute is irrelevant for non-TCP/UDP IP packets. The SrcPortEnd is an attribute that represents the high-end inclusive range of TCP/UDP source port numbers to which a packet is compared. This attribute is irrelevant for non-TCP/UDP IP packets. The DestPortStart is an attribute that represents the low-end inclusive range of TCP/UDP destination port numbers to which a packet is compared. This attribute is irrelevant for non-TCP/UDP IP packets. The DestPortEnd is an attribute that represents the high-end inclusive range of TCP/UDP destination port numbers to which a packet is compared. This attribute is irrelevant for non-TCP/UDP IP packets. The DestMacAddr is an attribute that represents the criteria to match against an Ethernet packet MAC address bitwise ANDed with DestMacMask. The DestMacMask is an Ethernet packet matches an entry when its destination MAC address bitwise ANDed with the DestMacMask attribute equals the value of the DestMacAddr attribute. The SrcMacAddr is an attribute that represents the value to match against an Ethernet packet source MAC address.

The EnetProtocolType is an attribute that indicates the format of the L3 protocol ID in the Ethernet packet. A value of 'none' means that the rule does not use the L3 protocol type as a matching criteria. A value of 'ethertype' means that the rule applies only to frames that contain an EtherType value. Ethertype values are contained in packets using the DEC-Intel-Xerox (DIX) encapsulation or the Postel et al., "A Standard for the Transmission of IP Datagrams over IEEE 802 Networks", IETF RFC 1042 (February 1988) ("[RFC 1042]"), which discusses Sub-Network Access Protocol (SNAP) encapsulation formats. A value of 'dsap' means that the rule applies only to frames using the IEEE 802.3 encapsulation format with a Destination Service Access Point (DSAP) other than 0xAA (which is reserved for SNAP). A value of 'mac' means that the rule applies only to MAC management messages for MAC management messages. A value of 'all' means that the rule matches all Ethernet packets. If the Ethernet frame contains an 802.1P/Q Tag header (e.g., EtherType 0x8100), this attribute applies to the embedded EtherType field within the 802.1p/Q header. The value 'mac' is only used for passing UDCs to CMs during Registration. The CMTS ignores filter rules that include the value of this attribute set to 'mac' for CMTS enforced upstream and downstream SM filter group rules. The value 'other' indicates a vendor extension is in use. The EnetProtocol is an attribute that represents the Ethernet protocol type to be matched against the packets. For EnetProtocolType set to 'none', this attribute is ignored when considering whether a packet matches the current rule. If the attribute EnetProtocolType is 'ethertype', this attribute gives the 16-bit value of the EtherType that the packet needs to match in order to match the rule. If the attribute EnetProtocolType is 'dsap', the lower 8 bits of this attribute's value needs to match the DSAP byte of the packet in order to match the rule. If the Ethernet frame contains an 802.1p/Q Tag header (e.g., EtherType 0x8100), this attribute applies to the embedded EtherType field within the 802.1p/Q header.

The UserPriLow is an attribute that applies only to Ethernet frames using the 802.1p/Q tag header (e.g., indicated with EtherType 0x8100). A tag header is a 16-bit Tag Protocol ID (0x8100) followed by a 16-bit Tag Control field. The Tag Control field includes a 3-bit User Priority field, a 1-bit Canonical Format Indicator, and a 12-bit VLAN ID (see e.g., *IEEE Standard for Local and Metropolitan Area Network—Bridges and Bridged Networks*, IEEE 802.1Q-2018, pp. 1-1993 (6 Jul. 2018) ("[IEEE8021Q]"), the contents of which are hereby incorporated by reference in its entirety). Such frames include a 16-bit Tag that contains a 3-bit Priority field and a 12-bit VLAN number. Tagged Ethernet packets need to have a 3-bit Priority field within the range of PriLow to PriHigh in order to match this rule. The UserPriHigh is an attribute that applies only to Ethernet frames using the 802.1p/Q tag header (indicated with EtherType 0x8100). Such frames include a 16-bit Tag that contains a 3-bit Priority field and a 12-bit VLAN number. Tagged Ethernet packets needs to have a 3-bit Priority field within the range of PriLow to PriHigh in order to match this rule. The VlanId is an attribute that applies only to Ethernet frames using the 802.1p/Q tag header. Tagged packets need to have a VLAN Identifier that matches the value in order to match the rule. The FlowLabel is an attribute that represents the flow label field in the IPv6 header to be matched by the classifier. The value zero indicates that the flow label is not specified as part of the classifier and is not matched against packets. The CmInterfaceMask is an attribute that represents a bit-mask of the CM in-bound interfaces to which this classifier applies. This attribute only applies to UDCs being sent to CMs during the registration process.

Table 3 also defines default filter groups to be used if filter groups are not signaled by a CM in the DOCSIS registration process. In particular, Table 3 shows attributes of the base object, which defines the configuration parameters of SM features for the CM in case the CM does not signal any of the parameters during the registration process.

TABLE 3

Base Object Attributes

| Attribute Name | Type | Required Attribute | Type Constraints | Units | Default |
|---|---|---|---|---|---|
| CpeMaxIpv4Def | UnsignedShort | No | 0 . . . 1023 | | 16 |
| CpeMaxIpv6PrefixesDef | UnsignedShort | No | 0 . . . 1023 | | 3 |
| CpeActiveDef | Boolean | No | | | false |
| CpeLearnableDef | Boolean | No | | | false or true |
| SubFilterDownDef | UnsignedShort | No | 0 . . . 1024 | | 0 |
| SubFilterUpDef | UnsignedShort | No | 0 . . . 1024 | | 0 |
| CmFilterDownDef | UnsignedShort | No | 0 . . . 1024 | | 0 |
| CmFilterUpDef | UnsignedShort | No | 0 . . . 1024 | | 0 |

TABLE 3-continued

Base Object Attributes

| Attribute Name | Type | Required Attribute | Type Constraints | Units | Default |
|---|---|---|---|---|---|
| PsFilterDownDef | UnsignedShort | No | 0 ... 1024 | | 0 |
| PsFilterUpDef | UnsignedShort | No | 0 ... 1024 | | 0 |
| MtaFilterDownDef | UnsignedShort | No | 0 ... 1024 | | 0 |
| MtaFilterUpDef | UnsignedShort | No | 0 ... 1024 | | 0 |
| StbFilterDownDef | UnsignedShort | No | 0 ... 1024 | | 0 |
| StbFilterUpDef | UnsignedShort | No | 0 ... 1024 | | 0 |

The CpeMaxIpv4Def attribute represents the maximum number of IPv4 addresses allowed for the CM's CPE if not signaled in the registration process. The CpeMaxIpv6PrefixesDef attribute represents the maximum number of IPv6 IA_PDs (delegated prefixes) allowed for the CM's CPEs. IPv6 IA_PDs are counted against the 'CpeMaxIpv6PrefixesDef'. This contrasts with the CpeMaxIPv4AddressesDef attribute which controls the maximum number of individual IPv4 addresses. Because this attribute only counts IA_PDs against the default, IA_NA addresses and Link-Local addresses are not counted against this default limit. The CpeActiveDef attribute represents the default value for enabling SM filters and controls in the CM if the parameter is not signaled in the DOCSIS Registration process. The CpeLearnableDef attribute represents the default value for enabling the CPE learning process for the CM if the parameter is not signaled in the DOCSIS Registration process. The SubFilterDownDef attribute represents the default value for the subscriber (CPE) downstream filter group for the CM if the parameter is not signaled in the DOCSIS Registration process. The SubFilterUpDef attribute represents the default value for the subscriber (CPE) upstream filter group for the CM if the parameter is not signaled in the DOCSIS Registration process.

The CmFilterDownDef attribute represents the default value for the CM stack downstream filter group applying to the CM if the parameter is not signaled in the DOCSIS Registration process. The CmFilterUpDef attribute represents the default value for the CM stack upstream filter group for the CM if the parameter is not signaled in the DOCSIS Registration process. The PsFilterDownDef attribute represents the default value for the PS or eRouter downstream filter group for the CM if the parameter is not signaled in the DOCSIS Registration process. The PsFilterUpDef attribute represents the default value for the PS or eRouter upstream filter group for the CM if the parameter is not signaled in the DOCSIS Registration process. The MtaFilterDownDef attribute represents the default value for the MTA downstream filter group for the CM if the parameter is not signaled in the DOCSIS Registration process. The MtaFilterUpDef attribute represents the default value for the MTA upstream filter group for the CM if the parameter is not signaled in the DOCSIS Registration process. The StbFilterDownDef the attribute represents the default value for the STB downstream filter group for the CM if the parameter is not signaled in the DOCSIS Registration process. The StbFilterUpDef attribute represents the default value for the STB upstream filter group for the CM if the parameter is not signaled in the DOCSIS Registration process.

Table 4 shows the Grp object attributes. The Grp object defines the set of downstream and upstream filter groups that the CMTS applies to traffic associated with that CM 105 (see e.g., [MULPIv3.1], [MULPIv4.0]).

TABLE 4

Grp Object Attributes

| Attribute Name | Type | Access | Type Constraints | Units | Default |
|---|---|---|---|---|---|
| CmtsCmRegStatusId | UnsignedShort | key | 1 ... 4294967295 | N/A | N/A |
| UdcGroupIds | Tag List | read-only | | N/A | "H |
| UdcSentInRegRsp | Boolean | read-only | | N/A | 'false' |
| SubFilterDs | UnsignedShort | read-write | 0 ... 1024 | N/A | N/A |
| SubFilterUs | UnsignedShort | read-write | 0 ... 1024 | N/A | N/A |
| CmFilterDs | UnsignedShort | read-write | 0 ... 1024 | N/A | N/A |
| CmFilterUs | UnsignedShort | read-write | 0 ... 1024 | N/A | N/A |
| PsFilterDs | UnsignedShort | read-write | 0 ... 1024 | N/A | N/A |
| PsFilterUs | UnsignedShort | read-write | 0 ... 1024 | N/A | N/A |
| MtaFilterDs | UnsignedShort | read-write | 0 ... 1024 | N/A | N/A |
| MtaFilterUs | UnsignedShort | read-write | 0 ... 1024 | N/A | N/A |
| StbFilterDs | UnsignedShort | read-write | 0 ... 1024 | N/A | N/A |
| StbFilterUs | UnsignedShort | read-write | 0 ... 1024 | N/A | N/A |

The CmtsCmRegStatusId is a key and/or CMTS generated unique identifier of a CM for status report purposes. The UdcGroupIds attribute represents the filter group(s) associated with the CM signaled 'Upstream Drop Classifier Group ID' encodings during the registration process. UDC Group IDs are integer values and this attribute reports them as decimal numbers that are space-separated. The zero-length string indicates that the CM didn't signal UDC Group IDs. This attribute provides two functions including: communicate the CM the configured UDC Group ID(s), irrespective of the CM being provisioned to filter upstream traffic based on IP Filters or UDCs; and optionally, and with regards to the CMTS, if the value of the attribute UdcSentInReqRsp is 'true', indicates that the filtering rules associated with the SM group ID(s) will be sent during registration to the CM.

It is vendor specific whether the CMTS updates individual CM UDCs after registration when rules are changed in the Grp object.

The UdcSentInRegRsp attribute represents the CMTS upstream filtering status for this CM. The value 'true' indicates that the CMTS has sent UDCs to the CM during registration process. In order for a CMTS to send UDCs to a CM, the CMTS MAC Domain needs to be enabled via the MAC Domain attribute SendUdcRulesEnabled and the CM had indicated the UDC capability support during the registration process. The value 'false' indicates that the CMTS was not enabled to send UDCs to the CMs in the MAC Domain, or the CM did not advertise UDC support in its capabilities encodings, or both. Since the CMTS capability to send UDCs to CMs during the registration process is optional, the CMTS is not required to instantiate this attribute.

The SubFilterDs attribute represents the filter group applied to traffic destined for subscriber's CPE attached to the referenced CM (attached to CM CPE interfaces). This value corresponds to the 'Subscriber Downstream Group' value of the 'Subscriber Management Filter Groups' encoding signaled during the CM registration or in its absence, to the SubFilterDownDef attribute of the Base object. The value zero or a filter group ID not configured in the CMTS means no filtering is applied to traffic destined to hosts attached to this CM. The SubFilterUs attribute represents the filter group applied to traffic originating from subscriber's CPE attached to the referenced CM (attached to CM CPE interfaces). This value corresponds to the 'Subscriber Upstream Group' value of the 'Subscriber Management Filter Groups' encoding signaled during the CM registration or in its absence, to the SubFilterUpDef attribute of the Base object. The value zero or a filter group ID not configured in the CMTS means no filtering is applied to traffic originating from hosts attached to this CM.

The CmFilterDs attribute represents the filter group applied to traffic destined for the CM itself. This value corresponds to the 'CM Downstream Group' value of the 'Subscriber Management Filter Groups' encoding signaled during the CM registration or in its absence, to the CmFilterDownDef attribute of the Base object. The value zero or a filter group ID not configured in the CMTS means no filtering is applied to traffic destined to this CM. The CmFilterUs attribute represents the filter group applied to traffic originating from the CM itself. This value corresponds to the 'Subscriber Upstream Group' value of the 'Subscriber Management Filter Groups' encoding signaled during the CM registration or in its absence, to the SubFilterUpDef attribute of the Base object. The value zero or a filter group ID not configured in the CMTS means no filtering is applied to traffic originating from this CM.

The PsFilterDs attribute represents the filter group applied to traffic destined to the Embedded CableHome Portal Services Element or the Embedded Router on the referenced CM. This value corresponds to the 'PS Downstream Group' value of the 'Subscriber Management Filter Groups' encoding signaled during the CM registration or in its absence, to the SubFilterDownDef attribute of the Base object. The value zero or a filter group ID not configured in the CMTS means no filtering is applied to traffic destined to the Embedded CableHome Portal Services Element or Embedded Router on this CM. The PsFilterUs attribute represents the filter group applied to traffic originating from the Embedded CableHome Portal Services Element or Embedded Router on the referenced CM. This value corresponds to the 'PS Upstream Group' value of the 'Subscriber Management Filter Groups' encoding signaled during the CM registration or in its absence, to the SubFilterUpDef attribute of the Base object. The value zero or a filter group ID not configured in the CMTS means no filtering is applied to traffic originating from the Embedded CableHome Portal Services Element or Embedded Router on this CM.

The MtaFilterDs attribute represents the filter group applied to traffic destined to the Embedded Multimedia Terminal Adapter on the referenced CM. This value corresponds to the 'MTA Downstream Group' value of the 'Subscriber Management Filter Groups' encoding signaled during the CM registration or in its absence, to the SubFilterDownDef attribute of the Base object. The value zero or a filter group ID not configured in the CMTS means no filtering is applied to traffic destined to the Embedded Multimedia Terminal Adapter on this CM. The MtaFilterUs attribute represents the filter group applied to traffic originating from the Embedded Multimedia Terminal Adapter on the referenced CM. This value corresponds to the 'MTA Upstream Group' value of the 'Subscriber Management Filter Groups' encoding signaled during the CM registration or in its absence, to the SubFilterUpDef attribute of the Base object. The value zero or a filter group ID not configured in the CMTS means no filtering is applied to traffic originating from the Embedded Multimedia Terminal Adapter on this CM.

The StbFilterDs attribute represents the filter group applied to traffic destined for the Embedded Set-Top Box on the referenced CM. This value corresponds to the 'STB Downstream Group' value of the 'Subscriber Management Filter Groups' encoding signaled during the CM registration or in its absence, to the SubFilterDownDef attribute of the Base object. The value zero or a filter group ID not configured in the CMTS means no filtering is applied to traffic destined to the Embedded Set-Top Box on this CM. The StbFilterUs attribute represents the filter group applied to traffic originating from the Embedded Set-Top Box on the referenced CM. This value corresponds to the 'STB Upstream Group' value of the 'Subscriber Management Filter Groups' encoding signaled during the CM registration or in its absence, to the SubFilterUpDef attribute of the Base object. The value zero or a filter group ID not configured in the CMTS means no filtering is applied to traffic originating from the Embedded Set-Top Box on this CM.

As mentioned previously, a value of zero or a filter group ID not configured for a particular CMTS means no filtering is applied to the traffic. In various implementations, if a value of zero (0) or no filter group is specified for a particular device type in Table 4, then a filter group ID of 0 is added to the packet indicating that device type and/or a filter group ID of 0 is added to a new lookup object for the ACL lookup operation (discussed infra). In some implementations, no filter groups have a filter group ID of "0", then a packet having a filter group ID of "0" will match no rules, and a no match means the packet can be permitted. This is effectively the same as applying no filtering on the packet. In alternative implementations, a default filter group can be assigned a filter group ID of "0", and a packet having a filter group ID of "0" will match to the default rule(s) of the default filter group, and these default filter rule(s) are applied to each packet in the batch of packets having a filter group ID of "0".

In various implementations, the filter group type descriptions can can include the following: Sub (traffic for subscriber's CPE attached to the referenced CM); Cm (traffic for the CM itself); Ps (traffic for CableHome Portal Services Element or Router embedded on the referenced CM); Mta (traffic for embedded Multimedia Terminal Adapter (MTA) on the referenced CM); and Stb (traffic for embedded STB on the referenced CM).

1.4.2. Access Control List (ACL) Processing

[DPDK] provides an access control (AC) library that gives the ability to classify an input packet based on a set of classification rules (sometimes referred to as "ACL rules" or the like). These rules describe one or more actions that can be applied to each received packet. The ACL library is used to obtain rules associated with individual packets, for processing the individual packets according to those rules. For example, the ACL library is used to perform an N-tuple search over a set of rules with multiple categories and find the best match (highest priority) for each category. The library API provides the following basic operations: create a new AC context; add rules into the context; for all rules in the context, build the runtime structures necessary to perform packet classification; perform input packet classifications; and/or destroy an AC context and its runtime structures and free the associated memory.

In some implementations, the ACL library is used to perform both ACL and route entry lookup. For example, when packets are received from a port, information is extracted from the TCP/IP header of the received packet and a lookup operation is perform in the rule database to determine whether the packet should be processed/filtered, and/or dropped (e.g., in an ACL range) or forwarded to desired ports. In one example implementation, packet classification is implemented using the IPv4/IPv6 5-tuple syntax, where the 5-tuple syntax includes a source IP address, a destination IP address, a source port, a destination port and a protocol identifier.

In some implementations, each AC rule (or ACL rule) can include the following structure: {type, size, field_index, input_index, offset}. The field type field/parameter can be (or have a value of) a mask, range, or bitmask. The mask type is used for fields such as IP addresses that have a value and a mask defining the number of relevant bits. The range type is used for fields such as ports that have a lower and upper value for the field. The bitmask type is used for fields such as protocol identifiers that have a value and a bit mask. The size field/parameter defines the length of the field in bytes (e.g., 1, 2, 4, or 8 bytes). The field_index parameter is a zero-based value that represents the position of the field inside the rule (e.g., 0 to N-1 for N fields, where N is a number). The input_index field/parameter specifies to which input group that field belongs to. The offset field/parameter defines the offset for the field. This is the offset from the beginning of the buffer parameter for the search.

Additional information can also be supplied for each rule including a priority, a category mask, and user data. The priority is a weight to measure the priority of the rules (e.g., higher is better). If the input tuple matches more than one rule, then the rule with the higher priority is returned. The category_mask is a bit mask value related to one or more categories of the rule. Each rule uses a bit mask value to select the relevant category(s) for the rule. When a lookup is performed, the result for each category is returned. This effectively provides a "parallel lookup" by enabling a single search to return multiple results if, for example, there were four different sets of ACL rules, one for access control, one for routing, and so on. Each set could be assigned its own category and by combining them into a single database, one lookup returns a result for each of the four sets. The user data (userdata) is a user-defined value (e.g., forwarding port number if the rule is a route table entry, a pointer to a mapping address if the rule is used for address mapping in a NAT application, and the like). For each category, a successful match returns the userdata field of the highest priority matched rule. When no rules match, the returned value is zero. In some examples, default classification and/or filter rules can be applied to the packet when the returned value is zero, or the packet can be dropped when the returned value is zero.

In various implementations, an AC library (or ACL library and/or filter rules database) is embodied or implemented as a lookup table (LUT). In some examples, the ACL table (or ACL LUT) uses an ACL algorithm to uniquely associate data to lookup keys. Each table entry in an ACL table/LUT has an associated ACL and priority. The ACL contains bit masks for network addresses (e.g., VLAN/MPLS labels and/or the like), destination address prefix (e.g., IP prefix for IP destination address), source address prefix (e.g., IP prefix for IP source addresses), Layer 4 (L4) protocol and bitmask, L4 destination port and bit mask, L4 source port and bit mask, and/or other like information. The ACL table lookup operation selects the ACL (or ACL rule set) that is matched by a lookup key. As examples, the lookup key is the packet payload, the packet header, filter group ID associated with the desintation address (e.g., filter group assigned to a CM and/or the like), a device type associated with the source or desintation address (e.g., CPE type and/or the like), and/or some other data/information, or combination thereof. In case of multiple matches, the entry with the highest priority wins. In some implementations, an ACL lookup operation can be a hash-based lookup operation where a hash function is used to calculate the lookup key, and the lookup key is used to find a location of a corresponding ACL in the ACL table.

After a build phase (rte_acl_build( )) over given AC context has finished successfully, it can be used to perform classification, which involves a search for a rule with highest priority over the input data. The build phase (rte_acl_build( )) creates for a given set of rules internal structure for further run-time traversal. In particular, the rte_acl_build( )) analyzes a set of rules and builds required internal run-time structures. There are several implementations for the classify algorithm including scalar, SSE, AVX2, Neon, AltiVec, AVX512x16, and AVX512x32 (see e.g., Table 8, infra). The particular classification method that is used is a runtime decision, and there is no build-time difference. Each implementation operates over the same internal routing table (RT) structures and use similar principles. The main difference is that vector implementations can manually exploit Itanium architecture (IA) SIMD instructions and process several input data flows in parallel. At startup, the ACL library determines the highest available classify method for the given platform and sets it as default. Though the user has an ability to override the default classifier function for a given ACL context or perform particular search using non-default classify method.

ACL rules are used for data packet filtering for network functions (NFs) such as a security firewall or a vCMTS. For implementations of such NFs, an ACL library, such as the DPDK ACL library, provides the capability to classify a batch of input packets based on a set of classification rules (see e.g., [DPDK] § 53). For vCMTS NFs, one DOCSIS filter rule (e.g., as defined by the FilterGrp object discussed previously and/or discussed in [CCAP-OSSIv3.1], [CCAP-OSSIv4.0]) corresponds to one ACL rule.

Modern CPU architectures support 512-bit wide instructions, such as Intel® AVX-512 instructions. Based on such instructions and their capability to process large batches of packets in parallel, an optimized path was added to the DPDK ACL library which enables 32 packets to be processed in parallel. Such packet processing parallelism leads to fewer CPU processing cycles per packet, and thus a performance improvement. The path taken through the DPDK ACL library depends on the input batch size as shown by Table 5.

TABLE 5

DPDK ACL library code paths per packet batch size

| Batch Size | ≥32 | ≥16 | ≥8 | ≥4 | <4 |
|---|---|---|---|---|---|
| ACL Path | AVX 512 × 32 | AVX 512 × 16 | sse8 | sse4 | scalar |

In Table 5, the "ACL path" (or "ACL library code path") refers to a particular classification method (see e.g., [DPDK] § 53.1.3). In particular, "AVX 512x32" refers to a classification algorithm vector implementation that can process up to 32 flows in parallel, uses 512-bit width SIMD registers, and requires AVX512 support; "AVX 512x16" refers to a classification algorithm vector implementation that can process up to 16 flows in parallel, uses 256-bit width SIMD registers, and requires AVX512 support; "sse8" refers to a classification algorithm vector implementation that can process up to 8 flows in parallel and requires Streaming SIMD Extensions 8 (sse8) support; "sse4" refers to a classification algorithm vector implementation that can process up to 4 flows in parallel and requires Streaming SIMD Extensions 4 (sse4) support; and "scalar" refers to a generic implementation that does not require any specific HW support (e.g., a scalar processor (or single instruction, single data (SISD) processor) can be used). See also Table 8 discussed infra.

1.4.3. Techniques for Optimized DOCSIS Filter Processing

Typically, many filter groups are defined for a (v)CMTS application instance, and in a typical non-optimized DOCSIS filtering implementation, each filter group and its rules correspond to single ACL lookup.

As previously described, filter groups are assigned to CMs for different destination CPE types (e.g., Sub, MTA, PS, STB, and/or CM). Each batch of packets received by a (v)CMTS downstream pipeline instance must be broken into smaller batches for the relevant ACL look-ups. Because each packet is only checked against its assigned Filter Group ACL, this means that there can be no possibility of a false hit against rules in another ACL. However, using smaller ACL input batches results in a sub-optimal path of the ACL library being used (e.g., sse8, sse4, or scalar). An example of this is shown in FIG. 10.

Figure 10:
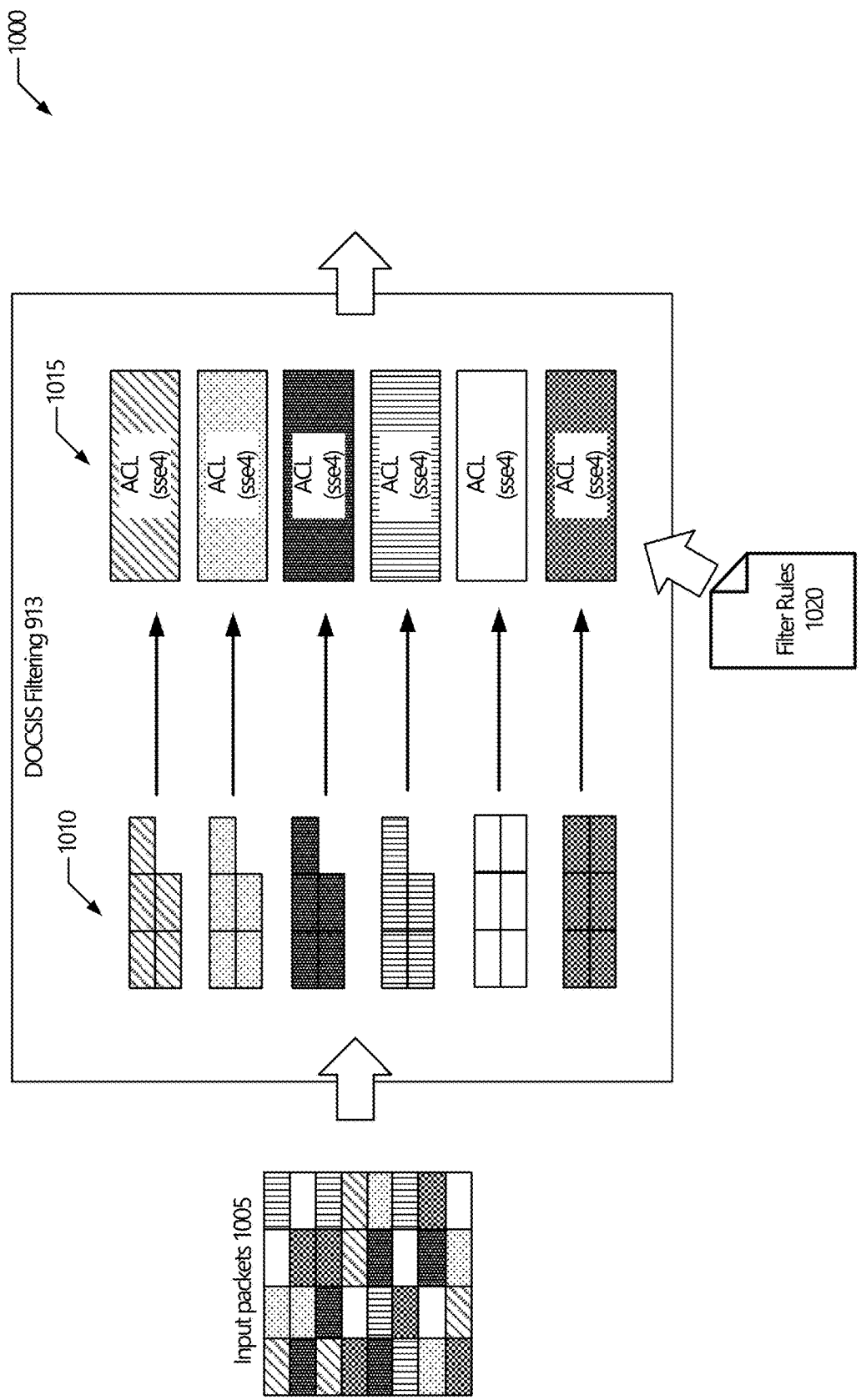
FIG. 10 depicts an example of normal non-optimized DOCSIS Filter Processing implementation.

FIG. 10 shows an example non-optimized DOCSIS filter processing implementation 1000. In this non-optimized example, an input batch 1005 of 32 packets is received by the DOCSIS downstream pipeline 900 (see e.g., Pkt Rx 911 FIG. 9), and eventually enters the DOCSIS filtering stage 913. In FIG. 10, each of the six fill-patterns correspond to a different filter group that is applicable to the input packets 1005, based on the packet's destination CM and CPE type. The batch of 32 packets is broken in six smaller batches 1010 according to the packet's filter group. Each batch of packets 1010 is input to a corresponding ACL 1015, in turn. Each ACL 1015 uses filter rules 1020 to process its corresponding batch 1010. In this example, the sse4 path of the DPDK ACL library is used, which results in sub-optimal DOCSIS filtering performance.

When the ACL rule is processed, the system will only match on the values configured in the rule. If an attribute is not provided in the configuration instance file, the CCAP will match any value for that attribute. For example, if ProtocolId is not specified, then any value for protocol Id in the packet will match the filter. If the CCAP rejects the configuration of an IpAclRule, the CCAP should also reject the IpAcl instance that contains the rule In an optimized DOCSIS filtering implementation as discussed herein, all filter groups and their filter rules are processed in a single ACL look-up for the entire batch of received packets. This means the full batch of packets received by the (v)CMTS downstream pipeline can be passed to the ACL library for lookup in a single function call. If the received packet batch size is large (e.g., ≥32), this results in the most optimal path of the ACL library being used which takes advantage of the widest CPU instructions for optimum parallel processing of packets. As all rules are now included in a single ACL, the techniques described herein avoids false hits from filter groups that are not applicable to a particular packet.

In various implementations, each rule in the ACL contains it's filter group ID (e.g., the GrpId field of the FilterGrp object discussed previously). Additionally, the packets being looked-up also contain their relevant filter group ID (as determined by the packet's destination CM and CPE type and the Grp object as discussed previously). In some implementations, the Filter Group ID (GrpId) is included in an existing IP header field or a new IP header field. In one example, the GrpId is included in an identification field (or portion thereof) of an IPv4 header or the indentification field (or portion thereof) of a fragment extension header in an IPv6 header. In another example, the GrpId is included in a Flow label field (or portion thereof) in an IPv6 header. Other header fields may be used in other embodiments.

In terms of a practical implementation, such as using the DPDK ACL library, a new ACL lookup object can be used to include all required DOCSIS Filtering N-tuple field and the Filter Group ID. An example of such an object is shown by Table 6, which includes the standard IP 5-tuple fields of source and destination IP addresses, source and destination UDP/TCP ports, and ToS (or DSCP). Additional or alternative DOCSIS filter rule fields may be added as required and/or based on use case or implementation.

TABLE 6 example ACL lookup object

```
struct docsis_filter_lookup_obj {
    u8   tos;
    struct ip_addr src_ip;
    struct ip_addr dst_ip;
    u16  src_port;
    u16  dst_port;
    u16  group_id;
}
```

The ACL lookup object in Table 6 is used to both define the DOCSIS filtering ACL rules AND act as input to ACL batch classification, by copying the packet fields and filter group ID to this object.

Figure 11:
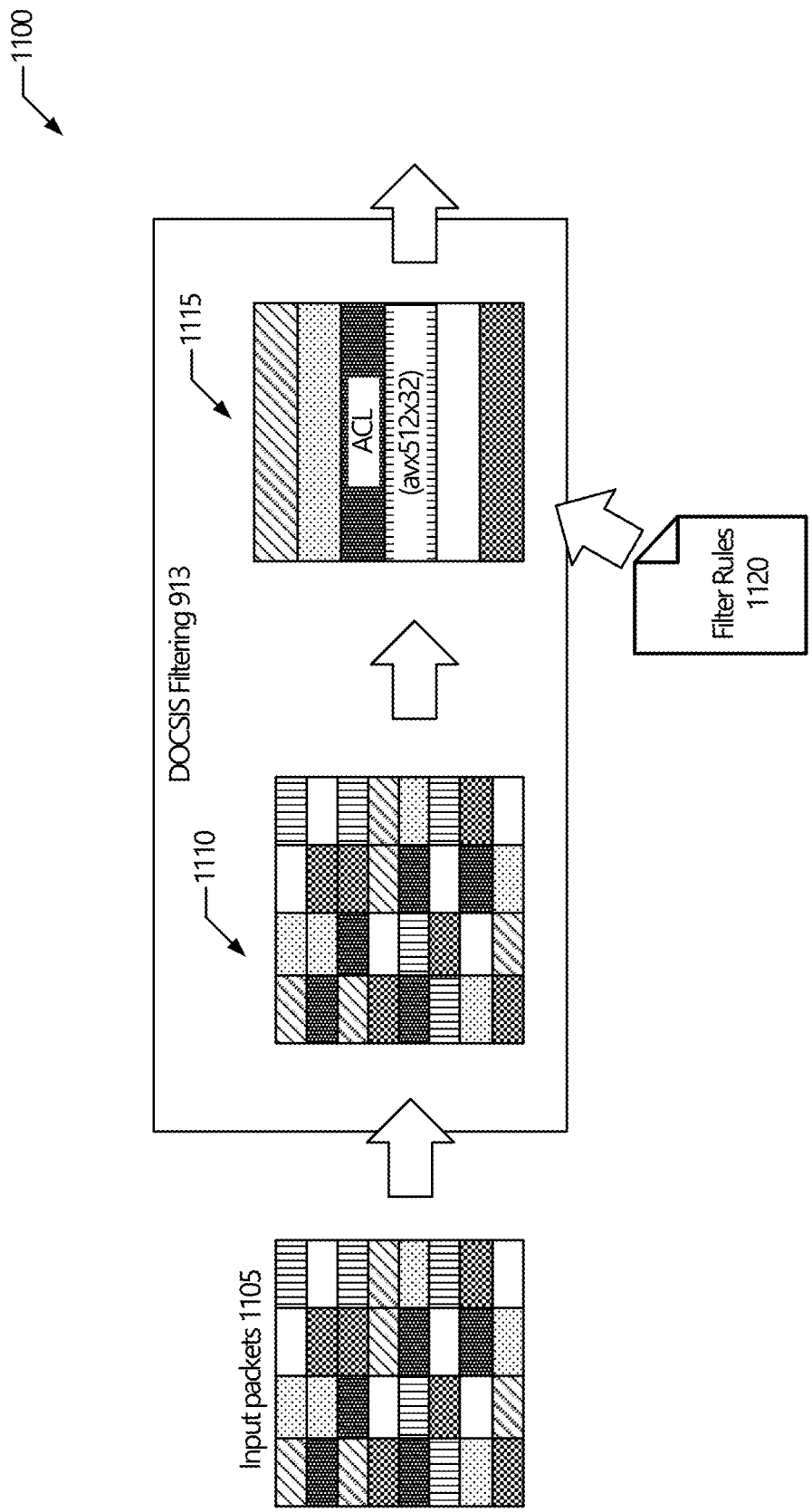
FIG. 11 depicts an example of optimized DOCSIS filter processing implementation.

FIG. 11 shows an example of an optimized DOCSIS filtering implementation 1100. The optimized DOCSIS filtering implementation 1100 may be based on the DPDK ACL API and/or the like. Similar to the implementation 1000, in FIG. 11, a batch of 32 input packets 1105 (also referred to as "batch 1105") is received at or by the vCMTS downstream pipeline 900 (see e.g., Pkt Rx 911 FIG. 9), and eventually enters the DOCSIS filtering stage 913. In FIG. 11, each of the six fill-patterns correspond to respective filter groups 1110 that are applicable to the received input packets 1105 based on the packet's 1105 destination CM and CPE type. In contrast to the pipeline implementation 1000, in implementation 1100 the single ACL 1115 contains all filter rules 1120 for all filter groups 1110, and the full batch 1105 of received packets are input to this single ACL 1115. As the packet batch size is now ≥32 packets, a most optimal avx512x32 path 1115 of the ACL library is used, allowing all 32 packets to be processed in parallel.

Figure 12:
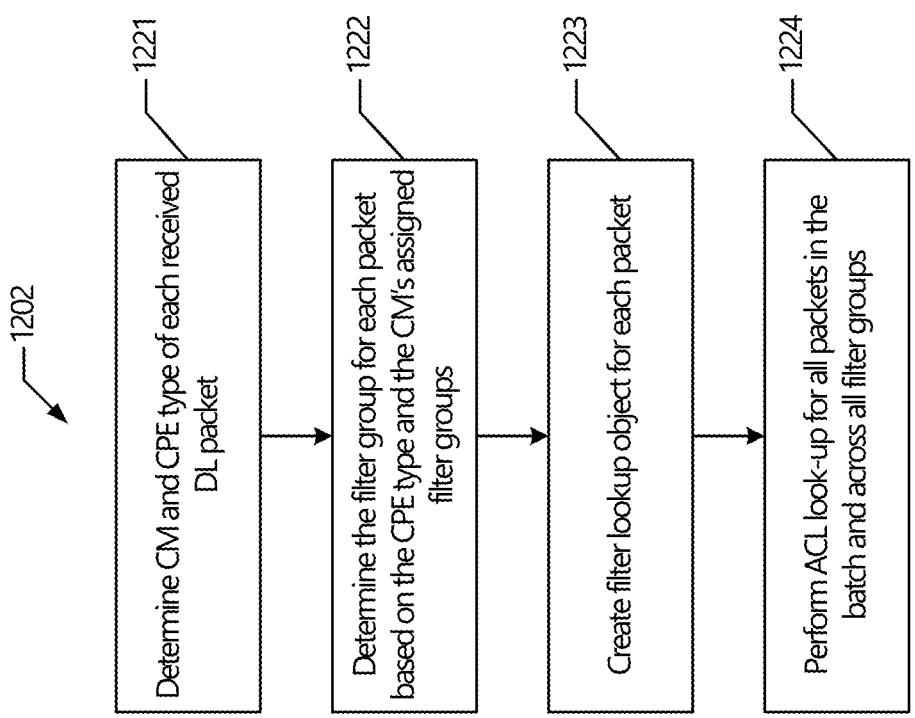
FIG. 12 depicts an example DOCSIS filtering algorithm.

FIG. 12 shows an example DOCSIS processing process 1200, which can be performed by a vCMTS (e.g., vCMTS platform 720 or an individual vCMTS data-plane instance 722). Process 1200 begins at operation 1201 where a batch of input packets 1105 is received 911 at a DOCSIS downstream processing pipeline 900 operated by the vCMTS. At operation 1202, the vCMTS uses a single ACL 1115 for a filter processing stage 913 of the packet processing pipeline 900.

Operation 1202 includes an example process (also referred to as process 1202) for operating an optimized DOCSIS filtering implementation 1100. Process 1202 begins at operation 1221 where the vCMTS determines a CM and CPE type of each received downstream packet (e.g., each packet in the batch 1105). At operation 1222, the vCMTS determines the filter group for each packet based on the CPE type and the CM's assigned filter groups (e.g., the Grp object discussed previously). At operation 1223, the vCMTS creates a filter lookup object, as defined previously, for each packet. At operation 1224, the vCMTS performs an ACL look-up (e.g., DPDK ACL lookup) for all packets in the batch and across all filter groups. After operation 1224, process 1202 may end or repeat as necessary.

As an example of operation 1224, DPDK ACL lookup can be done with a single call to the DPDK rte_acl_classify( ) API. The rte_acl_classify( ) function performs a search for a matching ACL rule for each input data buffer. Each input data buffer can have up to categories number of matches, which implies that a results array should be big enough to hold (categories*num) elements. If more than one rule is applicable for given input buffer and given category, then the rule with highest priority will be returned as a match. An example of the rte_acl_classify( ) function is shown by Table 7.

TABLE 7 example rte_acl_classify( )

| int rte_acl_classify ( const struct rte_acl_ctx * | ctx, |
|---|---|
| const uint8_t ** | data, |
| uint32_t * | results, |
| uint32_t | num, |
| uint32_t | categories |
| ) | |

In Table 7, "ctx" is the ACL context to search with (e.g., the filter rules and/or the ACL lookup object of Table 6), "data" is an array of pointers to input data buffers to perform search, "results" is an array of search results having categories results per each input data buffer, "num" is the number of elements in the input data buffers array, and "categories" is a number of maximum possible matches for each input buffer, one possible match per category. In another example, the DPDK ACL lookup can be done with a single call to the DPDK rte_acl_classify_alg( ) API, which has a same or similar format and parameters as shown by Table 7, but the search is performed using a specified algorithm for a matching ACL rule for each input data buffer. Here, the "alg" in "rte_acl_classify_alg( )" is the algorithm to be used for the search and/or implementation-specific search (e.g., to be run on a given processor). For example, the "alg" in "rte_acl_classify_alg( )" may be enumerated as shown by Table 8.

TABLE 8

ACL Classification Methods

| ACL classify (rte_acl_classify_alg( )) Enumerator | Implementation/ISA | Description |
|---|---|---|
| RTE_ACL_CLASSIFY_SCALAR | generic/single instruction, single data (SISD) | generic implementation; doesn't require any specific HW support. Requires max SIMD bitwidth to be at least 64. |
| RTE_ACL_CLASSIFY_SSE | Streaming SIMD Extensions 4 (SSE4), SSE4.1, SSE4.2, SSE8 | vector implementation, can process up to 8 flows in parallel. Requires SSE 4.1 support. Requires max SIMD bitwidth to be at least 128. |
| RTE_ACL_CLASSIFY_AVX2 | Intel ® Advanced Vector Extensions 2 (AVX2) | vector implementation, can process up to 16 flows in parallel. Requires AVX2 support. Requires max SIMD bitwidth to be at least 256. |
| RTE_ACL_CLASSIFY_NEON | ARM ® Neon | vector implementation, can process up to 8 flows in parallel. Requires NEON support. Requires max SIMD bitwidth to be at least 128. |
| RTE_ACL_CLASSIFY_ALTIVEC | AIM Alliance AltiVec/ Vector Multimedia Extension (VMX) | vector implementation, can process up to 8 flows in parallel. Requires ALTIVEC support. Requires max SIMD bitwidth to be at least 128. |
| RTE_ACL_CLASSIFY_AVX512X16 | Intel ® AVX-512 | vector implementation, can process up to 16 flows in parallel. Uses 256-bit width SIMD registers. Requires AVX512 support. Requires max SIMD bitwidth to be at least 256. |
| RTE_ACL_CLASSIFY_AVX512X32 | Intel ® AVX-512 | vector implementation, can process up to 32 flows in parallel. Uses 512-bit width SIMD registers. Requires AVX512 support. Requires max SIMD bitwidth to be at least 512. |

In addition to the classification methods of Table 8, additional classification algorithms and/or implementations may be added such as, for example, ARM® Helium ISA, Intel® Advanced Matrix Extensions (AMX) ISA, Advanced Encryption Standard (AES) instruction set, Intel® AES New Instructions (AES-NI), Scalable Processor Architecture (SPARC) ISA, and/or the like. Also, the prefix "rte" may refer to "Run Time Environment."

Figure 13:
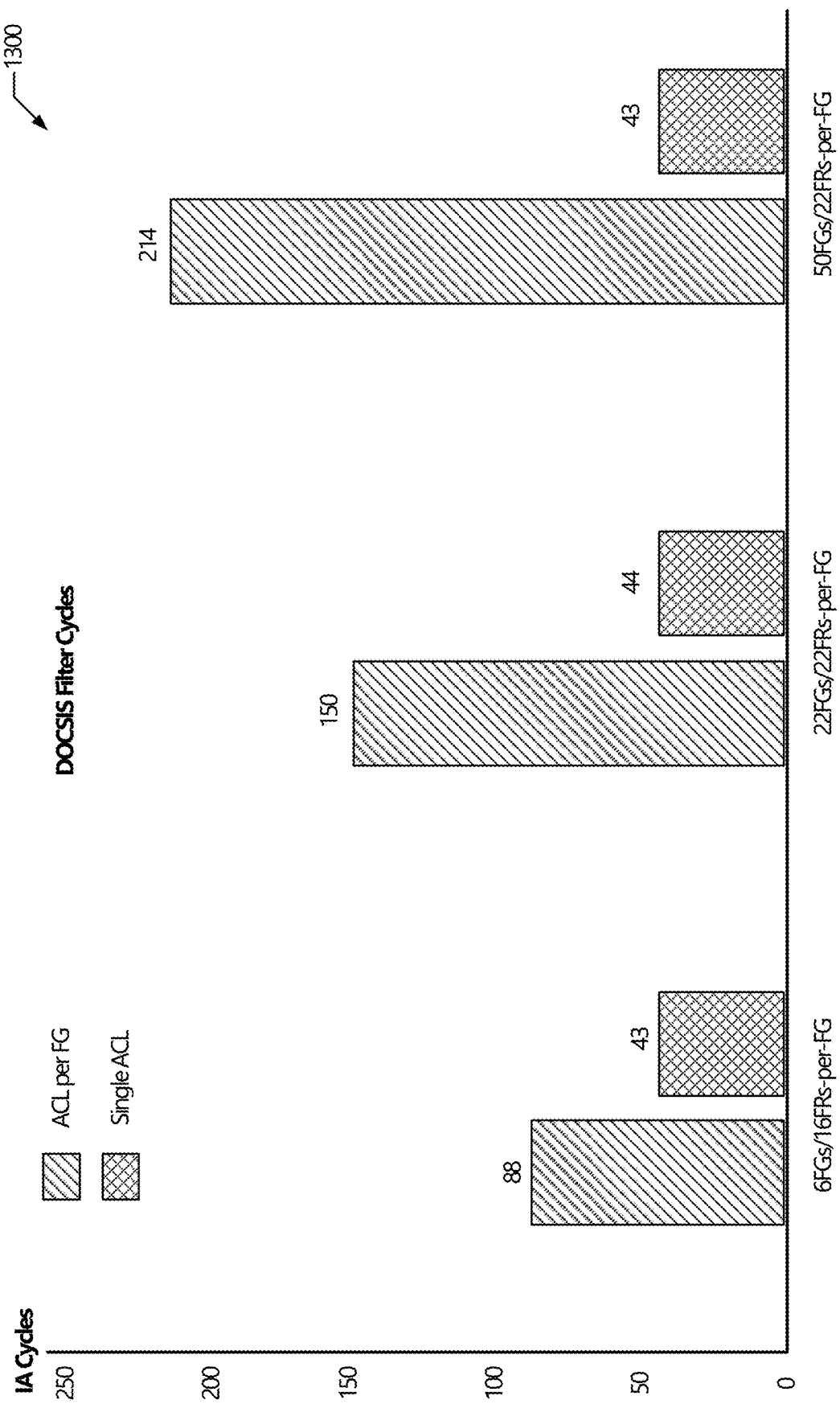
FIGS. 13 and 14 depict DOCSIS filter processing metrics.

FIG. 13 shows a graph 1300 of CPU cycle measurements for optimized implementations of DOCSIS filter processing. The CPU cycle measurements of graph 1300 are based on the following test/simulation configuration: $3^{rd}$ Gen Intel® Xeon scalable processor (Ice Lake); 300 CMs per vCMTS instance; Rx packet batch size of 64 packets; internet mix (iMix) distribution of input packet sizes; and three filter group (FG) and filter rule (FR) configurations. The three FG/FR configurations that were used for the simulation/measurements are as follows: 6 filter groups with 16 filter rules per filter group (e.g., "6FGs/16FRs-per-FG" in FIG. 13); 22 filter groups with 22 filter rules per filter group (e.g., "22FGs/22FRs-per-FG" in FIG. 13); and 50 filter groups with 22 filter rules per filter group (e.g., "50FGs/22FRs-per-FG" in FIG. 13). Simulations were performed using a non-optimized pipeline implementation (e.g., ACL per FG) and an optimized pipeline implementation (e.g., single ACL for all FGs as discussed previously with respect to FIGS. 11-12) for each FG/FR configuration.

Graph 1300 shows a reduction in CPU cycles when moving from a non-optimized implementation (e.g., ACL per FG) to the optimized implementation (e.g., single ACL). The results in graph 1300 illustrate benefits of the optimized single ACL implementation as follows: significant reduction in CPU cycles for single ACL technique in comparison to the non-optimized implementation; and constant CPU cycle count regardless of the number of FGs and FRs versus linear increasing cycle count when an ACL per FG is used.

FIG. 14 shows a graph 1400 of DPDK ACL code path statistics collected for the optimized implementation of DOCSIS filter processing (e.g., single ACL) and a non-optimized implementation (e.g., ACL per FG). The measurements/statistics were taken from the following test configuration: $3^{rd}$ Gen Intel® Xeon scalable processor (Ice Lake); 300 CMs per vCMTS instance; Rx Packet Batch Size of 64 packets; iMix distribution of input packet sizes; and an FG/FR configuration of 22 filter groups with 22 filter rules per filter group (e.g., the "22FGs/22FRs-per-FG" configuration of FIG. 13). Graph 1400 shows a significant shift in DPDK ACL lookups from predominately scalar and sse4 paths to the avx512x32 path when the single ACL implementation is used.

Graphs 1300 and 1400 show that using a single ACL for DOCSIS filter processing 913 of a batch of data packets ensures that an optimal code path of an ACL library, such as a code path that utilizes the widest 512-bit CPU instructions, will be used during the DOCSIS filter processing 900. This provides a significant reduction in CPU cycles for the DOCSIS filtering stage 913 of the DOCSIS MAC downstream data-plane pipeline 900, and results in a constant cycle count regardless of the number of filter groups and filter rules that are configured, unlike the linear increasing cycle count when an ACL per filter group implementation is used. To allow a single ACL implementation to be used, and to avoid any potential false hits, the filter group ID is included in each filter rule and in the target filter lookup object. Furthermore, although the single ACL-based filtering techniques are discussed herein as being applicable to downstream filtering, the single ACL-based filtering techniques can also be applied to upstream filtering mechanisms and/or UDC-based filtering in addition to downstream filtering mechanisms.

2. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g, UEs, IoT devices, and/or the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g, memory, CPU, GPU, interrupt controller, I/O controller, memory controller, bus controller, network connections or sessions, and/or the like) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g, VM or container engine, and/or the like). The orchestration functions may be used to deploy the isolated user-space instances, identifying and scheduling use of specific hardware, security related functions (e.g, key management, trust anchor management, and/or the like), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g, video on demand, content streaming, security surveillance, alarm system monitoring, building access, data/content caching, and/or the like), gaming services (e.g, AR/VR, and/or the like), accelerated browsing, IoT and industry applications (e.g, factory automation), media analytics, live streaming/transcoding, and V2X applications (e.g, driving assistance and/or autonomous driving applications).

The present disclosure provides various examples relevant to various edge computing technologies (ECTs) and edge network configurations provided within and various access/network implementations. Any suitable standards and network implementations are applicable to the edge computing concepts discussed herein. For example, many ECTs and networking technologies may be applicable to the present disclosure in various combinations and layouts of devices located at the edge of a network. Examples of such ECTs include [MEC]; [O-RAN]; [ISEO]; [SA6Edge]; [MAMS]; Content Delivery Networks (CDNs) (also referred to as "Content Distribution Networks" or the like); Mobility Service Provider (MSP) edge computing and/or Mobility as a Service (MaaS) provider systems (e.g, used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure. The edge computing systems and arrangements discussed herein may be applicable in various solutions, services, and/or use cases involving mobility. Examples of such scenarios are shown and described with respect to FIGS. 15-17.

Figure 15:
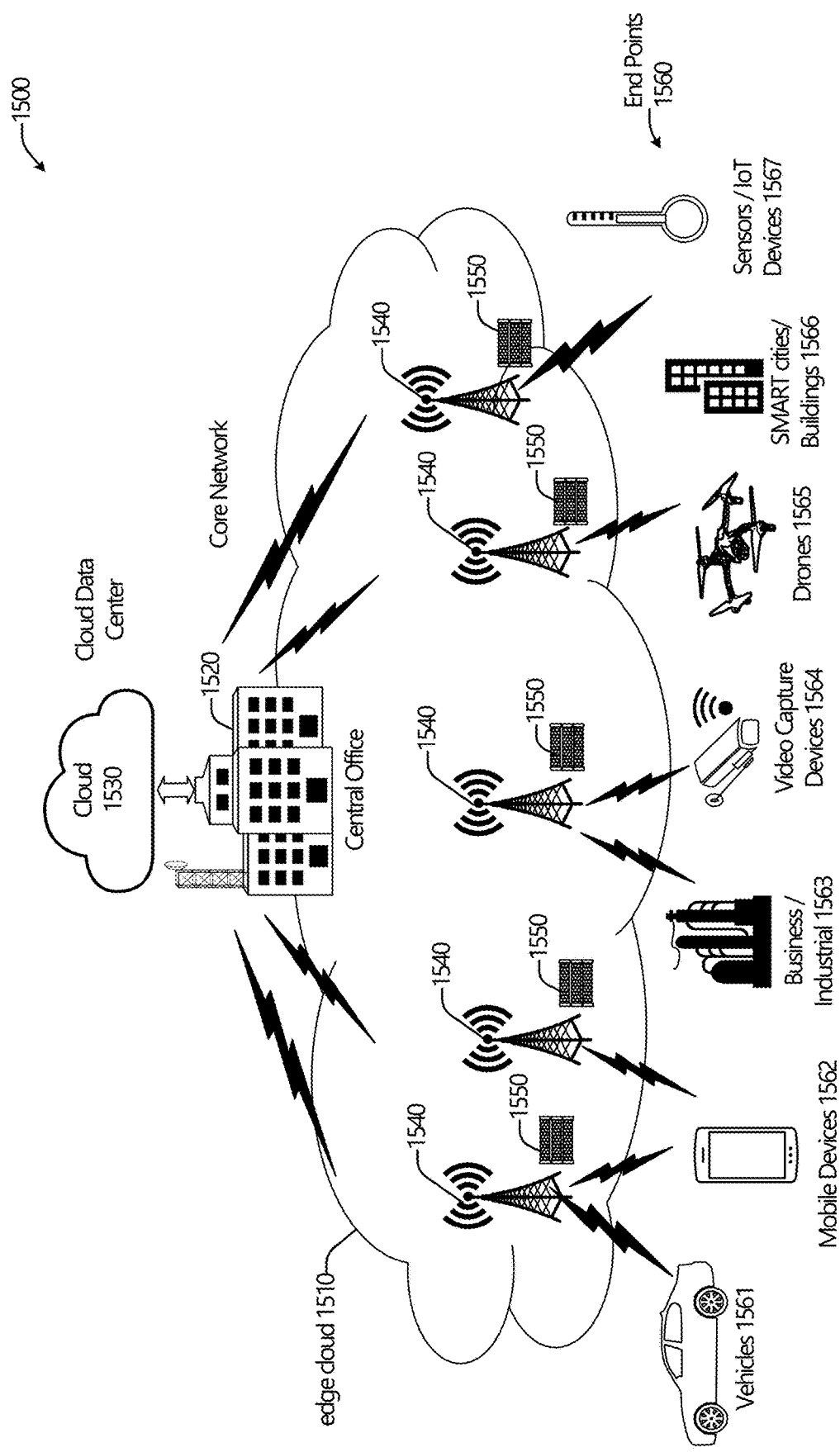
FIG. 15 depicts an edge cloud configuration for edge computing.

FIG. 15 illustrates an edge computing configuration 1500, which includes a layer of processing referred to as an "edge cloud" 1510. The edge cloud 1510 is disposed or co-located at one or more edge locations, such as at or near one or more network access nodes (NANs) 1540 (e.g., an access point, base station, or the like), a local processing hub 1550 (also referred to as "edge compute nodes 1550", "edge servers 1550", or the like), or a central office 1520, and may include multiple entities, devices, and equipment instances. The edge cloud 1510 is located much closer to the endpoint (consumer and producer) data sources 1560 (e.g, autonomous vehicles 1561, mobile devices 1562, business and industrial equipment 1563, video capture devices 1564, drones 1565, smart cities and building devices 1566, sensors and IoT devices 1567, and/or the like) than the cloud data center 1530. Compute, memory, and storage resources which are offered at the edges in the edge cloud 1510 are critical to providing ultra-low latency response times for services and functions used by the endpoint data sources 1560 as well as reduce network backhaul traffic from the edge cloud 1510 toward cloud data center 1530 thus improving energy consumption and overall network usages among other benefits.

Compute, memory, and storage are scarce resources, and generally decrease depending on the edge location (e.g, fewer processing resources being available at consumer endpoint devices, than at a base station, than at a central office). However, the closer that the edge location is to an endpoint (e.g, user equipment (UE) 1560), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

An edge cloud architecture covers multiple potential deployments and addresses restrictions that some network operators or service providers may have in their own infrastructures. These include variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform implemented at network access nodes (NANs) (e.g., base stations, access points, gateways, routers, switches, hubs, network appliances, and/or the like) and/or other devices that are much closer to endpoint devices producing and consuming data. For example, edge compute nodes may be equipped with pools of memory and storage resources to perform computation in real-time (or near real-time) for low latency use-cases (e.g, autonomous driving or video surveillance) for connected devices. In another example, a NAN can be augmented with, or otherwise include, compute and acceleration resources to directly process service workloads for connected user equipment, without further communicating data via backhaul networks. In another example, central office network management hardware may be replaced with standardized compute hardware that performs virtualized network functions and offers compute resources for the execution of services and consumer functions for connected devices. Additionally or alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. For example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

As shown by FIG. 15, each NAN 1540 is co-located with an edge compute node 1550 (or "edge server 1550"). In any of the implementations discussed herein, the edge servers 1550 provide a distributed computing environment for application and service hosting, and also provide storage and processing resources so that data and/or content can be processed in close proximity to subscribers (e.g, users of UEs 1560) for faster response times The edge servers 1550 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1550 from the UEs 1560, cloud 1530, and/or central office/server(s) 1520, or vice versa. For example, a device application or client application operating in a UE 1560 may offload application tasks or workloads to one or more edge servers 1550. In another example, an edge server 1550 may offload application tasks or workloads to one or more UE 1560. In another example, the edge servers 1550 include one or more vCMTS platforms (e.g., vCMTS platform 720) and/or host one or more vCMTS instances (e.g., vCMTS instances 721) and/or vCMTS data-plane instances (e.g., CMTS instances 722) that perform DOCSIS filter processing according to the various example implementations discussed herein. Additionally or alternatively, the endpoint devices 1560 can include one or more CMs (e.g., CM 105 of FIG. 1, CM 205 of FIG. 2, CMs 305 of FIG. 3, CMs 405 of FIG. 4, CM 505 of FIG. 5, and/or CM 605 of FIG. 6) and/or one or more CPE types (e.g., Sub, MTA, PS, STB, and/or CM such as any of the CPEs or other devices discussed previously with respect to FIGS. 1-14).

The edge compute nodes 1550 may include or be part of an edge system or edge computing network that employs one or more ECTs. An ECT includes a collection of edge servers 1550 and edge management systems (not shown by FIG. 15) used to run edge applications (apps) within an operator network or a subset of an operator network. Each edge server 1550 is one or more physical computer systems that may include an edge platform and/or virtualization infrastructure, and provide compute, storage, and network resources for edge apps and/or various edge services (e.g, computational task and/or workload offloading, cloud-computing capabilities, IT services, and other like resources and/or services as discussed herein) in relatively close proximity to UEs 1560. The VI of the edge servers 1550 provide virtualized environments and virtualized resources for the edge hosts, and the edge computing applications may run as VMs and/or application containers on top of the VI.

In one example, the ECT is and/or operates according to the MEC framework, as discussed in ETSI GR MEC 001 v3.1.1 (2022-01), ETSI GS MEC 003 v3.1.1 (2022-03), ETSI GS MEC 009 v3.1.1 (2021-06), ETSI GS MEC 010-1 v1.1.1 (2017-10), ETSI GS MEC 010-2 v2.2.1 (2022-02), ETSI GS MEC 011 v2.2.1 (2020-12), ETSI GS MEC 012 V2.2.1 (2022-02), ETSI GS MEC 013 V2.2.1 (2022-01), ETSI GS MEC 014 v2.1.1 (2021-03), ETSI GS MEC 015 v2.1.1 (2020-06), ETSI GS MEC 016 v2.2.1 (2020-04), ETSI GS MEC 021 v2.2.1 (2022-02), ETSI GR MEC 024 v2.1.1 (2019-11), ETSI GS MEC 028 V2.2.1 (2021-07), ETSI GS MEC 029 v2.2.1 (2022-01), ETSI MEC GS 030 v2.1.1 (2020-04), ETSI GR MEC 031 v2.1.1 (2020-10), U.S. Provisional App. No. 63/003,834 filed Apr. 1, 2020 ("[US '834]"), and Int'l App. No. PCT/US2020/066969 filed on Dec. 23, 2020 ("[PCT '696]") (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021-03), ETSI GS NFV 002 V1.2.1 (2014-12), ETSI GR NFV 003 V1.6.1 (2021-03), ETSI GS NFV 006 V2.1.1 (2021-01), ETSI GS NFV-INF 001 V1.1.1 (2015-01), ETSI GS NFV-INF 003 V1.1.1 (2014-12), ETSI GS NFV-INF 004 V1.1.1 (2015-01), ETSI GS NFV-MAN 001 v1.1.1 (2014-12), and/or Israel et al, *OSM Release FIVE Technical Overview*, ETSI OPEN SOURCE MANO, OSM White Paper, 1st ed. (January 2019), https://osm.etsi.org/images/OSM-Whitepaper-Tech-Content-ReleaseFIVE-FINAL.pdf (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma.com/newsroom/wp-content/uploads//NG.127-v1.0-2.pdf, *Open Network Automation Platform (ONAP) documentation*, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.1.0 (2021-12-23) ("[TS28533]"), the contents of each of which are hereby incorporated by reference in their entireties.

In another example, the ECT is and/or operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and inter-operability at every level, several key players interested in the wireless domain (e.g, carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v05.00, O-RAN ALLIANCE WG1 (July 2021); *O-RAN Operations and Maintenance Architecture Specification* v04.00, O-RAN ALLIANCE WG1 (November 2020); *O-RAN Operations and Maintenance Interface Specification* v04.00, O-RAN ALLIANCE WG1 (November 2020); *O-RAN Information Model and Data Models Specification* v01.00, O-RAN ALLIANCE WG1 (November 2020); *O-RAN Working Group 1 Slicing Architecture* v05.00, O-RAN ALLIANCE WG1 (July 2021) ("[O-RAN.WG1.Slicing-Architecture]"); *O-RAN Working Group 2 (Non-RT RIC and A1 interface WG) A1 interface: Application Protocol* v03.01, O-RAN ALLIANCE WG2 (March 2021); *O-RAN Working Group 2 (Non-RT RIC and A1 interface WG) A1 interface: Type Definitions* v02.00, O-RAN ALLIANCE WG2 (July 2021); *O-RAN Working Group 2 (Non-RT RIC and A1 interface WG) A1 interface: Transport Protocol* v01.01, O-RAN ALLIANCE WG2 (March 2021); *O-RAN Working Group 2 AI/ML workflow description and requirements* v01.03 O-RAN ALLIANCE WG2 (July 2021); *O-RAN Working Group 2 Non-RT RIC: Functional Architecture* v01.03 O-RAN ALLIANCE WG2 (July 2021); *O-RAN Working Group 3, Near-Real-time Intelligent Controller, E2 Application Protocol (E2AP)* v02.00, O-RAN ALLIANCE WG3 (July 2021); *O-RAN Working Group 3 Near-Real-time Intelligent Controller Architecture & E2 General Aspects and Principles* v02.00, O-RAN ALLIANCE WG3 (July 2021); *O-RAN Working Group 3 Near-Real-time Intelligent Controller E2 Service Model (E2SM)* v02.00, O-RAN ALLIANCE WG3 (July 2021); *O-RAN Working Group 3 Near-Real-time Intelligent Controller E2 Service Model (E2SM) KPM* v02.00, O-RAN ALLIANCE WG3 (July 2021); *O-RAN Working Group 3 Near-Real-time Intelligent Controller E2 Service Model (E2SM) RAN Function Network Interface (NI)* v01.00, O-RAN ALLIANCE WG3 (February 2020); *O-RAN Working Group 3 Near-Real-time Intelligent Controller E2 Service Model (E2SM) RAN Control* v01.00, O-RAN ALLIANCE WG3 (July 2021); *O-RAN Working Group 3 Near-Real-time Intelligent Controller Near-RT RIC Architecture* v02.00, O-RAN ALLIANCE WG3 (March 2021); *O-RAN Fronthaul Working Group 4 Cooperative Transport Interface Transport Control Plane Specification* v02.00, O-RAN ALLI- ANCE WG4 (March 2021); *O-RAN Fronthaul Working Group 4 Cooperative Transport Interface Transport Management Plane Specification* v02.00, O-RAN ALLIANCE WG4 (March 2021); *O-RAN Fronthaul Working Group 4 Control, User, and Synchronization Plane Specification* v07.00, O-RAN ALLIANCE WG4 (July 2021) ("[O-RAN.WG4.CUS]"); *O-RAN Fronthaul Working Group 4 Management Plane Specification* v07.00, O-RAN ALLIANCE WG4 (July 2021); *O-RAN Open F1/W1/E1/X2/Xn Interfaces Working Group Transport Specification* v01.00, O-RAN ALLIANCE WG5 (April 2020); *O-RAN Alliance Working Group 5 O1 Interface specification for O-DU* v02.00, O-RAN ALLIANCE WGX (July 2021); *Cloud Architecture and Deployment Scenarios for O-RAN Virtualized RAN* v02.02, O-RAN ALLIANCE WG6 (July 2021); *O-RAN Acceleration Abstraction Layer General Aspects and Principles* v01.01, O-RAN ALLIANCE WG6 (July 2021); *Cloud Platform Reference Designs* v02.00, O-RAN ALLIANCE WG6 (November 2020); *O-RAN O2 Interface General Aspects and Principles* v01.01, O-RAN ALLIANCE WG6 (July 2021); *O-RAN White Box Hardware Working Group Hardware Reference Design Specification for Indoor Pico Cell with Fronthaul Split Option 6* v02.00, O-RAN ALLIANCE WG7 (July 2021) ("[O-RAN.WG7.IPC-HRD-Opt6]"); *O-RAN WG7 Hardware Reference Design Specification for Indoor Picocell (FR1) with Split Option 7-2* v03.00, O-RAN ALLIANCE WG7 (July 2021) ("[O-RAN.WG7.IPC-HRD-Opt7]"); *O-RAN WG7 Hardware Reference Design Specification for Indoor Picocell (FR1) with Split Option 8* v03.00, O-RAN ALLIANCE WG7 (July 2021) ("[O-RAN.WG7.IPC-HRD-Opt8]"); *O-RAN Open Transport Working Group 9 Xhaul Packet Switched Architectures and Solutions* v02.00, O-RAN ALLIANCE WG9 (July 2021) ("[ORAN-WG9.XPAAS]"); *O-RAN Open X-haul Transport Working Group Management interfaces for Transport Network Elements* v02.00, O-RAN ALLIANCE WG9 (July 2021) ("[ORAN-WG9.XTRP-MGT]"); *O-RAN Open X-haul Transport WG9 WDM-based Fronthaul Transport* v01.00, O-RAN ALLIANCE WG9 (November 2020) ("[ORAN-WG9.WDM]"); *O-RAN Open X-haul Transport Working Group Synchronization Architecture and Solution Specification* v01.00, O-RAN ALLIANCE WG9 (March 2021) ("[ORAN-WG9.XTRP-SYN]"); *O-RAN Operations and Maintenance Interface Specification* v05.00, O-RAN ALLIANCE WG10 (July 2021); *O-RAN Operations and Maintenance Architecture* v05.00, O-RAN ALLIANCE WG10 (July 2021); *O-RAN: Towards an Open and Smart RAN*, O-RAN ALLIANCE, White Paper (October 2018), https://static1.squarespace.com/static/5ad774cce74940d7115044b0/t/5bc79b371905f4197055e8c6/1539808057078/O-RAN+WP+FInal+181017.pdf ("[ORANWP]"), and U.S. application Ser. No. 17/484,743 filed on 24 Sep. 2021 ("[US '743]") (collectively referred to as "[O-RAN]"); the contents of each of which are hereby incorporated by reference in their entireties.

In another example, the ECT operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.3.0 (2022-03-23) ("[TS23558]"), 3GPP TS 23.501 v17.4.0 (2022-03-23) ("[TS23501]"), and U.S. application Ser. No. 17/484,719 filed on 24 Sep. 2021 ("[US '719]") (collectively referred to as "[SA6Edge]"), the contents of each of which is hereby incorporated by reference in their entireties. In another example implementation, the ECT is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github.io/ ("[ISEO]"), the contents of which is hereby incorporated by reference in its entirety. In another example, the ECT operates according to the Multi-Access Management Services (MAMS) framework as discussed in Kanugovi et al., *Multi-Access Management Services (MAMS)*, INTERNET ENGINEERING TASK FORCE (IETF), Request for Comments (RFC) 8743 (March 2020) ("[RFC8743]"), Ford et al., *TCP Extensions for Multipath Operation with Multiple Addresses*, IETF RFC 8684, (March 2020), De Coninck et al., *Multipath Extensions for QUIC (MP-QUIC)*, IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-INTAREA-MAMS-USER-PROTOCOL-09, IETA, INTAREA (4 Mar. 2020), and Zhu et al., *Generic Multi-Access (GMA) Convergence Encapsulation Protocols*, IETF RFC 9188 (February 2022) (collectively referred to as "[MAMS]"), the contents of each of which are hereby incorporated by reference in their entireties.

It should be understood that the aforementioned edge computing frameworks/ECTs and service deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

Edge computing within the edge cloud 1510 provides the ability to serve and respond to multiple applications (e.g, object tracking, video surveillance, connected cars, and/or the like) in real-time or near real-time, and meet ultra-low latency requirements for these multiple applications. These advantages enable a whole new class of applications (e.g., VNFs, Function as a Service (FaaS), Edge as a Service (EaaS), standard processes, and/or the like), which cannot leverage conventional cloud computing due to latency and/or other limitations. However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g, when housed in a third-party location). Such issues are magnified in the edge cloud 1510 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud

1510, which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1510.

As such, the edge cloud 1510 is formed from network components and functional features operated by and within edge gateway nodes, edge aggregation nodes, or other edge compute nodes among various network layers. The edge cloud 1510 thus may be embodied as any type of network that provides edge computing and/or storage resources which are proximately located to radio access network (RAN) capable endpoint devices (e.g., mobile computing devices, IoT devices, smart devices, and/or the like), which are discussed herein. In other words, the edge cloud 1510 may be envisioned as an "edge" which connects the endpoint devices and traditional network access points that serve as an ingress point into service provider core networks, including mobile carrier networks (e.g, Global System for Mobile Communications (GSM) networks, Long-Term Evolution (LTE) networks, 5G/6G networks, and/or the like), while also providing storage and/or compute capabilities. Other types and forms of network access (e.g, Wi-Fi, long-range wireless, wired networks including optical networks) may also be utilized in place of or in combination with such 3GPP carrier networks.

The network components of the edge cloud 1510 can include servers, network appliances, and/or any other type of computing devices. For example, the edge cloud 1510 may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, ruggedization, hazardous environment protection (e.g, EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g, poles, antenna structures, and/or the like) and/or racks (e.g, server racks, blade mounts, and/or the like). Example housings and/or surfaces thereof may support one or more sensors (e.g, temperature sensors, vibration sensors, light sensors, acoustic sensors, capacitive sensors, proximity sensors, and/or the like). One or more such sensors may be contained in, carried by, or otherwise embedded in the surface and/or mounted to the surface of the appliance. Example housings and/or surfaces thereof may support mechanical connectivity, such as propulsion hardware (e.g, wheels, propellers, and/or the like) and/or articulating hardware (e.g, robot arms, pivotable appendages, and/or the like). In some circumstances, the sensors may include any type of input devices such as user interface hardware (e.g, buttons, switches, dials, sliders, and/or the like). In some circumstances, example housings include output devices contained in, carried by, embedded therein and/or attached thereto. Output devices may include displays, touchscreens, lights, LEDs, speakers, I/O ports (e.g, USB), and/or the like. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, and/or the like. Example hardware for implementing an appliance computing device is described in conjunction with FIG. 19. The edge cloud 1510 may also include one or more servers and/or one or more multi-tenant servers. Such a server may include an operating system and implement a virtual computing environment. A virtual computing environment may include a hypervisor managing (e.g, spawning, deploying, destroying, and/or the like) one or more VMs, one or more OS or virtualization containers, and/or the like. Such virtual computing environments provide an execution environment in which one or more applications and/or other software, code or scripts can be executed while being isolated from one or more other applications, software, code or scripts.

Figure 16:
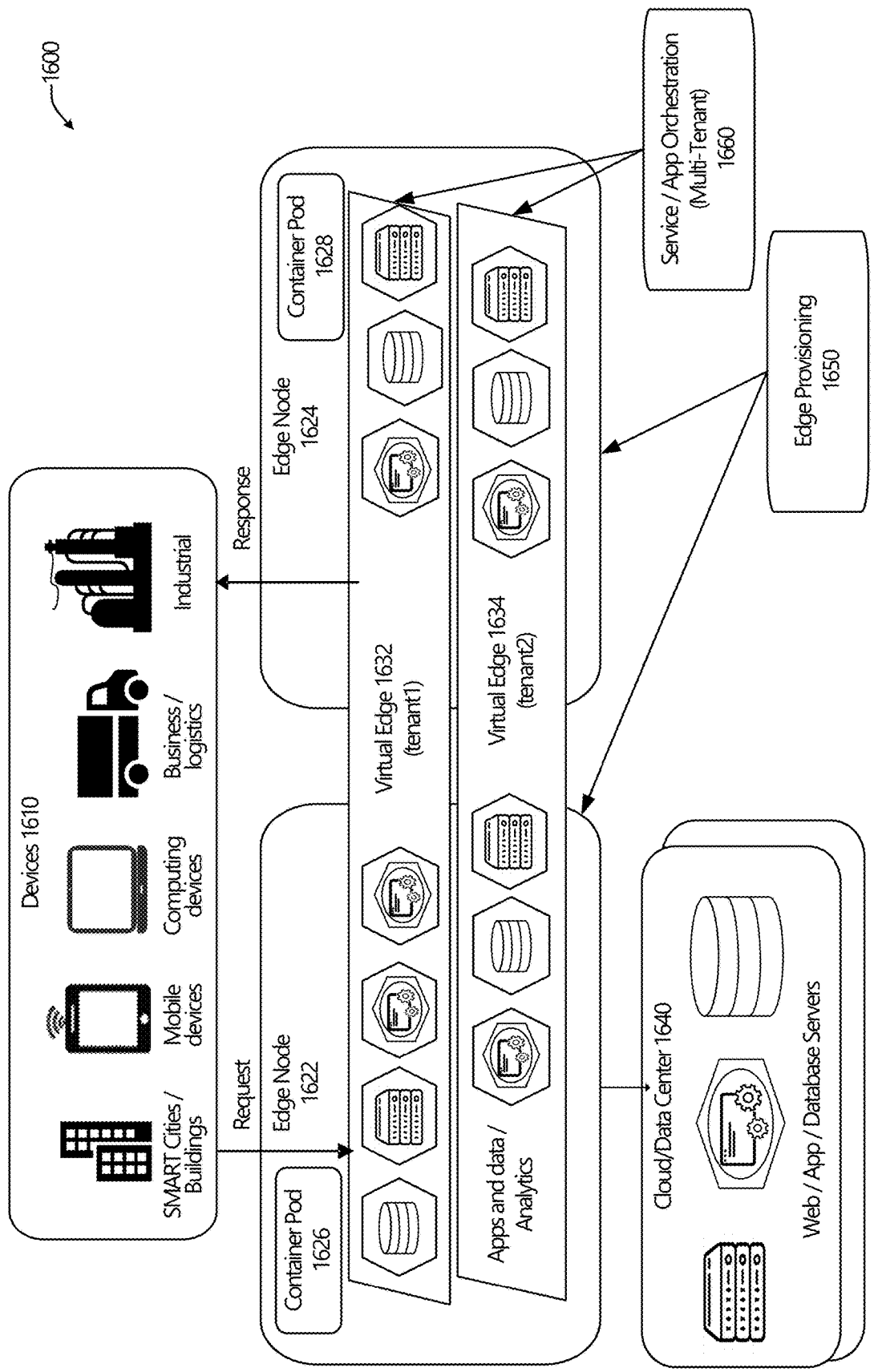
FIG. 16 depicts a virtual edge configuration in an edge computing system.

FIG. 16 illustrates deployment and orchestration for virtualized and container-based edge configurations across an edge computing system 1600 operated among multiple edge nodes and/or multiple tenants (e.g., users, providers, subscribers, and the like) which use such edge nodes. The edge computing system 1600 includes a first edge node 1622 and a second edge node 1624 that are coordinated to fulfill requests and responses for various endpoint devices 1610 (e.g, smart cities, building systems, mobile devices, computing devices, business/logistics systems, industrial systems, and/or the like), which access various virtual edge instances 1632, 1634. Additionally or alternatively, the endpoint devices 1610 can include one or more CMs (e.g., CM 105 of FIG. 1, CM 205 of FIG. 2, CMs 305 of FIG. 3, CMs 405 of FIG. 4, CM 505 of FIG. 5, and/or CM 605 of FIG. 6) and/or one or more CPE types (e.g., Sub, MTA, PS, STB, and/or CM such as any of the CPEs or other devices discussed previously with respect to FIGS. 1-14). Here, the virtual edge instances 1632, 1634 provide edge compute capabilities and processing in an edge cloud, with access to a cloud/data center 1640 for higher-latency requests for websites, applications, database servers, and/or the like. However, the edge cloud 1510 enables coordination of processing among multiple edge nodes for multiple tenants or entities.

The virtual edge instances include a first virtual edge 1632 offered to a first tenant (Tenant 1), which offers a first combination of edge storage, computing, and services; and a second virtual edge 1634 offering a second combination of edge storage, computing, and services. The virtual edge instances 1632, 1634 are distributed among the edge nodes 1622, 1624, and may include scenarios in which a request and response are fulfilled from the same or different edge nodes. The configuration of the edge nodes 1622, 1624 to operate in a distributed yet coordinated fashion occurs based on edge provisioning functions 1650. The functionality of the edge nodes 1622, 1624 to provide coordinated operation for applications and services, among multiple tenants, occurs based on orchestration functions 1660.

Some of the devices in 1610 are multi-tenant devices where tenant 1 may function within a tenant 1 'slice' while a tenant 2 may function within a tenant 2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a device identity composition engine (DICE) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1622, 1624 may operate as security feature enforcement points for local resources allocated to multiple tenants per node. Additionally, tenant runtime and application execution (e.g., in instances 1632, 1634) may serve as an enforcement point for a security feature that creates a virtual edge abstraction of resources spanning potentially multiple physical hosting platforms. Finally, the orchestration functions 1660 at an orchestration entity may operate as a security feature enforcement point for marshalling resources along tenant boundaries.

Edge compute nodes may partition resources (e.g., memory, central processing unit (CPU), graphics processing unit (GPU), interrupt controller, input/output (I/O) controller, memory controller, bus controller, and/or the like) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1610, 1622, and 1640 may coordinate the establishment of a distributed trusted computing base (DTCB) such that a tenant-specific virtual trusted secure channel linking all elements end to end can be established.

In some cases, a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 16. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; and/or the like). The virtual edge instances may also be spanned across systems of multiple owners at different geographic locations (or, respective computing systems and resources which are co-owned or co-managed by multiple owners).

For instance, each edge node 1622, 1624 may implement the use of containers, such as with the use of a container pod 1626, 1628 providing a group of one or more containers. In a setting that uses one or more container pods, a pod controller or orchestrator 1660 is responsible for local control and orchestration of the containers in the pod 1626, 1628. Various edge node resources (e.g., storage, compute, services, depicted with hexagons in FIG. 16) are provided for the respective edge slices 1632, 1634, and are partitioned according to the needs of each container. Here, each container pod 1626, 1628 can host a vCMTS instance 721 and/or CMTS 722 that perform DOCSIS filter processing according to the various example implementations discussed herein, and the pod controller/orchestrator 1660 may be the same or similar as the controller/orchestrator 712 discussed previously. With the use of container pods, a pod controller oversees the partitioning and allocation of containers and resources. The pod controller receives instructions from an orchestrator 1660 that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1660 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 17:
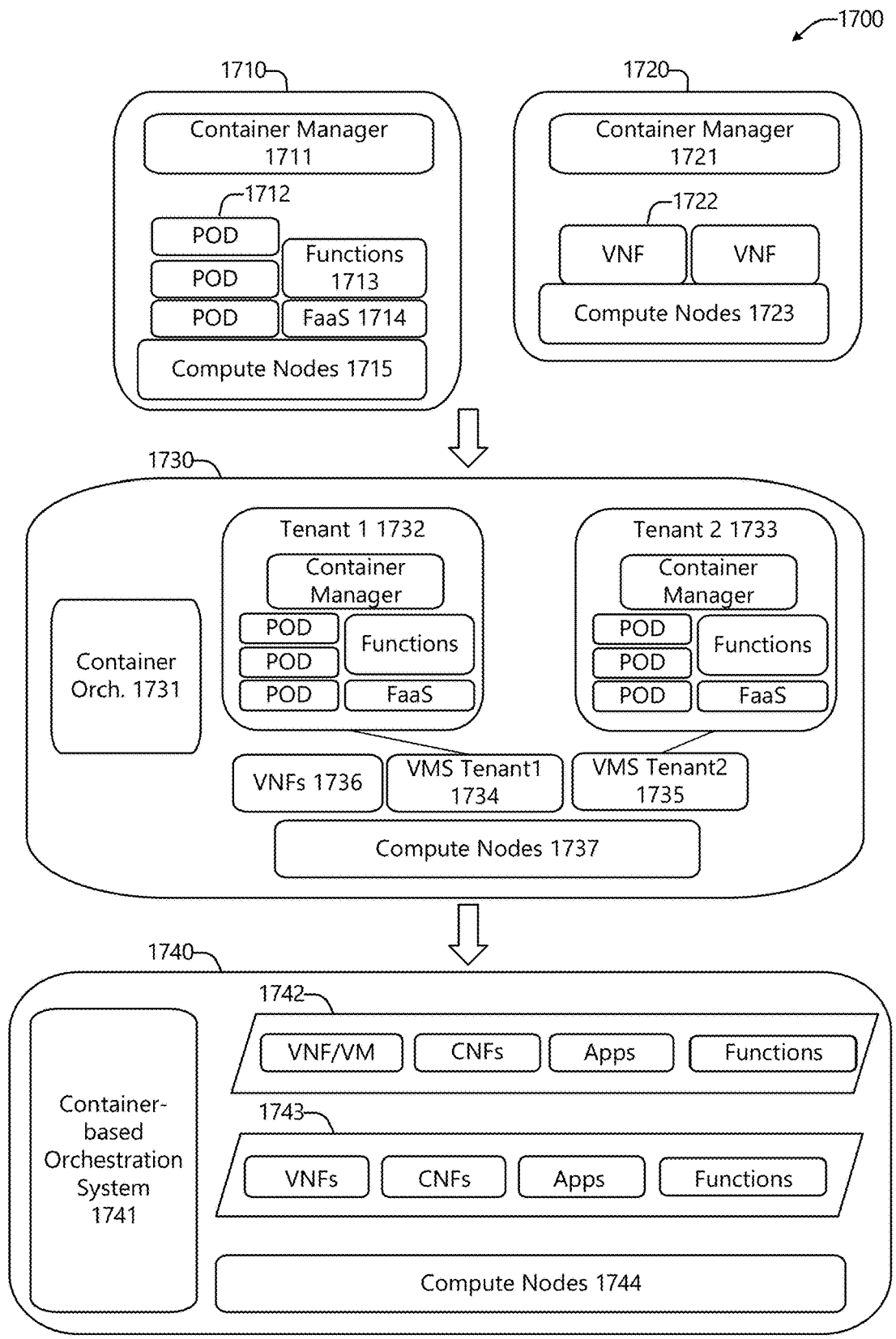
FIG. 17 illustrates various compute arrangements deploying containers in an edge computing system.

FIG. 17 illustrates additional compute arrangements deploying containers in an edge computing system 1700. As an example, system arrangements 1710, 1720 depict settings in which a pod controller (e.g, container managers 1711, 1721, and container orchestrator 1731) is adapted to launch containerized pods, functions, and FaaS instances through execution via compute nodes 1715 in arrangement 1710, and/or to separately execute containerized VNFs through execution via compute nodes 1723 in arrangement 1720. This arrangement is adapted for use of multiple tenants in arrangement 1730 using compute nodes 1737, where containerized pods 1712, functions 1713, VNFs 1722, 1736, and FaaS instances 1714 are launched within VMs 1734, 1735 for tenants 1732, 1733 specific to respective tenants (aside from the execution of VNFs). This arrangement is further adapted for use in arrangement 1740, which provides containers 1742, 1743 and/or execution of the VNFs, applications, and functions on compute nodes 1744, as coordinated by a container-based orchestration system 1741.

In an example implementation, compute nodes 1715, 1723, 1737, 1744 may be or include a vCMTS platform 720; the pods 1712, functions 1713, VNFs 1722, 1736, FaaS instances 1714, and/or containers 1742, 1743 correspond to one or more vCMTS instances 721 and/or CMTS instances 722; and the container managers 1711, 1721, container orchestrator 1731, and/or container-based orchestration system 1741 correspond to the controller/orchestrator 712 discussed previously.

The system arrangements in FIG. 17 provide an architecture that treats VMs, containers, and functions equally in terms of application composition, and resulting applications are combinations of these three ingredients. Each ingredient may involve use of one or more accelerator components (e.g., FPGAs, ASICs, and the like) as a local backend. In this manner, applications can be split across multiple edge owners, coordinated by an orchestrator. In the context of FIG. 17, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g, by an upgrade, reconfiguration, or provision of new features within the hardware configuration itself).

3. Software Distribution Systems and Arrangements

Figure 18:
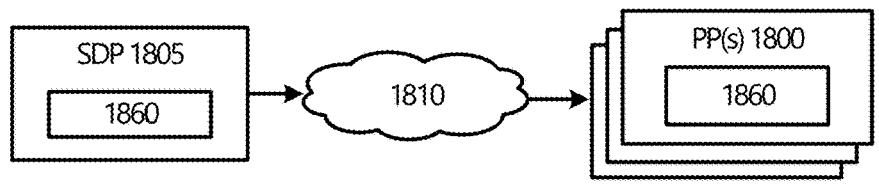
FIG. 18 illustrates an example software distribution platform.
Figure 19:
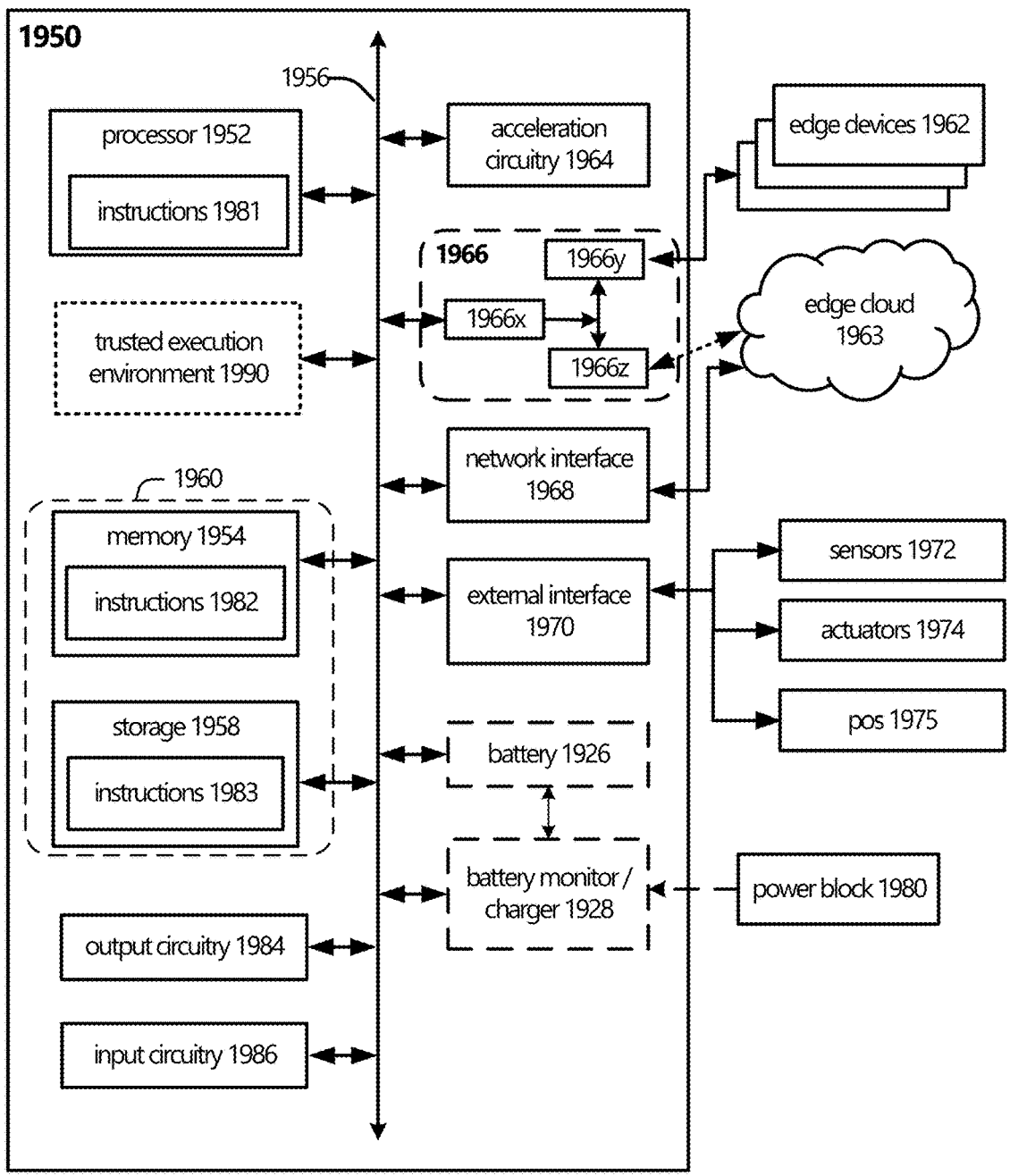
FIG. 19 depict example components of various compute nodes, which may be used in edge computing system(s).

FIG. 18 illustrates an example software distribution platform 1805 to distribute software 1860, such as the example computer readable instructions 1960 of FIG. 19, to one or more devices, such as example processor platform(s) 1800 and/or example connected edge devices 1962 (see e.g, FIG. 19) and/or any of the other computing systems/devices discussed herein. The example software distribution platform 1805 may be implemented by any computer server, data facility, cloud service, and/or the like, capable of storing and transmitting software to other computing devices (e.g., third parties, the example connected edge devices 1962 of FIG. 19). Example connected edge devices may be customers, clients, managing devices (e.g, servers), third parties (e.g, customers of an entity owning and/or operating the software distribution platform 1805). Example connected edge devices may operate in commercial and/or home automation environments. In some examples, a third party is a developer, a seller, and/or a licensor of software such as the example computer readable instructions 1960 of FIG. 19. The third parties may be consumers, users, retailers, OEMs, and/or the like that purchase and/or license the software for use and/or re-sale and/or sub-licensing. In some examples, distributed software causes display of one or more user interfaces (UIs) and/or graphical user interfaces (GUIs) to identify the one or more devices (e.g, connected edge devices) geographically and/or logically separated from each other (e.g, physically separated IoT devices chartered with the responsibility of water distribution control (e.g, pumps), electricity distribution control (e.g, relays), and/or the like).

In the illustrated example of FIG. 18, the software distribution platform 1805 includes one or more servers and one or more storage devices. The storage devices store the computer readable instructions 1860, which may correspond to the example computer readable instructions 1960 of FIG. 19, as described above. The one or more servers of the example software distribution platform 1805 are in communication with a network 1810, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1860 from the software distribution platform 1805. For example, the software 1860, which may correspond to the example computer readable instructions 1960 of FIG. 19, may be downloaded to the example processor platform(s) 1800, which is/are to execute the computer readable instructions 1860 to implement Radio apps.

In some examples, one or more servers of the software distribution platform 1805 are communicatively connected to one or more security domains and/or security devices through which requests and transmissions of the example computer readable instructions 1860 must pass. In some examples, one or more servers of the software distribution platform 1805 periodically offer, transmit, and/or force updates to the software (e.g, the example computer readable instructions 1960 of FIG. 19) to ensure improvements, patches, updates, and/or the like are distributed and applied to the software at the end user devices.

In the illustrated example of FIG. 18, the computer readable instructions 1860 are stored on storage devices of the software distribution platform 1805 in a particular format. A format of computer readable instructions includes, but is not limited to a particular code language (e.g., Java, JavaScript, Python, C, C #, SQL, HTML, and/or the like), and/or a particular code state (e.g, uncompiled code (e.g., ASCII), interpreted code, linked code, executable code (e.g., a binary), and/or the like). In some examples, the computer readable instructions D182 stored in the software distribution platform 1805 are in a first format when transmitted to the example processor platform(s) 1800. In some examples, the first format is an executable binary in which particular types of the processor platform(s) 1800 can execute. However, in some examples, the first format is uncompiled code that requires one or more preparation tasks to transform the first format to a second format to enable execution on the example processor platform(s) 1800. For instance, the receiving processor platform(s) 1800 may need to compile the computer readable instructions 1860 in the first format to generate executable code in a second format that is capable of being executed on the processor platform(s) 1800. In still other examples, the first format is interpreted code that, upon reaching the processor platform(s) 1800, is interpreted by an interpreter to facilitate execution of instructions.

4. Hardware Components

FIG. 19 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g, a navigation system), or other device or system capable of performing the described functions.

FIG. 19 illustrates an example of components that may be present in an compute node 1950 for implementing the techniques (e.g, operations, processes, methods, and methodologies) described herein. This compute node 1950 provides a closer view of the respective components of node 1950 when implemented as or as part of a computing device (e.g, as a mobile device, a base station, server, gateway, and/or the like). The compute node 1950 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 1950, or as components otherwise incorporated within a chassis of a larger system.

The compute node 1950 includes processing circuitry in the form of one or more processors 1952. The processor circuitry 1952 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1952 may include one or more hardware accelerators (e.g, same or similar to acceleration circuitry 1964), which may be microprocessors, programmable processing devices (e.g, FPGA, ASIC, and/or the like), or the like. The one or more accelerators may include, for example, computer vision and/or deep learning accelerators. In some implementations, the processor circuitry 1952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1952 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special-purpose processing unit, an specialized x-processing unit (XPU), a data processing unit (DPU), an Infrastructure Processing Unit (IPU), a network processing unit (NPU), and/or any other known processing elements, or any suitable combination thereof. The processors (or cores) 1952 may be coupled with or may include memory/storage and may be configured to execute instructions stored in the memory/storage to enable various applications or operating systems to run on the platform 1950. The processors (or cores) 1952 is configured to operate application software to provide a specific service to a user of the platform 1950. Additionally or alternatively, the processor(s) 1952 may be a special-purpose processor(s)/controller(s) configured (or configurable) to operate according to the elements, features, and implementations discussed herein.

As examples, the processor(s) 1952 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc, Snapdragon™ or Centriq™ processor(s) from Qualcomm® Technologies, Inc, Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd, such as the ARM Cortex-A, Cortex-R, and Cortex-M family of processors; the ThunderX2® provided by Cavium™, Inc; or the like. In some implementations, the processor(s) 1952 may be a part of a system on a chip (SoC), System-in-Package (SiP), a multi-chip package (MCP), and/or the like, in which the processor(s) 1952 and other components are formed into a single integrated circuit, or a single package, such as the Edison™ or Galileo™ SoC boards from Intel® Corporation. Other examples of the processor(s) 1952 are mentioned elsewhere in the present disclosure.

The processor(s) 1952 may communicate with system memory 1954 over an interconnect (IX) 1956. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g, LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g, dual inline memory modules (DIMMs) of different varieties including but not limited to microDIMMs or MiniDIMMs.

To provide for persistent storage of information such as data, applications, operating systems and so forth, a storage 1958 may also couple to the processor 1952 via the IX 1956. In an example, the storage 1958 may be implemented via a solid-state disk drive (SSDD) and/or high-speed electrically erasable memory (commonly referred to as "flash memory"). Other devices that may be used for the storage 1958 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1954 and/or storage circuitry 1958 may also incorporate three-dimensional (3D) cross-point (XPOINT) memories from Intel® and Micron®. In low power implementations, the storage 1958 may be on-die memory or registers associated with the processor 1952. However, in some examples, the storage 1958 may be implemented using a micro hard disk drive (HDD). Further, any number of new technologies may be used for the storage 1958 in addition to, or instead of, the technologies described, such resistance change memories, phase change memories, holographic memories, or chemical memories, among others.

Computer program code for carrying out operations of the present disclosure (e.g, computational logic and/or instructions 1981, 1982, 1983) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1981, 1982, 1983 for carrying out operations of the present disclosure may also be written in any combination of the programming languages discussed herein. The program code may execute entirely on the system 1950, partly on the system 1950, as a stand-alone software package, partly on the system 1950 and partly on a remote computer or entirely on the remote computer or server. In the latter scenario, the remote computer may be connected to the system 1950 through any type of network, including a LAN or WAN, or the connection may be made to an external computer (e.g, through the Internet using an Internet Service Provider (ISP)).

In an example, the instructions 1981, 1982, 1983 on the processor circuitry 1952 (separately, or in combination with the instructions 1981, 1982, 1983) may configure execution or operation of a trusted execution environment (TEE) 1990. The TEE 1990 operates as a protected area and/or shielded location accessible to the processor circuitry 1902 to enable secure access to data and secure execution of instructions. In some implementations, the TEE 1990 is a physical hardware device that is separate from other components of the system 1950 such as a secure-embedded controller, a dedicated SoC, or a tamper-resistant chipset or microcontroller with embedded processing devices and memory devices. Examples of such examples include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1990 may be implemented as secure enclaves (or "enclaves"), which are isolated regions of code and/or data within the processor and/or memory/storage circuitry of the compute node 1950. Only code executed within a secure enclave may access data within the same secure enclave, and the secure enclave may only be accessible using the secure application (which may be implemented by an application processor or a tamper-resistant microcontroller). Various implementations of the TEE 1990, and an accompanying secure area in the processor circuitry 1952 or the memory circuitry 1954 and/or storage circuitry 1958 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1900 through the TEE 1990 and the processor circuitry 1952. Additionally or alternatively, the memory circuitry 1954 and/or storage circuitry 1958 may be divided into isolated user-space instances such as virtualization/OS containers, partitions, virtual environments (VEs), and/or the like. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some examples, the memory circuitry 1904 and/or storage circuitry 1908 may be divided into one or more trusted memory regions for storing applications or software modules of the TEE 1990.

The components of edge computing device 1950 may communicate over an interconnect (IX) 1956. The IX 1956 may include any number of technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1956 may be a proprietary bus, for example, used in a SoC based system.

The IX 1956 couples the processor 1952 to communication circuitry 1966 for communications with other devices, such as a remote server (not shown) and/or the connected edge devices 1962. The communication circuitry 1966 is a hardware element, or collection of hardware elements, used to communicate over one or more networks (e.g, cloud 1963) and/or with other devices (e.g, edge devices 1962). Communication circuitry 1966 includes modem circuitry 1966x may interface with application circuitry of system 800 (e.g., a combination of processor circuitry 802 and CRM 860) for generation and processing of baseband signals and for controlling operations of the TRx 812. The modem circuitry 1966x may handle various radio control functions that enable communication with one or more (R)ANs via the transceivers (TRx) 1966y and 1966z according to one or more wireless communication protocols and/or RATs. The modem circuitry 1966x may include circuitry such as, but not limited to, one or more single-core or multi-core processors (e.g, one or more baseband processors) or control logic to process baseband signals received from a receive signal path of the TRxs 1966y, 1966z, and to generate baseband signals to be provided to the TRxs 1966y, 1966z via a transmit signal path. The modem circuitry 1966x may implement a real-time OS (RTOS) to manage resources of the modem circuitry 1966x, schedule tasks, perform the various radio control functions, process the transmit/receive signal paths, and the like.

The TRx 1966y may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1962. For example, a wireless local area network (WLAN) unit may be used to implement Wi-Fi® communications in accordance with a [IEEE802] standard (e.g., [IEEE80211] and/or the like). In addition, wireless wide area communications, e.g, according to a cellular or other wireless wide area protocol, may occur via a wireless wide area network (WWAN) unit.

The TRx 1966y (or multiple transceivers 1966y) may communicate using multiple standards or radios for communications at a different range. For example, the compute node 1950 may communicate with relatively close devices (e.g, within about 10 meters) using a local transceiver based on BLE, or another low power radio, to save power. More distant connected edge devices 1962 (e.g, within about 50 meters) may be reached over ZigBee® or other intermediate power radios. Both communications techniques may take place over a single radio at different power levels or may take place over separate transceivers, for example, a local transceiver using BLE and a separate mesh transceiver using ZigBee®.

A TRx 1966z (e.g, a radio transceiver) may be included to communicate with devices or services in the edge cloud 1963 via local or wide area network protocols. The TRx 1966z may be an LPWA transceiver that follows [IEEE802154] or IEEE 802.15.4g standards, among others. The compute node 1963 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 1966z, as described herein. For example, the TRx 1966z may include a cellular transceiver that uses spread spectrum (SPA/SAS) communications for implementing high-speed communications. Further, any number of other protocols may be used, such as WiFi® networks for medium speed communications and provision of network communications. The TRx 1966z may include radios that are compatible with any number of 3GPP specifications, such as LTE and 5G/NR communication systems.

A network interface controller (NIC) 1968 may be included to provide a wired communication to nodes of the edge cloud 1963 or to other devices, such as the connected edge devices 1962 (e.g, operating in a mesh, fog, and/or the like). The wired communication may provide an Ethernet connection (see e.g, Ethernet (e.g, IEEE Standard for Ethernet, IEEE Std 802.3-2018, pp. 1-5600 (31 Aug. 2018) ("[IEEE8023]")) or may be based on other types of networks, such as Controller Area Network (CAN), Local Interconnect Network (LIN), DeviceNet, ControlNet, Data Highway+, or PROFINET, a SmartNIC, Intelligent Fabric Processor(s) (IFP(s)), among many others. An additional NIC 1968 may be included to enable connecting to a second network, for example, a first NIC 1968 providing communications to the cloud over Ethernet, and a second NIC 1968 providing communications to other devices over another type of network.

Given the variety of types of applicable communications from the device to another component or network, applicable communications circuitry used by the device may include or be embodied by any one or more of components 1964, 1966, 1968, or 1970. Accordingly, in various examples, applicable means for communicating (e.g, receiving, transmitting, and/or the like) may be embodied by such communications circuitry.

The compute node 1950 may include or be coupled to acceleration circuitry 1964, which may be embodied by one or more AI accelerators, a neural compute stick, neuromorphic hardware, FPGAs, GPUs, SoCs (including programmable SoCs), vision processing units (VPUs), digital signal processors, dedicated ASICs, programmable ASICs, PLDs (e.g, CPLDs and/or HCPLDs), DPUs, IPUs, NPUs, and/or other forms of specialized processors or circuitry designed to accomplish one or more specialized tasks. Additionally or alternatively, the acceleration circuitry 1964 is embodied as one or more XPUs. In some implementations, an XPU is a multi-chip package including multiple chips stacked like tiles into an XPU, where the stack of chips includes any of the processor types discussed herein. Additionally or alternatively, an XPU is implemented by a heterogeneous computing system including multiple types of processor circuitry (e.g, one or more FPGAs, one or more CPUs, one or more GPUs, one or more DSPs, and/or the like, and/or a combination thereof) and application programming interface(s) (API(s)) that may assign computing task(s) to whichever one(s) of the multiple types of the processing circuitry is/are best suited to execute the computing task(s). In any of these implementations, the tasks may include AI/ML tasks (e. g, training, inferencing/prediction, classification, and the like), visual data processing, network data processing, infrastructure function management, object detection, rule analysis, or the like. In FPGA-based implementations, the acceleration circuitry 1964 may comprise logic blocks or logic fabric and other interconnected resources that may be programmed (configured) to perform various functions, such as the procedures, methods, functions, and/or the like. discussed herein. In such implementations, the acceleration circuitry 1964 may also include memory cells (e.g, EPROM, EEPROM, flash memory, static memory (e.g, SRAM, anti-fuses, and/or the like) used to store logic blocks, logic fabric, data, and/or the like. in LUTs and the like. Some examples of the acceleration circuitry 1964 can include one or more GPUs, Google® TPUs, AlphaICs® RAPs™, Intel® Nervana™ NNPs, Intel® Movidius™ Myriad™ X VPUs, NVIDIA® PX™ based GPUs, General Vision® NM500 chip, Tesla® Hardware 3 chip/platform, an Adapteva® Epiphany™ based processor, Qualcomm® Hexagon 685 DSP, Imagination Technologies Limited® PowerVR 2NX NNA, Apple® Neural Engine core, Huawei® NPU, and/or the like.

The IX 1956 also couples the processor 1952 to a sensor hub or external interface 1970 that is used to connect additional devices or subsystems. n some implementations, the interface 1970 can include one or more input/output (I/O) controllers. Examples of such I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), eXtensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 1954, storage circuitry 1958, and/or IX 1956 as well. The additional/external devices may include sensors 1972, actuators 1974, and positioning circuitry 1945.

The sensor circuitry 1972 includes devices, modules, or subsystems whose purpose is to detect events or changes in its environment and send the information (sensor data) about the detected events to some other a device, module, subsystem, and/or the like. Examples of such sensors 1972 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g, thermistors, including sensors for measuring the temperature of internal components and sensors for measuring temperature external to the compute node 1950); pressure sensors; barometric pressure sensors; gravimeters; altimeters; image capture devices (e.g, cameras); light detection and ranging (LiDAR) sensors; proximity sensors (e.g, infrared radiation detector and the like); depth sensors, ambient light sensors; optical light sensors; ultrasonic transceivers; microphones; and the like.

The actuators 1974, allow platform 1950 to change its state, position, and/or orientation, or move or control a mechanism or system. The actuators 1974 comprise electrical and/or mechanical devices for moving or controlling a mechanism or system, and converts energy (e.g, electric current or moving air and/or liquid) into some kind of motion. The actuators 1974 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1974 may include one or more electromechanical devices such as pneumatic actuators, hydraulic actuators, electromechanical switches including electromechanical relays (EMRs), motors (e.g, DC motors, stepper motors, servomechanisms, and/or the like), power switches, valve actuators, wheels, thrusters, propellers, claws, clamps, hooks, audible sound generators, visual warning devices, and/or other like electromechanical components. The platform 1950 may be configured to operate one or more actuators 1974 based on one or more captured events and/or instructions or control signals received from a service provider and/or various client systems.

The positioning circuitry 1945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g, Navigation with Indian Constellation (NAVIC), Japan's Quasi-Zenith Satellite System (QZSS), France's Doppler Orbitography and Radiopositioning Integrated by Satellite (DORIS), and/or the like), or the like. The positioning circuitry 1945 comprises various hardware elements (e.g, including hardware devices such as switches, filters, amplifiers, antenna elements, and the like to facilitate OTA communications) to communicate with components of a positioning network, such as navigation satellite constellation nodes. Additionally or alternatively, the positioning circuitry 1945 may include a Micro-Technology for Positioning, Navigation, and Timing (Micro-PNT) IC that uses a master timing clock to perform position tracking/ estimation without GNSS assistance. The positioning circuitry 1945 may also be part of, or interact with, the communication circuitry 1966 to communicate with the nodes and components of the positioning network. The positioning circuitry 1945 may also provide position data and/or time data to the application circuitry, which may use the data to synchronize operations with various infrastructure (e.g, radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g, EGNOS) and/or ground based positioning augmentation (e.g, DGPS). In some implementations, the positioning circuitry 1945 is, or includes an INS, which is a system or device that uses sensor circuitry 1972 (e.g, motion sensors such as accelerometers, rotation sensors such as gyroscopes, and altimimeters, magentic sensors, and/or the like to continuously calculate (e.g, using dead by dead reckoning, triangulation, or the like) a position, orientation, and/or velocity (including direction and speed of movement) of the platform 1950 without the need for external references.

In some optional examples, various input/output (I/O) devices may be present within or connected to, the compute node 1950, which are referred to as input circuitry 1986 and output circuitry 1984 in FIG. 19. The input circuitry 1986 and output circuitry 1984 include one or more user interfaces designed to enable user interaction with the platform 1950 and/or peripheral component interfaces designed to enable peripheral component interaction with the platform 1950. Input circuitry 1986 may include any physical or virtual means for accepting an input including, inter alia, one or more physical or virtual buttons (e.g, a reset button), a physical keyboard, keypad, mouse, touchpad, touchscreen, microphones, scanner, headset, and/or the like. The output circuitry 1984 may be included to show information or otherwise convey information, such as sensor readings, actuator position(s), or other like information. Data and/or graphics may be displayed on one or more user interface components of the output circuitry 1984. Output circuitry 1984 may include any number and/or combinations of audio or visual display, including, inter alia, one or more simple visual outputs/indicators (e.g, binary status indicators (e.g, light emitting diodes (LEDs)) and multi-character visual outputs, or more complex outputs such as display devices or touchscreens (e.g, Liquid Chrystal Displays (LCD), LED displays, quantum dot displays, projectors, and/or the like), with the output of characters, graphics, multimedia objects, and the like being generated or produced from the operation of the platform 1950. The output circuitry 1984 may also include speakers or other audio emitting devices, printer(s), and/or the like. Additionally or alternatively, the sensor circuitry 1972 may be used as the input circuitry 1984 (e.g, an image capture device, motion capture device, or the like) and one or more actuators 1974 may be used as the output device circuitry 1984 (e.g, an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1976 may power the compute node 1950, although, in examples in which the compute node 1950 is mounted in a fixed location, it may have a power supply coupled to an electrical grid, or the battery may be used as a backup or for temporary capabilities. The battery 1976 may be a lithium ion battery, or a metal-air battery, such as a zinc-air battery, an aluminum-air battery, a lithium-air battery, and the like.

A battery monitor/charger 1978 may be included in the compute node 1950 to track the state of charge (SoCh) of the battery 1976, if included. The battery monitor/charger 1978 may be used to monitor other parameters of the battery 1976 to provide failure predictions, such as the state of health (SoH) and the state of function (SoF) of the battery 1976. The battery monitor/charger 1978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1978 may communicate the information on the battery 1976 to the processor 1952 over the IX 1956. The battery monitor/charger 1978 may also include an analog-to-digital (ADC) converter that enables the processor 1952 to directly monitor the voltage of the battery 1976 or the current flow from the battery 1976. The battery parameters may be used to determine actions that the compute node 1950 may perform, such as transmission frequency, mesh network operation, sensing frequency, and the like.

A power block 1980, or other power supply coupled to a grid, may be coupled with the battery monitor/charger 1978 to charge the battery 1976. In some examples, the power block 1980 may be replaced with a wireless power receiver to obtain the power wirelessly, for example, through a loop antenna in the compute node 1950. A wireless battery charging circuit, such as an LTC4020 chip from Linear Technologies of Milpitas, California, among others, may be included in the battery monitor/charger 1978. The specific charging circuits may be selected based on the size of the battery 1976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1958 may include instructions 1982 in the form of software, firmware, or hardware commands to implement the techniques described herein. Although such instructions 1982 are shown as code blocks included in the memory 1954 and the storage 1958, it may be understood that any of the code blocks may be replaced with hardwired circuits, for example, built into an application specific integrated circuit (ASIC).

In an example, the instructions 1982 provided via the memory 1954, the storage 1958, or the processor 1952 may be embodied as a non-transitory, machine-readable medium 1960 including code to direct the processor 1952 to perform electronic operations in the compute node 1950. The processor 1952 may access the non-transitory, machine-readable medium 1960 over the IX 1956. For instance, the non-transitory, machine-readable medium 1960 may be embodied by devices described for the storage 1958 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 1960 may include instructions to direct the processor 1952 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and/or the like), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and/or the like) on one or several remote servers. The source code packages may be encrypted when in transit over a network and decrypted, uncompressed, assembled (e.g., linked) if necessary, and compiled or interpreted (e.g., into a library, stand-alone executable, and/or the like) at a local machine, and executed by the local machine.

The illustrations of FIG. 19 are intended to depict a high-level view of components of a varying device, subsystem, or arrangement of an compute node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIG. 19 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of to an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIG. 19 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g, a navigation system), or other device or system capable of performing the described functions.

While the illustrated example of FIG. 19 includes example components for a compute node and a computing device, respectively, examples disclosed herein are not limited thereto. As used herein, a "computer", "computing device", and/or "computing system" may include some or all of the example components of FIG. 19 in different types of computing environments. Example computing environments include edge computing devices (e.g, Edge computers) in a distributed networking arrangement such that particular ones of participating Edge computing devices are heterogenous or homogeneous devices. As used herein, a "computer", "computing device", and/or "computing system" may include a personal computer, a server, user equipment, an accelerator, and/or the like, including any combinations thereof. In some examples, distributed networking and/or distributed computing includes any number of such Edge computing devices as illustrated in FIG. 19, each of which may include different sub-components, different memory capacities, I/O capabilities, and/or the like. For example, because some implementations of distributed networking and/or distributed computing are associated with particular desired functionality, examples disclosed herein include different combinations of components illustrated in FIG. 19 to satisfy functional objectives of distributed computing tasks.

In some examples, computers operating in a distributed computing and/or distributed networking environment (e.g., an Edge network) are structured to accommodate particular objective functionality in a manner that reduces computational waste. For instance, because a computer includes a subset of the components disclosed in FIG. 19, such computers satisfy execution of distributed computing objective functions without including computing structure that would otherwise be unused and/or underutilized. As such, the term "computer" as used herein to includes any combination of structure of FIG. 19 that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIG. 19, computing devices include operating systems. As used herein, an "operating system" is software to control example computing devices, such as the example (Edge) compute node 1950 of FIG. 19. Example operating systems include, but are not limited to consumer-based operating systems (e.g, Microsoft® Windows® 10, Google® Android® OS, Apple® Mac® OS, and/or the like). Example operating systems also include, but are not limited to industry-focused operating systems, such as real-time operating systems, hypervisors, and/or the like. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first edge compute node includes a real-time operating system having particular performance expectations of responsivity to dynamic input conditions, and a second operating system corresponding to a second edge compute node includes graphical user interface capabilities to facilitate end-user I/O.

5. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method of filtering data packets in a packet processing pipeline, the method comprising: receiving a batch of packets to be processed by the packet processing pipeline, wherein each packet in the batch of packets includes a filter group identifier (GrpId) of a filter group to which it belongs, and at least one packet in the batch of packets belongs to a filter group that is different than a filter group to which other packets in the batch of packets belong; and performing, at a filter processing stage of the packet processing pipeline, a single access control list (ACL) lookup operation on a single ACL, wherein the single ACL includes a set of filter rules, and each filter rule of the set of filter rules includes a GrpId of a filter group to which it belongs.

Example 2 includes the method of example 1 and/or some other example(s) herein, wherein the method includes: utilizing a most optimal code path of an ACL library for performing the filter processing.

Example 3 includes the method of examples 1-2 and/or some other example(s) herein, wherein performing the single ACL lookup operation includes: sending an entirety of the batch of packets to an ACL library for the lookup operation in a single function call.

Example 4 includes the method of example 3 and/or some other example(s) herein, wherein the method includes: obtaining the set of filter rules based on the ACL lookup operation; and performing filter processing according to the set of filter rules.

Example 5 includes the method of example 4 and/or some other example(s) herein, wherein the method includes: applying no filter rule to each packet in the batch of packets that does not have a returned filter rule in the set of filter rules; or permitting each packet in the batch of packets that does not have a returned filter rule in the set of filter rules.

Example 6 includes the method of examples 4-5 and/or some other example(s) herein, wherein the method includes: applying a default filter rule to each packet in the batch of packets that does not have a returned filter rule in the set of filter rules.

Example 7 includes the method of examples 1-6 and/or some other example(s) herein, wherein the GrpId is included in a header section of each packet.

Example 8 includes the method of example 7 and/or some other example(s) herein, wherein the GrpId is included in a flow label field in the header section or an identification field in the header section.

Example 9 includes the method of example 8 and/or some other example(s) herein, wherein each packet is an Internet Protocol (IP) version 4 (IPv4) packet or a IP version 6 (IPv6) packet.

Example 10 includes the method of examples 4-9 and/or some other example(s) herein, wherein the GrpId is based on a destination address of each packet and an equipment type of a source address or an equipment type the destination address of each packet.

Example 11 includes the method of example 10 and/or some other example(s) herein, wherein the method includes: adding a GrpId of "0" to each packet in the batch of packets that have no filter group is specified for an associated equipment type and/or adding a GrpId of "0" to each packet in the batch of packets when no filter group is specified for the equipment type for those packets.

Example 12 includes the method of examples 4-11 and/or some other example(s) herein, wherein performing the single ACL lookup operation includes: defining an ACL lookup object to include all N-tuple fields and the GrpId, wherein the ACL lookup object defines the set of filter rules and is an input to an ACL batch classification algorithm.

Example 13 includes the method of examples 11-12 and/or some other example(s) herein, wherein the destination device is a cable modem (CM) and the equipment type is an equipment type of customer premises equipment (CPE).

Example 14 includes the method of example 13 and/or some other example(s) herein, wherein the method includes: determining a CM and CPE type of each received downstream packet; and determining a filter group to which each packet belongs based on the CPE type and a filter group assigned to the CM.

Example 15 includes the method of example 14 and/or some other example(s) herein, wherein the method includes: creating a filter lookup object for each packet; and performing the ACL lookup for all packets in the batch and across all Filter Groups using the created filter object.

Example 16 includes the method of example 15 and/or some other example(s) herein, wherein the ACL library is a Data Plane Development Kit (DPDK) ACL library, and performing the ACL lookup includes: performing the ACL lookup using a single call to a DPDK rte_acl_classify( ) application programming interface (API).

Example 17 includes a method of operating a packet filtering stage of a Data Over Cable Service Interface Specification (DOCSIS) packet processing pipeline, the method comprising: receiving a batch of packets to be filtered, wherein each packet in the batch of packets includes a filter group identifier (GrpId) of an assigned filter group, and at least one packet in the batch of packets belongs to a filter group that is different than a filter group to which other packets in the batch of packets belong; and for each packet in the batch of packets, determining a cable modem (CM) and a customer premises equipment (CPE) type, determining a filter group to which the packet belongs based on the CPE type and a filter group assigned to the CM, and creating a filter lookup object including the determined filter group; and performing a single access control list (ACL) lookup operation for all packets in the batch of packets and across all filter groups in a single ACL, wherein the single ACL includes a set of filter rules, and each filter rule of the set of filter rules in the single ACL includes a GrpId of a filter group to which it belongs.

Example 18 includes the method of example 17 and/or some other example(s) herein, wherein the method includes: determining the filter group based on a group object indicated by each packet.

Example 19 includes the method of example 18 and/or some other example(s) herein, wherein the method includes: performing the ACL lookup using the created filter object.

Example 20 includes the method of example 19 and/or some other example(s) herein, wherein performing the ACL lookup includes: sending an entirety of the batch of packets to an ACL library in a single function call.

Example 21 includes the method of example 20 and/or some other example(s) herein, wherein the ACL library is a Data Plane Development Kit (DPDK) ACL library, and performing the ACL lookup includes: performing the ACL lookup using a single call to a DPDK rte_acl_classify( ) application programming interface (API). Example 22 includes the method of examples 1-21 and/or some other example(s) herein, wherein performing the single ACL lookup operation includes: using a 512-bit instruction set to process the batch when the batch has more than 32 packets. Example 23 includes the method of examples 1-21 and/or some other example(s) herein, wherein performing the single ACL lookup operation includes: using a 256-bit instruction set to process the batch when the batch has 16 or more packets and less than 32 packets.

Example 24 includes the method of examples 21-23 and/or some other example(s) herein, wherein the 512-bit instruction set and the 256-bit instruction set are advanced vector extension (AVX)-512 instructions. Example 25 includes the method of examples 1-21 and/or some other example(s) herein, wherein performing the single ACL lookup operation includes: using a Streaming Single Instruction Multiple Data Extensions 8 (sse8) instruction set to process the batch when the batch has between 8 and 16 packets. Example 26 includes the method of examples 1-21 and/or some other example(s) herein, wherein performing the single ACL lookup operation includes: using a Streaming Single Instruction Multiple Data Extensions 4 (sse4) instruction set to process the batch when the batch has between 4 and 8 packets. Example 27 includes the method of examples 1-21 and/or some other example(s) herein, wherein performing the single ACL lookup operation includes: using a scalar processor instruction set or a single instruction single data (SISD) processor instruction set to process the batch when the batch has less than 4 packets.

Example 28 includes the method of examples 1-27 and/or some other example(s) herein and/or some other example(s) herein, wherein the packet processing pipeline is a Data Over Cable Service Interface Specification (DOCSIS) Medium Access Control (MAC) packet processing pipeline. Example 29 includes the method of examples 1-28 and/or some other example(s) herein, wherein the method is performed by a cable modem termination system (CMTS). Example 30 includes the method of examples 1-29 and/or some other example(s) herein, wherein the method is performed by a virtualized CMTS (vCMTS). Example 31 includes the method of example 30 and/or some other example(s) herein, wherein the vCMTS is operated by one or more compute nodes in a data center. Example 32 includes the method of example 30 and/or some other example(s) herein, wherein the vCMTS is operated by one or more edge compute nodes at a network's edge.

Example 33 includes one or more computer readable media comprising instructions, wherein execution of the instructions by processor circuitry is to cause the processor circuitry to perform the method of examples 1-32 and/or some other example(s) herein. Example 34 includes a computer program comprising the instructions of example 33 and/or some other example(s) herein. Example 35 includes an Application Programming Interface defining functions, methods, variables, data structures, and/or protocols for the computer program of example 34 and/or some other example(s) herein. Example 36 includes an apparatus comprising circuitry loaded with the instructions of example 33 and/or some other example(s) herein. Example 37 includes an apparatus comprising circuitry operable to run the instructions of example 33 and/or some other example(s) herein. Example 38 includes an integrated circuit comprising one or more of the processor circuitry and the one or more computer readable media of example 33 and/or some other example(s) herein. Example 39 includes a computing system comprising the one or more computer readable media and the processor circuitry of example 33 and/or some other example(s) herein. Example 40 includes an apparatus comprising means for executing the instructions of example 33 and/or some other example(s) herein. Example 41 includes a signal generated as a result of executing the instructions of example 33 and/or some other example(s) herein. Example 42 includes a data unit generated as a result of executing the instructions of example 32 and/or some other example(s) herein. Example 43 includes the data unit of example 42 and/or some other example(s) herein, the data unit is a datagram, network packet, data frame, data segment, a Protocol Data Unit (PDU), a Service Data Unit (SDU), a message, or a database object. Example 44 includes a signal encoded with the data unit of examples 42-43 and/or some other example(s) herein. Example 45 includes an electromagnetic signal carrying the instructions of example 33 and/or some other example(s) herein. Example 46 includes an apparatus comprising means for performing the method of examples 1-32 and/or some other example(s) herein.

6. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some examples refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, etc., and/or the fact of the object, data, data unit, etc. being received. The term "receipt" at least in some examples refers to an object, data, data unit, etc., being pushed to a device, system, element, etc. (e.g., often referred to as a push model), pulled by a device, system, element, etc. (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and so forth, or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value.

The term "metric" at least in some examples refers to a standard definition of a quantity, produced in an assessment of performance and/or reliability of the network, which has an intended utility and is carefully specified to convey the exact meaning of a measured value.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, etc., that is under consideration or being considered. The terms "neighbor" and "proximate" (as in, e.g., "proximate device") at least in some examples refers to an entity, element, device, system, etc., other than an ego device or subject device.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period.

The term "identification" at least in some examples refers to a process of recognizing an identity as distinct from other identities in a particular scope or context, which may involve processing identifiers to reference an identity in an identity database.

The term "generalization" at least in some examples refers to a relationship in which one configuration model element (e.g., the "child") is based on another model element (e.g., the "parent"). In some examples, a generalization relationship indicates that the child receives all of the attributes, operations, and relationships that are defined in the parent. The term "specialization" at least in some examples refers to a relationship in which one configuration model element (e.g., the "parent") is used to model another element (e.g., the "child"). In some examples, a specialized child element receives all of the attributes, operations, and relationships that are defined in the parent and defines additional attributes, operations and relationships that enable its specialized behavior.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more hardware elements capable of executing or otherwise operating computer-executable instructions, such as program code, software modules, and/or functional processes.

The term "memory" and/or "memory circuitry" at least in some examples refers to one or more hardware elements capable of storing data. The term "computer-readable medium" at least in some examples refers to memory, portable or fixed storage devices, optical storage devices, and various other mediums capable of storing, containing or carrying instructions or data.

The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, memory controllers, peripheral component interfaces, network interface cards, and/or the like.

The term "device" at least in some examples refers to a physical entity embedded inside, or attached to, another physical entity in its vicinity, with capabilities to convey digital information from or to that physical entity. The term "entity" at least in some examples refers to a distinct component of an architecture or device, or information transferred as a payload. The term "controller" at least in some examples refers to an element or entity that has the capability to affect a physical entity. The term "terminal" at least in some examples refers to point at which a conductor from a component, device, or network comes to an end. Additionally or alternatively, the term "terminal" at least in some examples refers to an electrical connector acting as an interface to a conductor and creating a point where external circuits can be connected. Additionally or alternatively, the term "terminal" at least in some examples refers to electrical leads, electrical connectors, solder cups, and/or the like.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, network access node (NAN), gateway, road side unit, on-premise unit, user equipment, end consuming device, appliance, and/or some other device.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "platform" at least in some examples refers to an environment in which instructions, program code, software elements, and the like can be executed or otherwise operate, and examples of such an environment include an architecture (e.g., a motherboard, a computing system, and/or the like), one or more hardware elements (e.g., embedded systems, and the like), a cluster of compute nodes, a set of distributed compute nodes or network, an operating system, a virtual machine (VM), a virtualization container, a software framework, a client application (e.g., web browser or the like) and associated application programming interfaces, a cloud computing service (e.g., platform as a service (PaaS)), or other underlying software executed with instructions, program code, software elements, and the like.

The term "architecture" at least in some examples refers to a computer architecture or a network architecture. The term "computer architecture" at least in some examples refers to a physical and logical design or arrangement of software and/or hardware elements in a computing system or platform including technology standards for interacts therebetween. The term "network architecture" at least in some examples refers to a physical and logical design or arrangement of software and/or hardware elements in a network including communication protocols, interfaces, and media transmission.

The term "appliance," "computer appliance," and the like, at least in some examples refers to a computer device or computer system with program code (e.g., software or firmware) that is specifically designed to provide a specific computing resource. The term "virtual appliance" at least in some examples refers to a virtual machine image to be implemented by a hypervisor-equipped device that virtualizes or emulates a computer appliance or otherwise is dedicated to provide a specific computing resource. The term "security appliance", "firewall", and the like at least in some examples refers to a computer appliance designed to protect computer networks from unwanted traffic and/or malicious attacks. The term "policy appliance" at least in some examples refers to to technical control and logging mechanisms to enforce or reconcile policy rules (information use rules) and to ensure accountability in information systems.

The term "gateway" at least in some examples refers to a network appliance that allows data to flow from one network to another network, or a computing system or application configured to perform such tasks. Examples of gateways include IP gateways, Internet-to-Orbit (I2O) gateways, IoT gateways, cloud storage gateways, and/or the like.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmut-mounted display devices, augmented reality (AR) devices, virtual reality (VR) devices, mixed reality (MR) devices, and/or other like systems or devices.

The term "network element" at least in some examples refers to physical or virtualized equipment and/or infrastructure used to provide wired or wireless communication network services. The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline Broadband Forum (BBF) Access Network, and the like), network appliance, and/or some other network access hardware.

The term "Residential Gateway" or "RG" at least in some examples refers to a device providing, for example, voice, data, broadcast video, video on demand, to other devices in customer premises. The term "Wireline 5G Access Network" or "W-5GAN" at least in some examples refers to a wireline AN that connects to a 5GC via N2 and N3 reference points. The W-5GAN can be either a W-5GBAN or W-5GCAN. The term "Wireline 5G Cable Access Network" or "W-5GCAN" at least in some examples refers to an Access Network defined in/by CableLabs. The term "Wireline BBF Access Network" or "W-5GBAN" at least in some examples refers to an Access Network defined in/by the. The term "Wireline Access Gateway Function" or "W-AGF" at least in some examples refers to a Network function in W-5GAN that provides connectivity to a 3GPP 5G Core network (5GC) to 5G-RG and/or FN-RG. The term "5G-RG" at least in some examples refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" at least in some examples refers to a distributed computing framework that provides processing activities and resources (e.g., compute, storage, acceleration resources) at or towards the "edge" of a network. In some examples, edge computing implementations involve offering resources in cloud-like services, functions, applications, and subsystems, from one or multiple locations accessible via wireless networks.

The term "central office" or "CO" at least in some examples refers to an aggregation point for telecommunications infrastructure within an accessible or defined geographical area, often where telecommunication service providers have traditionally located switching equipment for one or multiple types of access networks.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services and/or cloud services, which are one or more capabilities offered via cloud computing that are invoked using a defined interface (e.g., an API and/or the like). The term "cloud service provider" or "CSP" at least in some examples refers to an organization which operates typically large-scale "cloud" resources comprised of centralized, regional, and edge data centers (e.g., as used in the context of the public cloud). In other examples, a CSP may also be referred to as a "Cloud Service Operator" or "CSO". References to "cloud computing" generally refer to computing resources and services offered by a CSP or a CSO, at remote locations with at least some increased latency, distance, or constraints relative to edge computing. The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some examples refers to to compute, storage, and/or network resources provided by physical hardware element(s). A "virtualized resource" at least in some examples refers to to compute, storage, and/or network resources provided by virtualization infrastructure to an application, device, system, etc. The term "network resource" or "communication resource" at least in some examples refers to to resources that are accessible by computer devices/systems via a communications network. The term "system resources" at least in some examples refers to to any kind of shared entities to provide services, and may include computing and/or network resources. System resources may be considered as a set of coherent functions, network data objects or services, accessible through a server where such system resources reside on a single host or multiple hosts and are clearly identifiable.

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s). The term "network function virtualization" or "NFV" at least in some examples refers to the principle of separating network functions from the hardware they run on by using virtualization techniques and/or virtualization technologies. The term "virtualized network function" or "VNF" at least in some examples refers to an implementation of an NF that can be deployed on a Network Function Virtualization Infrastructure (NFVI). The term "Network Functions Virtualization Infrastructure Manager" or "NFVI" at least in some examples refers to a totality of all hardware and software components that build up the environment in which VNFs are deployed. The term "management function" at least in some examples refers to a logical entity playing the roles of a service consumer and/or a service producer. The term "management service" at least in some examples refers to a set of offered management capabilities. The term "Virtualized Infrastructure Manager" or "VIM" at least in some examples refers to a functional block that is responsible for controlling and managing the NFVI compute, storage and network resources, usually within one operator's infrastructure domain.

The term "slice" at least in some examples refers to a set of characteristics and behaviors that separate one instance, traffic, data flow, application, application instance, link or connection, RAT, device, system, entity, element, etc. from another instance, traffic, data flow, application, application instance, link or connection, RAT, device, system, entity, element, etc., or separate one type of instance, etc., from another instance, and/or the like. The term "network slice" at least in some examples refers to a logical network that provides specific network capabilities and network characteristics and/or supports various service properties for network slice service consumers. Additionally or alternatively, the term "network slice" at least in some examples refers to a logical network topology connecting a number of endpoints using a set of shared or dedicated network resources that are used to satisfy specific service level objectives (SLOs) and/or service level agreements (SLAs). The term "network slicing" at least in some examples refers to methods, processes, techniques, and technologies used to create one or multiple unique logical and virtualized networks over a common multi-domain infrastructure. The term "access network slice", "radio access network slice", or "RAN slice" at least in some examples refers to a part of a network slice that provides resources in a RAN to fulfill one or more application and/or service requirements (e.g., SLAs, and/or the like). The term "network slice instance" at least in some examples refers to a set of Network Function instances and the required resources (e.g. compute, storage and networking resources) which form a deployed network slice. Additionally or alternatively, the term "network slice instance" at least in some examples refers to a representation of a service view of a network slice. The term "network instance" at least in some examples refers to information identifying a domain.

The term "service consumer" at least in some examples refers to an entity that consumes one or more services. The term "service producer" at least in some examples refers to an entity that offers, serves, or otherwise provides one or more services. The term "service provider" at least in some examples refers to an organization or entity that provides one or more services to at least one service consumer. For purposes of the present disclosure, the terms "service provider" and "service producer" may be used interchangeably even though these terms may refer to difference concepts. Examples of service providers include cloud service provider (CSP), network service provider (NSP), application service provider (ASP) (e.g., Application software service provider in a service-oriented architecture (ASSP)), internet service provider (ISP), telecommunications service provider (TSP), online service provider (OSP), payment service provider (PSP), managed service provider (MSP), storage service providers (SSPs), SAML service provider, and/or the like. At least in some examples, SLAs may specify, for example, particular aspects of the service to be provided including quality, availability, responsibilities, metrics by which service is measured, as well as remedies or penalties should agreed-on service levels not be achieved. The term "SAML service provider" at least in some examples refers to a system and/or entity that receives and accepts authentication assertions in conjunction with a single sign-on (SSO) profile of the Security Assertion Markup Language (SAML) and/or some other security mechanism(s).

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some examples refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Internet of Things" or "IoT" at least in some examples refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some examples refers to any kind of IoT devices deployed at a network's edge.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). Additionally or alternatively, the term "protocol" at least in some examples refers to a set of rules and formats that determines the communication behavior of layer entities in the performance of the layer functions.

The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure. The term "standard protocol" at least in some examples refers to a protocol whose specification is published and known to the public and is controlled by a standards body. The term "protocol stack" or "network stack" at least in some examples refers to an implementation of a protocol suite or protocol family. In various implementations, a protocol stack includes a set of protocol layers, where the lowest protocol deals with low-level interaction with hardware and/or communications interfaces and each higher layer adds additional capabilities.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT, Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements.

The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (µTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connection-less-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], 3GPP TS 38.321 v17.0.0 (2022-04-14) and 3GPP TS 36.321 v17.0.0 (2022-04-19) (collectively referred to as "[MAC]")).

The term "MAC domain" at least in some examples refers to a grouping of L2 devices that can communicate with each other without using bridging or routing. In DOCSIS, the MAC domain is the group of CMs that are using upstream and downstream channels linked together through a MAC forwarding entity. The term "MAC Domain Cable Modem Service Group" at least in some examples refers to a subset of a Cable Modem Service Group which is confined to the Downstream Channels and Upstream Channels of a single MAC domain. In some examples, the "MAC Domain Cable Modem Service Group" differs from a CM-SG only if multiple MAC domains are assigned to the same CM-SGs The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 38.201 v17.0.0 (2022-01-05) and 3GPP TS 36.201 v17.0.0 (2022-03-31)).

The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network. The term "RAT type" at least in some examples may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., *IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, IEEE Std*

802.11-2020, pp. 1-4379 (26 Feb. 2021) ("[IEEE80211]"), and *IEEE Standard for Local and Metropolitan Area Networks: Overview and Architecture*, IEEE Std 802-2014, pp. 1-74 (30 Jun. 2014) ("[IEEE802]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), etc.); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), etc.), Generic Access Network (GAN)/Unlicensed Mobile Access (UMA), High Speed Packet Access (HSPA) (and variants thereof such as HSPA Plus (HSPA+), etc.), Long Term Evolution (LTE) (and variants thereof such as LTE-Advanced (LTE-A), Evolved UTRA (E-UTRA), LTE Extra, LTE-A Pro, LTE LAA, MuLTEfire, etc.), Fifth Generation (5G) or New Radio (NR), etc.; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (see e.g., *IEEE Standard for Air Interface for Broadband Wireless Access Systems*, IEEE Std 802.16-2017, pp. 1-2726 (2 Mar. 2018) ("[WiMAX]") and variants thereof), Mobile Broadband Wireless Access (MBWA)/iBurst (e.g., IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), etc.), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, IEEE Std 802.11p-2010, pp. 1-51 (15 Jul. 2010), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-G5B, ITS-G5C, etc.); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), etc.); Personal Digital Cellular (PDC); Personal Handy-phone System (PHS), Cellular Digital Packet Data (CPDP); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, etc.); Ultra High Frequency (UHF) communication; Very High Frequency (VHF) communication; and/or any other suitable RAT or protocol. In addition to the aforementioned RATs/standards, any number of satellite uplink (upsteam) technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. Additionally or alternatively, the term "channel" at least in some examples refers to a frequency spectrum occupied by a signal, which may be specified by center frequency and bandwidth parameters. In some examples, the term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information. The term "local area network" or "LAN" at least in some examples refers to a network of devices, whether indoors or outdoors, covering a limited area or a relatively small geographic area (e.g., within a building or a campus). The term "wireless local area network", "wireless LAN", or "WLAN" at least in some examples refers to a LAN that involves wireless communications. The term "virtual local area network" or "VLAN" at least in some examples refers to a subset of the LANs of an IEEE 802.1 Bridged Network to which a VLAN Identifier (VLAN ID) is assigned. The term "wide area network" or "WAN" at least in some examples refers to a network of devices that extends over a relatively large geographic area (e.g., a telecommunications network). Additionally or alternatively, the term "wide area network" or "WAN" at least in some examples refers to a computer network spanning regions, countries, or even an entire planet. The term "backbone network", "backbone", "core network", or "core" at least in some examples refers to a computer network which interconnects networks, providing a path for the exchange of information between different subnetworks such as LANs or WANs. In some examples, the term "backbone network" may be synonymous with the term "core network."

The term "flow" at least in some examples refers to a sequence of data and/or data units (e.g., datagrams, data units, packets, and/or the like) from a source entity/element to a destination entity/element. Additionally or alternatively, the term "flow" at least in some examples refers to a stream of packets used to transport data of a certain priority from a source to a sink. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some examples refer to a set of data and/or data units (e.g., datagrams, packets, or the like) passing an observation point in a network during a certain time interval. Additionally or alternatively, the term "flow" at least in some examples refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some examples refers to to different concepts. The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels.

The term "stream" at least in some examples refers to a sequence of data elements made available over time. At least in some examples, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some examples refers to a manner of processing in which an object is not represented by a complete logical data structure of nodes occupying memory proportional to a size of that object, but are processed "on the fly" as a sequence of events.

The term "distributed computing" at least in some examples refers to computation resources that are geographically distributed within the vicinity of one or more localized networks' terminations. The term "distributed computations" at least in some examples refers to a model in which components located on networked computers communicate and coordinate their actions by passing messages interacting with each other in order to achieve a common goal.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfill a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols. The term "network service" at least in some examples refers to a composition of Network Function(s) and/or Network Service(s), defined by its functional and behavioural specification.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges. An example session ID includes a L2TPv3 session ID, which indicates the type of upstream frame according to DOCSIS MAC protocol specifications.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems. The term "Quality of Service" or "QoS' at least in some examples refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some examples refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some examples refers to mechanisms that provide traffic-forwarding treatment based on flow-specific traffic classification. In some implementations, the term "Quality of Service" or "QoS" can be used interchangeably with the term "Class of Service" or "CoS". The term "Class of Service" or "CoS' at least in some examples refers to mechanisms that provide traffic-forwarding treatment based on non-flow-specific traffic classification. In some implementations, the term "Class of Service" or "CoS" can be used interchangeably with the term "Quality of Service" or "QoS". The term "QoS flow" at least in some examples refers to the finest granularity for QoS forwarding treatment in a network. The term "5G QoS flow' at least in some examples refers to the finest granularity for QoS forwarding treatment in a 5G System (5GS). Traffic mapped to the same QoS flow (or 5G QoS flow) receive the same forwarding treatment. The term "QoS Identifier" at least in some examples refers to a scalar that is used as a reference to a specific QoS forwarding behavior (e.g., packet loss rate, packet delay budget, etc.) to be provided to a QoS flow. This may be implemented in an access network by referencing node specific parameters that control the QoS forwarding treatment (e.g., scheduling weights, admission thresholds, queue management thresholds, link layer protocol configuration, etc.).

The term "queue" at least in some examples refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some examples refers to one or more operations of adding an element to the rear of a queue. The term "dequeue" at least in some examples refers to one or more operations of removing an element from the front of a queue.

The term "packet capture" or "PCAP" at least in some examples refers to a networking practice involving the interception of data packets traveling over a network and/or through one or more network nodes. Additionally or alternatively, the term "packet capture" or "PCAP" at least in some examples refers to a process of intercepting and logging traffic. Packet capture can be used to help to analyze networks, manage network traffic, and/or identify network performance issues. The term "packet capture" or "PCAP" can sometimes be synonymous with the terms "packet sniffing", "protocol analysis", "network analysis", "network capture", "wireless analysis", "WiFi analysis", and the like.

The term "packet capture file" or "PCAP file" at least in some examples refers to a data file, API, and/or other data structure(s) including data, parameters, and other like information for capturing packets and/or network traffic, analyzing the network characteristics, controlling the network traffic, determining network status, and/or detecting and/or resolving network problems.

The term "traffic shaping" at least in some examples refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some examples refers to the regulation of flows into or out of a network, or into or out of a specific device or element. The term "access traffic steering" or "traffic steering" at least in some examples refers to a procedure that selects an access network for a new data flow and transfers the traffic of one or more data flows over the selected access network. Access traffic steering is applicable between one 3GPP access and one non-3GPP access. The term "access traffic switching" or "traffic switching" at least in some examples refers to a procedure that moves some or all traffic of an ongoing data flow from at least one access network to at least one other access network in a way that maintains the continuity of the data flow. The term "access traffic splitting" or "traffic splitting" at least in some examples refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some examples refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of 3GPP TS 38.300 v17.0.0 (2022-04-13) ("[TS38300]")), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), VLAN ID, an X.21 address, an X.25 address, Zigbee® ID, Zigbee® Device Network ID, Multiprotocol Label Switching (MPLS) label, and/or any other suitable network address and components thereof. The term "application identifier", "application ID", or "app ID" at least in some examples refers to an identifier that can be mapped to a specific application or application instance; in the context of 3GPP 5G/NR systems, an "application identifier" at least in some examples refers to to an identifier that can be mapped to a specific application traffic detection rule. The term "endpoint address" at least in some examples refers to an address used to determine the host/authority part of a target URI, where the target URI is used to access an NF service (e.g., to invoke service operations) of an NF service producer or for notifications to an NF service consumer. The term "port" in the context of computer networks, at least in some examples refers to a communication endpoint, a virtual data connection between two or more entities, and/or a virtual point where network connections start and end. Additionally or alternatively, a "port" at least in some examples is associated with a specific process or service.

The term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "CAG-ID" at least in some embodiments refers to an identifier of a CAG.

The term "application" at least in some examples refers to to a computer program designed to carry out a specific task other than one relating to the operation of the computer itself. Additionally or alternatively, term "application" at least in some examples refers to to a complete and deployable package, environment to achieve a certain function in an operational environment. The term "algorithm" at least in some examples refers to an unambiguous specification of how to solve a problem or a class of problems by performing calculations, input/output operations, data processing, automated reasoning tasks, and/or the like. The term "analytics" at least in some examples refers to the discovery, interpretation, and communication of meaningful patterns in data.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The term "code path" at least in some examples refers to a set of specific instructions that are actually executed during a single run of a program or program fragment. Additionally or alternatively, term "code path" at least in some examples refers to an execution route of a program or segment of program code.

The term "instruction set architecture" or "ISA" at least in some examples refers to an abstract model of a computer that defines instructions, data types, registers, hardware support for memory management, memory consistency, addressing modes, virtual memory, the input/output model, and/or implementations that support the ISA, where the term "implementation" at least in some examples refers to a device or circuitry that executes instructions described by the ISA.

The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction. The term "packet processor" at least in some examples refers to software and/or hardware element(s) that transform a stream of input packets into output packets (or transforms a stream of input data into output data); examples of the transformations include adding, removing, and modifying fields in a packet header, trailer, and/or payload. The term "data pipeline" or "pipeline" at least in some examples refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements.

The term "filter" at least in some examples refers to computer program, subroutine, or other software element capable of processing a stream, data flow, or other collection of data, and producing another stream. In some implementations, multiple filters can be strung together or otherwise connected to form a pipeline.

The terms "instantiate," "instantiation," and the like at least in some examples refers to the creation of an instance. An "instance" also at least in some examples refers to a concrete occurrence of an object, which may occur, for example, during execution of program code. The term "reference" at least in some examples refers to data usable to locate other data and may be implemented a variety of ways (e.g., a pointer, an index, a handle, a key, an identifier, a hyperlink, and/or the like).

The term "software agent" at least in some examples refers to a computer program that acts for a user or other program in a relationship of agency. The term "use case" at least in some examples refers to a description of a system from a user's perspective. Use cases sometimes treat a system as a black box, and the interactions with the system, including system responses, are perceived as from outside the system. Use cases typically avoid technical jargon, preferring instead the language of the end user or domain expert. The term "user" at least in some examples refers to an abstract representation of any entity issuing commands, requests, and/or data to a compute node or system, and/or otherwise consumes or uses services.

The term "datagram" at least in some examples at least in some examples refers to a basic transfer unit associated with a packet-switched network; a datagram may be structured to have header and payload sections. The term "datagram" at least in some examples may be synonymous with any of the following terms, even though they may refer to different aspects: "data unit", a "protocol data unit" or "PDU", a "service data unit" or "SDU", "frame", "packet", a "network packet", "segment", "block", "cell", "chunk", and/or the like. The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information. The term "field" at least in some examples refers to individual contents of an information element, or a data element that contains content. The term "data element" or "DE" at least in some examples refers to a data type that contains one single data. The term "data frame" or "DF" at least in some examples refers to a data type that contains more than one data element in a predefined order.

The term "translation" at least in some examples refers to the process of converting or otherwise changing data from a first form, shape, configuration, structure, arrangement, embodiment, description, or the like into a second form, shape, configuration, structure, arrangement, embodiment, description, or the like; at least in some examples there may be two different types of translation: transcoding and transformation. The term "transcoding" at least in some examples refers to taking information/data in one format (e.g., a packed binary format) and translating the same information/data into another format in the same sequence. Additionally or alternatively, the term "transcoding" at least in some examples refers to taking the same information, in the same sequence, and packaging the information (e.g., bits or bytes) differently. The term "transformation" at least in some examples refers to changing data from one format and writing it in another format, keeping the same order, sequence, and/or nesting of data items. Additionally or alternatively, the term "transformation" at least in some examples involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some examples refers to changing the schema of a data object to another schema.

The term "cryptographic mechanism" at least in some examples refers to any cryptographic protocol and/or cryptographic algorithm. Additionally or alternatively, the term "cryptographic protocol" at least in some examples refers to a sequence of steps precisely specifying the actions required of two or more entities to achieve specific security objectives (e.g., cryptographic protocol for key agreement). Additionally or alternatively, the term "cryptographic algorithm" at least in some examples refers to an algorithm specifying the steps followed by a single entity to achieve specific security objectives (e.g., cryptographic algorithm for symmetric key encryption). The term "cryptographic hash function", "hash function", or "hash") at least in some examples refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "hash table" at least in some examples refers to a data structure that maps keys to values, wherein a hash function is used to compute an index (also called a hash code) into an array of buckets or slots from which a desired value can be found, and during lookup, the key is hashed and the resulting hash indicates where the corresponding value is stored. In some examples, any suitable hashing scheme can be used to construct or build a hash table such as, for example, a perfect hashing scheme, coalesced hashing, Cuckoo hashing, hopscotch hashing, robin hood hashing, jHash, and/or the like.

The term "lookup table" or "LUT" at least in some examples refers to a data structure that replaces runtime computation with a relatively simpler indexing operation. Additionally or alternatively, the term "lookup table" or "LUT" at least in some examples refers to a data structure (e.g., array or the like) that maps input values to output values. In some examples, an LUT is arranged as a set of key-value pairs, where the keys are the data items being searched (e.g., looked up) and the values are either the actual data or pointers to where the data are located. In other examples, an LUT is arranged as a set of data items only where the location in the table and the key are synonymous. In some examples, suitable function can be approximated or estimated to calculate the location of data items in an LUT. Hash tables are somewhat different than LUTs in that, to retrieve a value v with a key k, a hash table would store the value v in the slot h(k) where h is a hash function (e.g., key k is used to compute the slot), whereas in LUTs the value v may be stored in slot k. The term "lookup operation" or "LUT operation" at least in some examples refers to an operation, process, procedure, method, function, algorithm, and/or other means of retrieving a output values from an LUT for a set of input values.

The term "aggregation" at least in some examples refers to a special type of object association for configuration object models in which objects are assembled or configured together to create a more complex object.

The term "cable modem" or "CM" at least in some examples refers to a modulator-demodulator at subscriber locations intended for use in conveying data communications on a cable television system. The term "customer premises equipment" or "CPE" at least in some examples refers to equipment at the end user's premises; may be provided by the service provider.

The term "cable modem termination system" or "CMTS" at least in some examples refers to an access-side networking element or set of elements that includes one or more MAC Domains and one or more Network System Interfaces. In some examples, a CMTS is located at the cable television system headend or distribution hub and provides data connectivity between a DOCSIS Radio Frequency Interface and a wide-area network. The term "bridging cable modem termination system" or "bridging CMTS" at least in some examples refers to a CMTS that makes traffic forwarding decisions between its Network Systems Interfaces and MAC Domain Interfaces based upon the L2 Ethernet MAC address of a data frame. The term "routing cable modem termination system" or "routing CMTS" at least in some examples refers to a CMTS that makes traffic forwarding decisions between its Network System Interfaces and MAC Domain Interfaces based upon the L3 (network) address of a packet. The term "virtualized cable modem termination system", "virtual cable modem termination system", or "vCMTS" at least in some examples refers to a software-based network function (NF) operating on multi-function, multi-purpose compute resources (e.g., x86, ARM processing architecture, and/or the like) which are used by NFV in place of dedicated physical equipment.

The term "command line interface" at least in some examples refers to a mechanism used to interact with a computing system, device, and/or application by typing text-based commands into a system interface.

The term "Converged Cable Access Platform" or "CCAP" at least in some examples refers to an access-side networking element or set of elements that combines the functionality of a CMTS with that of an Edge QAM (EQAM), providing high-density services to cable subscribers. The term "Converged Cable Access Platform Core" or "CCAP Core" at least in some examples refers to a CCAP device that uses MHAv2 protocols to interconnect to an RPD. The term "Converged Interconnect Network" at least in some examples refers to a network (e.g., gigabit Ethernet) that connects a CCAP Core to an RPD.

The term "downstream" or "DS" at least in some examples refers to transmissions from a CMTS to a CM including transmission from the CCAP Core to the RPD, as well as the RF transmissions from the RPD to the CM. Additionally or alternatively, the term "downstream" or "DS" at least in some examples refers to RF spectrum used to transmit signals from a cable operator's headend or hub site to subscriber locations. The term "upstream" or "US" at least in some examples refers to transmissions from a CM to a CMTS including transmission from the RPD to the CCAP Core, as well as the RF transmissions from the CM to the RPD. Additionally or alternatively, the term "upstream" or "US" at least in some examples refers to RF spectrum used to transmit signals from a subscriber location to a cable operator's headend or hub site.

The term "Quadrature Amplitude Modulation" or "QAM" at least in some examples refers to a modulation technique in which an analog signal's amplitude and phase vary to convey information, such as digital data. The term "QAM channel" at least in some examples refers to an analog RF channel that uses quadrature amplitude modulation (QAM) to convey information. The term "edge QAM", "edge QAM modulator", or "EQAM" at least in some examples refers to a headend or hub device that receives packets of digital video or data. In some examples, EQAM repacketizes video or data into an MPEG transport stream (or some other suitable transport stream) and digitally modulates the digital transport stream onto a downstream RF carrier using QAM.

The term "Hybrid Fiber/Coax System" or "HFCS" at least in some examples refers to a broadband bidirectional shared-media transmission system using optical fiber trunks between the headend and the fiber nodes, and coaxial cable distribution from the fiber nodes to the customer locations.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g., 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the examples discussed herein, and as such, any combination of containers, frames, DFs, DEs, IEs, values, actions, and/or features are possible in various examples, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus for a filter processing stage of a packet processing pipeline, the apparatus comprising:
   interface circuitry to receive a batch of packets to be processed by the packet processing pipeline, wherein each packet in the batch of packets includes a filter group identifier (GrpId), and at least one packet in the batch of packets has a first GrpId different than a second GrpId of at least one other packet in the batch of packets; and
   processor circuitry connected to the interface circuitry, the processor circuitry is to operate the filter processing stage of the packet processing pipeline to perform a single access control list (ACL) lookup operation on a single ACL, wherein the single ACL includes a set of filter rules, and each filter rule of the set of filter rules includes a GrpId of a filter group to which it belongs.

2. The apparatus of claim 1, wherein the processor circuitry is to operate the filter processing stage to:
   utilize a most optimal code path of an ACL library for performing the filter processing.

3. The apparatus of claim 1, wherein, to perform the single ACL lookup operation, the processor circuitry is to operate the filter processing stage to:
   send an entirety of the batch of packets to an ACL library in a single function call.

4. The apparatus of claim 1, wherein each packet is a Internet Protocol (IP) version 4 (IPv4) packet, and the GrpId is included in an identification field of a header of each packet.

5. The apparatus of claim 1, wherein each packet is a IP version 6 (Ipv6) packet, and the GrpId is included in an identification field of a header of each packet or in a flow label field of the header of each packet.

6. The apparatus of claim 1, wherein the GrpId of each packet is based on an equipment type of a destination address included in each packet.

7. The apparatus of claim 6, wherein the equipment type is an equipment type of customer premises equipment (CPE), and the GrpId is based on a filter group assigned to a cable modem (CM) associated with the CPE.

8. The apparatus of claim 1, wherein the processor circuitry is to operate the filter processing stage to:

determine a CM and CPE type of each received packet; and determining a filter group to which each packet belongs based on the CPE type and a filter group assigned to the CM;

create an ACL lookup object for each packet, wherein the ACL lookup object includes all tuple fields and the GrpId, and the ACL lookup object defines the set of filter rules and is an input to an ACL batch classification algorithm; and perform the ACL lookup for all packets in the batch and across all filter groups using the created ACL lookup object.

9. The apparatus of claim 8, wherein the ACL library is a Data Plane Development Kit (DPDK) ACL library, and the processor circuitry is to operate the filter processing stage to:
perform the ACL lookup using a single call to a DPDK rte_acl_classify( ) application programming interface (API).

10. The apparatus of claim 1, wherein the processor circuitry is to operate the filter processing stage to:
use a 512-bit instruction set to process the batch when the batch has more than 32 packets;
use a 256-bit instruction set to process the batch when the batch has 16 or more packets and less than 32 packets;
use a Streaming Single Instruction Multiple Data Extensions 8 (sse8) instruction set to process the batch when the batch has between 8 and 16 packets;
use a Streaming Single Instruction Multiple Data Extensions 4 (sse4) instruction set to process the batch when the batch has between 4 and 8 packets; and
use a scalar processor instruction set or a single instruction single data (SISD) processor instruction set to process the batch when the batch has less than 4 packets.

11. The apparatus of claim 10, wherein the 512-bit instruction set and the 256-bit instruction set are advanced vector extension (AVX)-512 instructions.

12. The apparatus of claim 1, wherein the packet processing pipeline is a Data Over Cable Service Interface Specification (DOCSIS) Medium Access Control (MAC) packet processing pipeline, and the apparatus is a virtualized cable modem termination system (vCMTS) platform.

13. One or more non-transitory computer-readable media (NTCRM) comprising instructions of a filter stage of a Data Over Cable Service Interface Specification (DOCSIS) packet processing pipeline, wherein execution of the instructions by one or more processors of a compute node is to cause the compute node to:
receive a batch of packets to be filtered, wherein each packet in the batch of packets includes a filter group identifier (GrpId), and the batch of packets includes multiple GrpIds; and
for each packet in the batch of packets,
determine a cable modem (CM) and a customer premises equipment (CPE) type,
determine a filter group to which the packet belongs based on the CPE type and a filter group assigned to the CM, and
create a filter lookup object including the determined filter group; and
perform a single access control list (ACL) lookup operation for all packets in the batch of packets and across all filter groups in a single ACL, wherein the single ACL includes a set of filter rules, and each filter rule of the set of filter rules in the single ACL includes a GrpId of a filter group to which it belongs.

14. The one or more NTCRM of claim 13, wherein execution of the instructions is to cause the compute node to:
determine the filter group based on a group object indicated by each packet.

15. The one or more NTCRM of claim 14, wherein execution of the instructions is to cause the compute node to:
perform the ACL lookup using the created filter object.

16. The one or more NTCRM of claim 15, wherein execution of the instructions is to cause the compute node to:
send an entirety of the batch of packets to an ACL library in a single function call.

17. The one or more NTCRM of claim 16, wherein the ACL library is a Data Plane Development Kit (DPDK) ACL library, and execution of the instructions is to cause the compute node to:
perform the ACL lookup using a single call to a DPDK rte_acl_classify ( ) application programming interface (API).

18. The one or more NTCRM of claim 13, wherein execution of the instructions is to cause the compute node to:
use an advanced vector extension (AVX)-512 512-bit instruction set to process the batch when the batch has more than 32 packets;
use an AVX-512 256-bit instruction set to process the batch when the batch has 16 or more packets and less than 32 packets;
use a Streaming Single Instruction Multiple Data Extensions 8 (sse8) instruction set to process the batch when the batch has between 8 and 16 packets;
use a Streaming Single Instruction Multiple Data Extensions 4 (sse4) instruction set to process the batch when the batch has between 4 and 8 packets; and
use a scalar processor instruction set or a single instruction single data (SISD) processor instruction set to process the batch when the batch has less than 4 packets.

19. The one or more NTCRM of claim 17, wherein the compute node is a virtual cable modem termination system (vCMTS) platform.

20. The one or more NTCRM of claim 19, wherein the compute node is one or more servers in a data center.

21. The one or more NTCRM of claim 19, wherein the compute node is one or more edge compute nodes co-located with one or more network access nodes.

* * * * *